US009175141B2

(12) United States Patent
Wray et al.

(10) Patent No.: US 9,175,141 B2
(45) Date of Patent: Nov. 3, 2015

(54) CYCLOSILOXANE-SUBSTITUTED POLYSILOXANE COMPOUNDS, COMPOSITIONS CONTAINING THE COMPOUNDS AND METHODS OF USE THEREOF

(75) Inventors: Daniel X. Wray, Minden, NV (US); Michael B. Halsdorff, San Marcos, CA (US); Robert L. De Armond, Temecula, CA (US)

(73) Assignee: BIOFILM IP, LLC, Minden, NV (US)

( * ) Notice: Subject to any disclaimer, the term of this patent is extended or adjusted under 35 U.S.C. 154(b) by 541 days.

(21) Appl. No.: 13/198,658

(22) Filed: Aug. 4, 2011

(65) Prior Publication Data

US 2012/0064022 A1  Mar. 15, 2012

Related U.S. Application Data

(60) Provisional application No. 61/371,079, filed on Aug. 5, 2010.

(51) Int. Cl.
C08G 77/50 (2006.01)
C08L 83/14 (2006.01)

(52) U.S. Cl.
CPC ............. *C08G 77/50* (2013.01); *C08L 83/14* (2013.01)

(58) Field of Classification Search
CPC combination set(s) only.
See application file for complete search history.

(56) References Cited

U.S. PATENT DOCUMENTS

| 2,380,995 A | 8/1945 | Rochow | 556/472 |
| 2,488,487 A | 11/1949 | Barry et al. | 556/473 |
| 2,574,168 A | 11/1951 | Brick et al. | 427/245 |
| 2,614,989 A | 10/1952 | Hunter et al. | 508/208 |
| 2,837,482 A | 6/1958 | Agens | 508/214 |
| 2,894,913 A | 7/1959 | Sullivan et al. | 516/121 |
| 2,970,162 A | 1/1961 | Brown | 556/10 |
| 2,990,373 A | 6/1961 | Ragborg | 252/75 |
| 3,076,768 A | 2/1963 | Boylan | 516/116 |
| 3,202,514 A | 8/1965 | Burges et al. | 426/532 |
| 3,423,340 A | 1/1969 | Marshall et al. | 524/45 |
| 3,669,884 A | 6/1972 | Wright | 508/213 |
| 3,730,931 A | 5/1973 | Simoneau et al. | 521/74 |
| 3,759,827 A | 9/1973 | Groenhof et al. | 507/117 |
| 3,821,114 A | 6/1974 | Brown | 252/78.3 |
| 3,856,701 A | 12/1974 | Householder | 516/118 |
| 3,915,889 A | 10/1975 | Jurd et al. | 252/404 |
| 3,933,702 A | 1/1976 | Caimi et al. | 524/44 |
| 3,937,684 A | 2/1976 | Razzano | 528/14 |
| 4,005,044 A | 1/1977 | Raleigh | 516/74 |
| 4,025,456 A | 5/1977 | Litteral et al. | 252/351 |
| 4,137,189 A | 1/1979 | Holbrook et al. | 252/75 |
| 4,138,349 A | 2/1979 | Brown | 508/214 |
| 4,256,870 A | 3/1981 | Eckberg | 528/15 |
| 4,413,086 A | 11/1983 | Chang et al. | 524/386 |
| 4,514,319 A | 4/1985 | Kulkarni et al. | 516/117 |
| 4,534,891 A | 8/1985 | Boden et al. | 510/101 |
| 4,584,355 A | 4/1986 | Blizzard et al. | 525/477 |
| 4,585,836 A | 4/1986 | Homan et al. | 525/477 |
| 4,591,622 A | 5/1986 | Blizzard et al. | 525/477 |
| 4,655,767 A | 4/1987 | Woodard et al. | 424/448 |
| 4,987,169 A | 1/1991 | Kuwata et al. | 524/267 |
| 5,052,558 A | 10/1991 | Carter | 206/439 |
| 5,130,041 A | 7/1992 | Groenhof | 252/78.3 |
| 5,258,535 A | 11/1993 | Ishikawa et al. | 556/430 |
| 5,298,589 A * | 3/1994 | Buese et al. | 528/21 |
| 5,323,907 A | 6/1994 | Kalvelage | 206/531 |
| 5,359,109 A | 10/1994 | Ritscher et al. | 556/434 |
| 5,455,208 A | 10/1995 | Leung et al. | 501/12 |
| 5,474,783 A | 12/1995 | Miranda et al. | 424/448 |
| 5,493,041 A | 2/1996 | Biggs et al. | 556/453 |
| 5,645,842 A | 7/1997 | Gruning et al. | 424/401 |
| 5,656,386 A | 8/1997 | Scherer et al. | 429/494 |
| 5,670,689 A | 9/1997 | Allandrieu et al. | 556/460 |
| 5,760,116 A | 6/1998 | Kilgour et al. | 524/268 |
| 5,789,516 A | 8/1998 | Graiver et al. | 528/19 |
| 5,811,487 A | 9/1998 | Schulz et al. | 524/862 |
| 5,939,577 A | 8/1999 | Wheeler et al. | 556/477 |
| 6,046,156 A | 4/2000 | Perry | 512/25 |
| 6,054,547 A | 4/2000 | Perry et al. | 528/15 |
| 6,060,546 A | 5/2000 | Powell et al. | 524/267 |

(Continued)

FOREIGN PATENT DOCUMENTS

EP  0332598 A2 *  9/1989
EP  0687718  12/2000

(Continued)

OTHER PUBLICATIONS

Letter/Written Disclosure of the Information Disclosure Statement for the above-referenced application, mailed on Jan. 17, 2012, 2 pages.
Bažnt et al., "Direct synthesis of organohalogenosilanes," Angewandte Chemie (International Edition in English) 7(2):112-120 (1968).
Buchmann, S., "Chapter 8-Main cosmetic vehicles," *Handbook of Cosmetic Science and Technology*, 2nd edition, edited by M. Paye et al., pp. 99-123 (2005).
Fordham, S., ed., "Preparation of organosilanes," *Silicones*, George Newnes, London, pp. 6-73, (1960).
Hayashi, T., "Hydrosilylation of carbon-carbon double bonds," Comprehensive Asymmetric Catalysis, Supp. 2, Jacobsen et al.,(eds.), Springer, Germany, Chap. 7, p. 319, (2004).

(Continued)

*Primary Examiner* — Michael G Hartley
*Assistant Examiner* — Robert Cabral
(74) *Attorney, Agent, or Firm* — Dentons US LLP; Frank J. Miskiel; Stephanie Seidman

(57) ABSTRACT

Provided herein are cyclosiloxane-substituted polysiloxane compounds, compositions that include the polysiloxane compounds, and methods for preparation and use of the polysiloxane compounds. Provided are mechanical lubricant compositions, hydraulic fluid compositions, anti-foam compositions, water repellant agent compositions, release agent compositions, personal care compositions, cosmetic compositions, household care compositions and drug delivery compositions that include one or more of the cyclosiloxane-substituted polysiloxane compounds provided herein.

39 Claims, No Drawings

(56) References Cited

U.S. PATENT DOCUMENTS

| | | | |
|---|---|---|---|
| 6,075,111 | A | 6/2000 | Perry et al. ............... 528/15 |
| 6,077,923 | A | 6/2000 | Perry et al. ............... 528/26 |
| 6,083,901 | A | 7/2000 | Perry et al. ............... 512/2 |
| 6,153,578 | A | 11/2000 | Perry ............... 512/27 |
| 6,221,383 | B1 | 4/2001 | Miranda et al. ............... 424/449 |
| 6,710,020 | B2 | 3/2004 | Tenne et al. ............... 508/103 |
| 7,153,991 | B2 | 12/2006 | Lewis et al. ............... 556/472 |
| 2005/0256286 | A1 | 11/2005 | Asch et al. ............... 528/31 |
| 2008/0193489 | A1 | 8/2008 | De Armond et al. ............... 514/23 |
| 2011/0308259 | A1 | 12/2011 | Wray et al. ............... 62/3.3 |
| 2013/0152608 | A1 | 6/2013 | Wray ............... 62/50.7 |

FOREIGN PATENT DOCUMENTS

| | | |
|---|---|---|
| EP | 1213011 A1 * | 6/2002 |
| EP | 2141188 | 1/2010 |
| JP | H08-003450 | 1/1996 |
| WO | WO 2012/018403 | 2/2012 |

OTHER PUBLICATIONS

IUPAC-IUB, "Abbreviated nomenclature of synthetic poypeptides-polymerized amino acids-revised recommendations," Commission on Biochemical Nomenclature, Biochemistry 11:1726-1731 (1972).
Jensen et al., "Highly enantioselective hydrosilylation of aromatic alkene," J. Am. Chem. Soc. 124(17):4558-4559 (2002).
Lewis, L., "Recent advances in the direct process," Catalyzed Direct Reactions of Silicon, vol. 2, Wiley, U.K., Chap. 26, p. 1581 (1998).
Masaoka et al., "The synthesis of chlorosilanes from alkoxysilanes, silanols, and hydrosilanes with bulky substituents," J. Organomet. Chem. 691(1-2):174-181 (2006).
Meals, R. and F. Lewis, "Basic chemistry," *Silicones*, Reinhold Plastics Applications Series. New York, Reinhold, pp. 98-141 (1959).
Mukbaniani et al., "Organosilicon copolymers with cyclosiloxane fragments in the side chain," *Polymer Yearbook* 18, Pethrick, R. and G. Zaikov, eds., Shrewsbury, UK, Rapra Technology, pp. 141-183 (2003).
Patnode, W. and D. Wilcock, "Methylpoly siloxanes," J. Am. Chem. Soc. 68:358-363 (1946).
Rochow, E., "The direct synthesis of organosilicon compounds," J. Am. Chem. Soc. 67:963-965 (1945).
Takiguchi, T., "Preparation of some organosilanediols and phenylsilanetriol by direct hydrolysis using aniline as hydrogen chloride acceptor," J. Am. Chem. Soc. 81:2359-2361 (1959).
Zhang et al., "Synthesis and ionic conductivity of cyclsolloxanes with ethyleneoxy-containing substituents," Chem. Mater. 17(23):5646-5650 (2005).
Zuev, V. and A. Kalinin, "Synthesis of (Methyl-β-cyanoethyl)cyclosiloxanes," Rus. J. Gen. Chem. 73(4):546-549 (2003).
Letter/Written Disclosure of the Supplemental Information Disclosure Statement for the above-referenced application, mailed on May 7, 2013, 2 pages.
Buchmann, S., "Main cosmetic vehicles," Chapter 8, *Handbook of Cosmetic Science and Technology* (2nd edition, edited by Paye et al., 99-123 (2005).
Gankema et al. "Crosslinkable polar siloxane copolymers for ion detection devices," Adv. Mater. 6:944-947 (1994).
Kirk-Othmer *Encyclopedia of Polymer Science and Technology*, Second Edition, vol. 15, John Wiley & Sons, Inc. (New York: 1989), pp. 204-209 and 234-265 (1989).
International Search Report and Written Opinion, issued Nov. 24, 2011, in connection with International Patent Application No. PCT/US2011/001393, 10 pages.
Response to Written Opinion submitted Apr. 16, 2012, in connection with International Patent Application No. PCT/US2011/001393, 53 pages.
International Preliminary Report on Patentability, issued Nov. 8, 2012, in connection with International Patent Application No. PCT/US2011/001393, 34 pages.
Letter/Written Disclosure of the Supplemental Information Disclosure Statement for the above-referenced application, mailed on Mar. 27, 2014, 3 pages.
Communication pursuant to Article 94(3), issued Feb. 18, 2014, in connection with corresponding European Patent Application No. 11749018.5, 5 pages.
Office Action, issued Feb. 25, 2014, Office Action summary and translation of Office Action, in connection with corresponding Japanese Patent Application No. 2013-523156, 9 pages.
Letter/Written Disclosure of the Supplemental Information Disclosure Statement for the above-referenced application, mailed on Dec. 18, 2013, 2 pages.
Rule 161(1) and 162 Communication, issued Mar. 15, 2013, in connection with European Patent Application No. 11749018.5, 2 pages.
Response to Communication persuant to Rules 161(1) and 162, submitted Aug. 1, 2013, in connection with European Patent Application No. 11749018.5, 32 pages.
Voluntary amendment, submitted Oct. 10, 2013, and instructions for amendment, in connection with Chinese Patent Application No. 201180048233.3, 34 pages.
Letter/Written Disclosure of the Supplemental Information Disclosure Statement for the above-referenced application, mailed on Jun. 16, 2014, 2 pages.
Office Action, issued Apr. 28, 2014, and translation of Office Action, in connection with Chinese Patent Application No. 201180048233.3, 14 pages.

\* cited by examiner

CYCLOSILOXANE-SUBSTITUTED POLYSILOXANE COMPOUNDS, COMPOSITIONS CONTAINING THE COMPOUNDS AND METHODS OF USE THEREOF

RELATED APPLICATIONS

Benefit of priority is claimed to U.S. Provisional Application No. 61/371,079 to Daniel X. Wray, Robert L. De Armond and Michael B. Halsdorff, entitled "CYCLOSILOXANE-SUBSTITUTED POLYSILOXANE COMPOUNDS, COMPOSITIONS CONTAINING THE COMPOUNDS AND METHODS OF USE THEREOF," filed Aug. 5, 2010.

This application also is related to corresponding International Application No. PCT/US2011/01393, filed the same day herewith, entitled "CYCLOSILOXANE-SUBSTITUTED POLYSILOXANE COMPOUNDS, COMPOSITIONS CONTAINING THE COMPOUNDS AND METHODS OF USE THEREOF," which also claims priority to U.S. Provisional Application Ser. No. 61/371,079.

The subject matter of each of the above-referenced applications is incorporated by reference in its entirety.

FIELD

Provided herein are cyclosiloxane-substituted silicone compounds, compositions that include cyclosiloxane-substituted silicone compounds, and methods for use thereof, including in personal care and cosmetic compositions, release agent compositions, anti-foam compositions, personal lubricant compositions, and in lubricant compositions for reduction of friction in mechanical applications, including as silicone lubricant compositions for lubricating hard metal surfaces or soft metal surfaces.

BACKGROUND

Organosilicone compounds and their use are well known in the art. Among the uses of organosilicone compounds are as lubricants, anti-foam agents, release agents, and for applications including cosmetics and personal care compositions, household products, in personal lubricant compositions, and as lubricants in mechanical applications and as hydraulic fluids. U.S. Pat. No. 4,514,319 describes alkyl and polyether functional silicones for the reduction of the surface tension of hydrocarbon oils when they are used in connection with organosilicones. U.S. Pat. No. 5,645,842 describes cosmetic and pharmaceutical preparations.

Silicone lubricants are well known for hard metal surfaces. Such silicone lubricants usually contain an organopolysiloxane polymer which may be dimethylpolysiloxane polymer, a methyl or chlorophenyl or tetrachlorophenyl substituted polysiloxane polymer. Also, there are silicone lubricants in which the base lubricating fluid is composed of a trifluoropropyl substituted organopolysiloxane polymer. U.S. Pat. No. 2,837,482 describes dimethyl-polysiloxanes with various chlorinated additives for lubricating hard metal surfaces. Although methyl- and di-methylpolysiloxanes can be used as lubricants, it often is necessary to also add a chlorinated additive. Conventional chloride additives also are added to methyl tetrachlorophenyl substituted polysiloxanes to form ferrous chloride hydrate compounds at the surface of the hard metal which is being lubricated so that the oxy chloride will shear off under stress and prevent undue wear against the hard metal surface (e.g., see U.S. Pat. No. 4,138,349). Accordingly, a need exists for a polysiloxane that does not require a chlorine additive in order to function as an effective lubricant for hard or soft metals.

Silicone fluids also are known to be beneficial in release coatings (e.g., see U.S. Pat. Nos. 3,933,702, 4,256,870 and 4,413,086). Silicone based release coatings are useful in applications where relatively non-adhesive surfaces are required. Single sided liners, for example, backing papers for pressure sensitive adhesive labels, are usually adapted to temporarily retain the labels without affecting the adhesive properties of the labels. Double sided liners for example, interleaving papers for double sided and transfer tapes, are used to ensure the protection and desired unwind characteristics of a double sided self-adhesive tape or adhesive film.

Improvements in the performance of release coatings are continuously being sought with respect to, for example, ease of cure, i.e. the decrease in cure times at relatively low temperatures, release performance and anchorage of coatings to various substrates, including polypropylene, polyethylene and polyester as well as paper and metals. Accordingly, a need exists for a silicone based release coating with improved release performance.

Silicone fluids also are used in hydraulic fluids (e.g., see U.S. Pat. Nos. 3,759,827 and 5,130,041). Hydraulic systems, in which power is transferred from one place to another, are used extensively in industrial equipment, farm equipment, and transportation equipment. Examples of such equipment are lifters, jacks, elevators, mills, presses, and braking and power steering systems for vehicles. High pressures and temperatures, which are frequently present in hydraulic systems, place high demands on the thermal and oxidative stability of the fluid used as the hydraulic medium. In addition, the lubricity of the hydraulic fluid is especially important with hydraulic systems where a pump is used to pressurize or move the hydraulic fluid from one place to another.

Polyorganosiloxanes have been recognized as having exceptional thermal and oxidative stability, compatibility with seal materials, and high viscosity indices, and properties make polyorganosiloxanes useful as hydraulic fluids. Many of the polyorganosiloxanes known in the art generally exhibit low surface tension, which tends to cause them to have marginal lubricity on metals. Many applications of hydraulic fluids require that the viscosity of the fluid change as little as possible over the intended operating temperature range. Many of the known polyorganosiloxanes exhibit viscosity variation as a function of temperature relative to organic oils. This property makes many of the polyorganosiloxanes unsuitable for use as hydraulic fluids. Accordingly, a need exists for a polysiloxanes that exhibit low viscosity variation as a function of temperature and good thermal and oxidative stability for use as a hydraulic fluid.

Silicones are widely used as anti-foaming agents. Examples of silicone anti-foaming compositions are for instance to be found in U.S. Pat. Nos. 2,894,913; 3,423,340; 3,076,768 and 3,856,701. Dimethylpolysiloxane polymers are widely known in the silicone industry for use as anti-foam agents. The chemical, food, petroleum, textile and pharmaceutical industries in many cases during the processing of material experience the undesirable formation of foam in some parts of its processes. A foam is formed when the rate of decay of foam is slower than the creation of new foam bubbles. Accordingly, when you have such a condition in a chemical or mechanical process there results the creation of an ever increasing foam, which is so stabilized that it does not decay very rapidly. It is desirable to remove or reduce the foaming in many processes, since the unwanted foam may create a hazard, such as a fire hazard, or the foam can take up a considerable amount of space, thus requiring more space in which to carry out the process. Further, the presence of foam may make the process itself difficult to operate efficiently. In such cases, it is desirable to use some means of reducing or completely removing the foam. Although there are many ways of defoaming a process, the most desirable is a chemical means, such as addition of an anti-foam, since this usually is the most efficient way to remove the foam. Thus, as is well known in industry, the addition of a small amount of an anti-foaming agent to a foamed composition, results in a rapid break-up of the foam. Improvements in the performance of silicone-based anti-foams are continuously being sought. Accordingly, a need exists for a polysiloxane compound that exhibits improved anti-foam activity when compared to conventional anti-foam agents.

Silicone fluids also are known to be useful in making a substrate water repellant. Examples of substrates for which it can be desired to treat to render the substrate water repellant include concrete, textiles, paper objects, wood objects, metal, ceramics, and masonry surfaces such as the exterior of buildings. Such surfaces are adversely affected, progressively degraded and ultimately deteriorated by exposure to water. For example, in masonry applications, repeated wetting, water penetration and absorption, and freezing and thawing results in erosion and scaling, spalling and cracking, peeling and flaking, efflorescence and crusting, soiling and staining, warping and splitting, and corrosion. Such damage can be substantially prevented by properly treating the substrates to render the substrate water repellant.

In general, it has been necessary to prepare a special and individual composition for treating a particular type of surface to render the substrate water repellant. Thus, for example, in the treatment of exterior surfaces of buildings, a different composition is normally used for treating the concrete, bricks or other masonry surfaces than is used for treating wood or metal surfaces that may be a part of the exterior of such buildings. This is largely due to the fact that different water repellant compositions will have different degrees of effectiveness on different surfaces to be treated. Up to now, no universal water repellant composition is known which can be used on such diverse surfaces as, e.g., masonry, wood, paper, textiles and glass. With respect to the water repellant compositions used in the building and the construction field, the known compositions usually require several days to several weeks at ambient temperature to cure or dry. An example of such prior art composition is the methyl silicone resins disclosed in U.S. Pat. No. 2,574,168. Such prior art silicone compounds have relatively good water repellant properties but they usually require several days to cure or dry at ambient air temperature. If such prior art silicone compounds are applied to a wet surface, or if they are wetted shortly after they are applied to a dry surface, they tend to be relatively ineffective to render the coated surface water repellant. It is due to this relatively long curing or drying time requirement that silicone water repellant compositions have been limited in their usage. Particularly in areas where there is a wet or rainy season, such silicone compositions are often not employed at all. Accordingly, a need exists for a polysiloxane compound that exhibits good water repellent activity, good film forming and rapid drying when compared to conventional silicone agents.

Silicone fluids are used in personal care and cosmetic compositions. Some of the silicone fluids of the prior art are of low viscosity. While these low molecular weight silicones provide the desired feel characteristics, they are also highly flowable liquids. Thus, they are not easily held in a formulation, preferring rather to separate and flow out of a given container or flow uncontrollably across the skin when used in a specific application. Accordingly, a need exists for a polysiloxane compound that exhibits good spreadability, good film forming and that provides improved feel characteristics compared to conventional silicone agents.

SUMMARY

Accordingly, provided herein are capped and uncapped organosilicone compounds having at least one cyclosiloxane group thereon. These cyclosiloxane-substituted polysiloxanes exhibits good spreadability, good film forming and provide improved feel characteristics compared to conventional silicone agents. These cyclosiloxane-substituted polysiloxanes have utility in compositions for lubrication of surfaces, including the interacting surfaces of hard and/or soft metals, in mechanical lubricant fluid compositions, in hydraulic fluid compositions, in anti-foam compositions, in water repellent agent compositions, in release agent compositions, in personal care compositions, in cosmetic compositions and in household care compositions.

Also provided are methods for preparing organosilicone compounds, such as polysiloxanes, having at least one cyclosiloxane group as a substituent thereon.

Also provided are cosmetic and personal care compositions that include polysiloxane compounds having at least one cyclosiloxane group as a substituent thereon.

Also provided are silicone lubricant compositions that include polysiloxane compounds having at least one cyclosiloxane group as a substituent thereon, where the compositions decrease the wear of interacting surfaces lubricated by such silicone lubricant compositions.

Also provided are silicone lubricant compositions that include polysiloxane compounds having at least one cyclosiloxane group as a substituent thereon, where the compositions decrease the wear of interacting soft metal surfaces lubricated by such silicone lubricant compositions.

Also provided are silicone lubricant compositions that include polysiloxane compounds having at least one cyclosiloxane group as a substituent thereon, where the compositions decrease the wear of interacting hard metal surfaces lubricated by such silicone lubricant compositions.

Also provided are silicone lubricant compositions that include polysiloxane compounds having at least one cyclosiloxane group as a substituent thereon, where the compositions decrease the wear of interacting hard or soft metal surfaces against each other when lubricated by such silicone lubricant compositions.

Also provided are silicone lubricant compositions that include polysiloxane compounds having at least one cyclosiloxane group as a substituent thereon, where the compositions decrease the wear of interacting steel surfaces lubricated by such silicone lubricant compositions.

Also provided are silicone lubricant compositions that include polysiloxane compounds having at least one cyclosiloxane group as a substituent thereon, where the compositions decrease the wear of interacting iron, iron alloy, steel or steel-containing surfaces lubricated by such silicone lubricant compositions.

Also provided are silicone lubricant compositions that include polysiloxane compounds having at least one cyclosiloxane group thereon, where the compositions decrease the wear of interacting aluminum or aluminum alloy surfaces lubricated by such silicone lubricant compositions.

Also provided are silicone lubricant compositions that include polysiloxane compounds having at least one cyclosiloxane group as a substituent thereon, where the compositions decrease the wear of interacting surfaces of copper, bronze, brass and/or alloys thereof lubricated by such silicone lubricant compositions.

Also provided are silicone lubricant compositions that include polysiloxane compounds having at least one cyclosiloxane group as a substituent thereon, where the polysiloxane has a viscosity varying from 5 to 150,000 cP when measured at 25° C.

Also provided are release coating compositions that include a polysiloxane compounds having at least one cyclosiloxane group as a substituent thereon.

Also provided are cyclosiloxane-substituted polysiloxanes that exhibit low viscosity variation as a function of temperature. Also provided are cyclosiloxane-substituted polysiloxanes that exhibit good thermal stability. Also provided are cyclosiloxane-substituted polysiloxanes that exhibit good oxidative stability. Such polysiloxanes are useful as a hydraulic fluid or as a component in hydraulic fluid compositions. Also provided are polysiloxanes that exhibit good compressibility over a wide range of pressures.

Also provided are silicone anti-foam compositions that include a cyclosiloxane-substituted polysiloxane as provided herein.

Also provided is a process for forming an improved anti-foam silicone composition having as an ingredient a cyclosiloxane-substituted polysiloxane polymer.

Also provided is a process for efficiently defoaming a foam in a mixture by adding to the mixture a small quantity of a composition that includes a cyclosiloxane-substituted polysiloxane.

Also provided are water repellant compositions that include one or more cyclosiloxane-substituted polysiloxanes provided herein. Such water repellant compositions can be applied to a great variety of substrates to render the substrates water repellant.

Also provided is a water repellant composition that is quick acting in providing water repellency, and that includes a cyclosiloxane-substituted polysiloxane compound.

Also provided is an improved method for rendering substrates water repellant.

Also provided are cyclosiloxane-substituted polysiloxane compounds that exhibit good water repellent activity, good film forming and rapid drying when compared to conventional silicone agents.

Also provided are cyclosiloxane-substituted polysiloxanes that exhibit improved handfeel characteristics compared to conventional silicone agents. Also provided are personal care and cosmetic compositions that include one or more cyclosiloxane-substituted polysiloxanes provided herein.

Provided are substituted polysiloxanes of formula I:

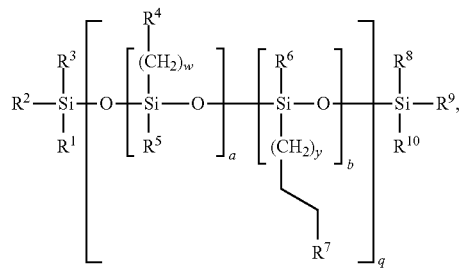

(I)

wherein:
$R^1$ and $R^2$ each independently is selected from among $C_1$-$C_{20}$ alkyl and substituted $C_1$-$C_{20}$ alkyl;

$R^3$ is selected from among $C_1$-$C_{20}$ alkyl, substituted $C_1$-$C_{20}$ alkyl, $C_3$-$C_{20}$ cycloalkyl, substituted $C_3$-$C_{20}$ cycloalkyl, a cyclosiloxane having three or more Si atoms and a substituted cyclosiloxane having three or more Si atoms;

each occurrence of $R^4$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl, a cyclosiloxane having three or more Si atoms and a substituted cyclosiloxane having three or more Si atoms;

each occurrence of $R^5$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl and butylated aryloxypropyl;

each occurrence of $R^6$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl and butylated aryloxypropyl;

each occurrence of $R^7$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl, a cyclosiloxane having three or more Si atoms and a substituted cyclosiloxane having three or more Si atoms;

$R^8$ and $R^9$ each independently is selected from among alkyl and substituted alkyl;

$R^{10}$ is selected from among alkyl, substituted alkyl, cycloalkyl, substituted cycloalkyl, a cyclosiloxane having three or more Si atoms and a substituted cyclosiloxane having three or more Si atoms;

a is selected from among 0 to 50;
b is selected from among 1 to 100;
q is selected from among 2 to 20;
w is selected from among 0 to 10;
y is selected from among 0 to 10;
with the proviso that $R^7$ is a cyclosiloxane when b=1.

The compounds of formula I include at least 1 optionally substituted cyclosiloxane substituent.

Also provided are cyclosiloxane-substituted polysiloxanes of Formula IA:

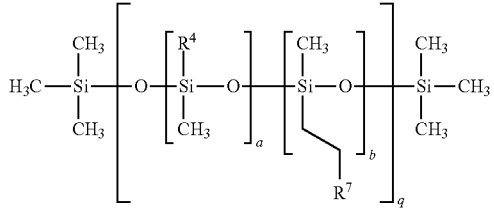

where each occurrence of $R^4$ independently is selected from among substituted or unsubstituted $C_1$-$C_8$ alkyl, substituted or unsubstituted $C_1$-$C_8$ haloalkyl, substituted or unsubstituted $C_6$-$C_{12}$ aryl, and substituted or unsubstituted $C_6$-$C_{12}$ heteroaryl; $R^7$ is an optionally substituted cyclosiloxane having at least three Si atoms; a is 0-50; b is 1-100 and q is 2-50. In some embodiments, $R^7$ is an optionally substituted cyclosiloxane having 3, 4, 5, 6, 7, 8, 9, 10, 11, 12, 13, 14, 15, 16, 17, 18, 19 or 20 Si atoms. In some embodiments, $R^7$ is a cyclosiloxane substituted with one or more substituents selected from among halogen, hydroxyl, $C_1$-$C_6$ alkyl, $C_1$-$C_6$ alkoxyl, $C_1$-$C_6$ haloalkyl, $C_1$-$C_6$ heteroalkyl, $C_3$-$C_{10}$ aryl, $C_3$-$C_{10}$ heteroaryl and $C_3$-$C_{10}$ aryl substituted with halogen or $C_1$-$C_6$ haloalkyl.

In some embodiments, the compounds of Formula IA have the formula:

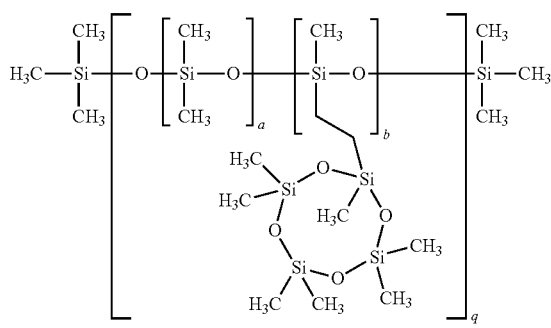

where a is 0-50; b is 1-100; and q is 2-50.

Also provided are cyclosiloxane-substituted polysiloxanes that contain a copolymer that includes a cyclosiloxane and a dialkylsiloxane, where the cyclosiloxane and/or the dialkylsiloxane can be substituted. The cyclosiloxane can include from 3 to 15 Si atoms, particularly from 3 to 10 Si atoms. In some embodiments, the copolymer includes a tetrasiloxanyl, pentasiloxanyl, hexasiloxanyl, heptasiloxanyl, octasiloxanyl, enneasiloxanyl or nonasiloxanyl, decasiloxanyl, hendecasiloxanyl, dodecasiloxanyl. tridecasiloxanyl, tetradecasiloxanyl, pentadecasiloxanyl, hexadecasiloxanyl, heptadecasiloxanyl, octadecasiloxanyl, nonadecasiloxanyl or an icosasiloxanyl, or a combination thereof. The cyclosiloxane can include one or two $C_1$-$C_6$ substituents on one or more of the Si atoms. In some of the copolymers provided herein, non-adjacent Si atoms can include a non-hydrogen substituent, such as a halogen, $C_1$-$C_6$ alkyl or $C_1$-$C_6$ haloalkyl or a combination thereof. For some copolymers, each Si includes a non-hydrogen substituent, such as a halogen, $C_1$-$C_6$ alkyl or $C_1$-$C_6$ haloalkyl or a combination thereof. For some copolymers, none of the Si atoms includes hydrogen as a substituent.

Also provided is a cyclosiloxane-substituted polysiloxane that includes a (cyclosiloxane-ethyl)-alkylsiloxane dialkylsiloxane copolymer. The (cyclosiloxane-ethyl)-alkylsiloxane can constitute from about 2% to about 98% of the copolymer, or from about 5% to about 95% (cyclosiloxane-ethyl)-alkylsiloxane, or from about 5% to about 90% (cyclosiloxane-ethyl)-alkylsiloxane, or from about 5% to about 85% (cyclosiloxane-ethyl)-alkylsiloxane, or from about 5% to about 80% (cyclosiloxane-ethyl)-alkylsiloxane, or from about 5% to about 75% (cyclosiloxane-ethyl)-alkylsiloxane, or from about 5% to about 70% (cyclosiloxane-ethyl)-alkylsiloxane, or from about 5% to about 65% (cyclosiloxane-ethyl)-alkylsiloxane, or from about 5% to about 60% (cyclosiloxane-ethyl)-alkylsiloxane or from about 5% to about 55% (cyclosiloxane-ethyl)-alkylsiloxane, or from about 5% to about 50% (cyclosiloxane-ethyl)-alkylsiloxane or from about 10% to about 50% (cyclosiloxane-ethyl)-alkylsiloxane or from about 15% to about 65% (cyclosiloxane-ethyl)-alkylsiloxane or from about 20% to about 70% (cyclosiloxane-ethyl)-alkylsiloxane or from about 25% to about 75% (cyclosiloxane-ethyl)-alkylsiloxane.

Also provided are cyclosiloxane-substituted polysiloxanes that are copolymers that include [2-(heptaalkyl-cyclotetrasiloxanyl)ethyl]-alkylsiloxane subunits. The alkyl group in each subunit can be $C_1$-$C_6$ alkyl. The cyclosiloxane-substituted polysiloxane copolymer can include as one or more subunits a [2-(heptamethyl-cyclotetrasiloxanyl)ethyl]-alkylsiloxane, [2-(heptaethyl-cyclotetra-siloxanl)ethyl]-alkylsiloxane, [2-(heptapropyl-cyclotetrasiloxanyl)ethyl]-alkylsiloxane, [2-(heptamethyl-cyclotetrasiloxanyl)ethyl]-methylsiloxane, [2-(heptamethyl-cyclotetra-siloxanyl)ethyl]-ethylsiloxane, [2-(heptamethyl-cyclotetrasiloxanyl)ethyl]-propylsiloxane, [2-(heptamethyl-cyclotetrasiloxanyl)-ethyl]-butylsiloxane or combinations thereof.

Also provided are cyclosiloxane-substituted polysiloxanes that are copolymers that include a dialkylsiloxane. The copolymer can include a dimethylsiloxane, a diethylsiloxane, dipropylsiloxane, dibutylsiloxane, a di(trifluoromethyl)siloxane, a methyl-trifluoromethylsiloxane or combinations thereof. The cyclosiloxane-substituted polysiloxane can be a copolymer that includes [2-(heptaalkyl-cyclotetrasiloxanyl) ethyl]-alkylsiloxane subunits and dialkylsiloxane subunits. The cyclosiloxane-substituted polysiloxane can be a copolymer in which the dialkylsiloxane subunits alternate with the [2-(heptaalkyl-cyclotetrasiloxanyl)ethyl]-alkylsiloxane subunits. In some copolymers, two or more dialkylsiloxane subunits are present between [2-(heptaalkyl-cyclotetrasiloxanyl)-ethyl]-alkylsiloxane subunits. The cyclosiloxane-substituted polysiloxane can include a [2-(heptaalkyl-cyclotetrasiloxanyl)ethyl]-methylsiloxane dimethylsiloxane copolymer.

Also provided are polysiloxanes of formula I:

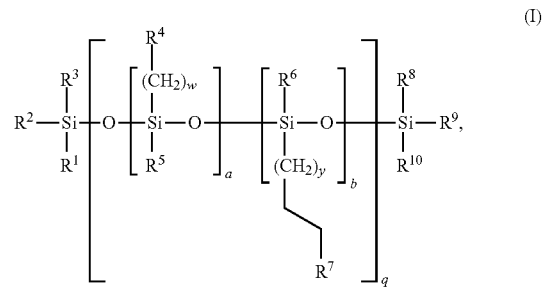

where $R^1$ and $R^2$ each independently is selected from among $C_1$-$C_{20}$ alkyl and substituted $C_1$-$C_{20}$ alkyl or $C_2$-$C_{20}$ alkyl and substituted $C_2$-$C_{20}$ alkyl; $R^3$ is selected from among $C_1$-$C_{20}$ alkyl, substituted $C_1$-$C_{20}$ alkyl, $C_3$-$C_{20}$ cycloalkyl, substituted $C_3$-$C_{20}$ cycloalkyl, a cyclosiloxane having three or more Si atoms and a substituted cyclosiloxane having three or more Si atoms; each occurrence of $R^4$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl, a cyclosiloxane having three or more Si atoms and a substituted cyclosiloxane having three or more Si atoms; each occurrence of $R^5$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl and butylated aryloxypropyl; each occurrence of $R^6$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl and butylated aryloxypropyl; each occurrence of $R^7$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl, a cyclosiloxane having three or more Si atoms and a substituted cyclosiloxane having three or more Si atoms; $R^8$ and $R^9$ each independently is selected from among alkyl and substituted alkyl; $R^{10}$ is selected from among alkyl, substituted alkyl, cycloalkyl, substituted cycloalkyl, a cyclosiloxane having three or more Si atoms and a substituted cyclosiloxane having three or more Si atoms; a is selected from among 1 to 50; b is selected from among 1 to 50; q is selected from among 2 to 20; w is selected from among 0 to 10; y is selected from among 0 to 10; with the proviso that at least one of $R^4$ or $R^7$ in at least one subunit q is a cyclosiloxane.

In some embodiments, at least one $R^7$ is an optionally substituted cyclosiloxane. In some embodiments, at least one $R^4$ is a cyclosiloxane. The cyclosiloxane can be of any size, such as a cycloheptasiloxane, cyclohexasiloxane, cyclopentasiloxane, cyclotetrasiloxane and cyclotrisiloxane. Exemplary cyclosiloxanes include decamethyl cyclopentasiloxane, dodecamethyl cyclohexasiloxane, tetradecamethyl cycloheptasiloxane, octamethyl cyclotetrasiloxane, decamethyl cyclopentasiloxane, dodecamethyl cyclohexasiloxane and tetradecamethyl cycloheptasiloxane. The cyclosiloxane can be unsubstituted or substituted with one or more than one substituent selected from among alkyl, haloalkyl, heteroalkyl, cycloalkyl, optionally substituted aryl, heteroaryl, non-aromatic heterocycle, hydroxy, alkoxy, aryloxy, mercapto, alkylthio, arylthio, cyano, halo, carbonyl, thiocarbonyl, O-carbamyl, N carbamyl, O thiocarbamyl, N thiocarbamyl, C amido, N amido, S-sulfonamido, N sulfonamido, azido, diazo, imino, formylamino, halo, fluoro, iodo, oxo, cyano, cyanato, carboxy, C trihalomethanesulfonyl, O carboxy, isocyanato, thiocyanato, isothiocyanato, nitro, silyl, and amino, including mono- and di-substituted amino groups, and the protected derivatives of amino groups. In some embodiments, one or more $R^7$ is cyclosiloxane substituted with one or more moieties selected from among halogen, hydroxyl, $C_1$-$C_6$ alkyl, $C_1$-$C_6$ alkoxy, $C_1$-$C_6$ haloalkyl, $C_1$-$C_6$ heteroalkyl, $C_3$-$C_{10}$ aryl, $C_3$-$C_{10}$ heteroaryl and $C_3$-$C_{10}$ aryl substituted with halogen or $C_1$-$C_6$ haloalkyl.

In the compounds provided herein, $R^1$ can be selected from among an optionally substituted $C_1$-$C_{10}$ alkyl, an optionally substituted $C_1$-$C_6$ alkyl and an optionally substituted $C_2$-$C_{10}$ alkyl. Exemplary $R^1$ substituents include methyl, ethyl, propyl, butyl, pentyl, hexyl, heptyl, octyl, nonyl and decyl, which can be substituted or unsubstituted. In the compounds provided herein, $R^2$ can be selected from among an optionally substituted $C_1$-$C_{10}$ alkyl, an optionally substituted $C_1$-$C_6$ alkyl and an optionally substituted $C_2$-$C_{10}$ alkyl. $R^2$ substituents can include methyl, ethyl, propyl, butyl, pentyl, hexyl, heptyl, octyl, nonyl and decyl, which can be substituted or unsubstituted. In the compounds provided herein, $R^3$ can be selected from among optionally substituted $C_1$-$C_{10}$ alkyl, optionally substituted $C_2$-$C_{10}$ alkyl, optionally substituted $C_1$-$C_6$ alkyl, optionally substituted $C_3$-$C_{20}$ cycloalkyl, optionally substituted $C_3$-$C_6$ cycloalkyl, an optionally substituted $C_6$-$C_{10}$ cycloalkyl, and an optionally substituted cyclosiloxane having three or more Si atoms. $R^3$ substituents can include methyl, ethyl, propyl, butyl, pentyl, hexyl, heptyl, octyl, nonyl and decyl, which can be substituted or unsubstituted. In some embodiments, $R^3$ can be an optionally substituted cyclosiloxane having at least four Si atoms or having 4-20 Si atoms.

In the compounds provided herein, the $R^4$ in each subunit a independently can be selected from among optionally substituted $C_1$-$C_{10}$ alkyl, optionally substituted $C_2$-$C_{10}$ alkyl, optionally substituted $C_1$-$C_6$ alkyl, optionally substituted $C_1$-$C_{20}$ haloalkyl, optionally substituted $C_2$-$C_{10}$ haloalkyl, optionally substituted $C_6$-$C_{20}$ aryl, optionally substituted $C_6$-$C_{20}$ heteroaryl, an optionally substituted cyclosiloxane having three or more Si atoms and an optionally substituted cyclosiloxane having 3-20 Si atoms. The $R^4$ in each subunit a independently can be selected from among optionally substituted $C_1$-$C_{10}$ alkyl, optionally substituted $C_2$-$C_8$ alkyl, optionally substituted $C_1$-$C_{10}$ haloalkyl, optionally substituted $C_6$-$C_{18}$ aryl, optionally substituted $C_6$-$C_{12}$ aryl, optionally substituted $C_6$-$C_{10}$ aryl, optionally substituted $C_6$-$C_{18}$ heteroaryl, optionally substituted $C_6$-$C_{12}$ heteroaryl and an optionally substituted $C_6$-$C_{10}$ heteroaryl. $R^4$ substituents can include methyl, ethyl, propyl, butyl, pentyl, hexyl, heptyl, octyl, nonyl and decyl, which can be substituted or unsubstituted, such as with one or more halogens. For example, any of the $R^4$ substituents can be a trifluoromethyl, trifluoroethyl or trifluoropropyl group. One or more of the $R^4$ substituents can be an aryl, such as an optionally substituted phenyl. Any one of the $R^4$ substituents can be an optionally substituted cyclosiloxane, where the cyclosiloxane has three or four or more Si atoms. Any of the $R^4$ substituents can be an optionally substituted cyclosiloxane having at least four Si atoms or having 4-20 Si atoms.

In some embodiments, the polysiloxanes provided herein include $R^4$ in at least two subunits a that is a cyclosiloxane having at least four Si atoms, in which at least one Si atom is substituted with a moiety selected from among alkyl, haloalkyl, heteroalkyl, cycloalkyl, optionally substituted aryl, heteroaryl, non-aromatic heterocycle, hydroxy, alkoxy, aryloxy, mercapto, alkylthio, arylthio, cyano, halo, carbonyl, thiocarbonyl, O-carbamyl, N carbamyl, O thiocarbamyl, N thiocarbamyl, C amido, N amido, S-sulfonamido, N sulfonamido, azido, diazo, imino, formylamino, fluoro, iodo, oxo, cyano, cyanato, carboxy, C trihalomethanesulfonyl, O carboxy, isocyanato, thiocyanato, isothiocyanato, nitro, silyl, and amino, and mono- and di-substituted amino groups. In some embodiments, the polysiloxanes provided herein include $R^4$ in at least two subunits a that is a cyclosiloxane having at least four Si atoms, in which at least one Si atom is substituted with a moiety selected from among halogen, hydroxyl, $C_1$-$C_6$ alkyl, $C_1$-$C_6$ alkoxy, $C_1$-$C_6$ haloalkyl, $C_1$-$C_6$ heteroalkyl, $C_3$-$C_{10}$ aryl, $C_3$-$C_{10}$ heteroaryl and $C_3$-$C_{10}$ aryl substituted with halogen or $C_1$-$C_6$ haloalkyl.

In the compounds provided herein, the $R^5$ in each subunit a independently can be an optionally substituted $C_1$-$C_{10}$ alkyl, optionally substituted $C_1$-$C_6$ alkyl, optionally substituted $C_2$-$C_{10}$ alkyl, optionally substituted $C_1$-$C_{20}$ haloalkyl, optionally substituted $C_1$-$C_{10}$ haloalkyl, optionally substituted $C_2$-$C_{10}$ haloalkyl, optionally substituted $C_6$-$C_{20}$ aryl, optionally substituted $C_6$-$C_{18}$ aryl, optionally substituted $C_6$-$C_{12}$ aryl, optionally substituted $C_6$-$C_{10}$ aryl, optionally substituted $C_6$-$C_{20}$ heteroaryl, optionally substituted $C_6$-$C_{18}$ heteroaryl, optionally substituted $C_6$-$C_{12}$ heteroaryl, optionally substituted $C_6$-$C_{10}$ heteroaryl or a butylated aryloxypropyl. Any one or more of the $R^5$ in each subunit a independently can be selected from among methyl, ethyl, propyl, butyl, pentyl, hexyl, heptyl, octyl, nonyl and decyl, which can be substituted or unsubstituted, such as with one or more halogens. For example, any of the $R^5$ substituents can be a trifluoromethyl, trifluoroethyl or trifluoropropyl group. One or more of the $R^5$ substituents can be an aryl, such as an optionally substituted phenyl. In some embodiments, at least one $R^5$ is butylated aryloxypropyl or at least one $R^5$ is trifluoropropyl or at least one $R^5$ is phenyl.

In the compounds provided herein, the $R^6$ in each subunit b independently can be selected from among optionally substituted $C_1$-$C_{10}$ alkyl, optionally substituted $C_2$-$C_{10}$ alkyl, optionally substituted $C_1$-$C_{20}$ haloalkyl, optionally substituted $C_1$-$C_{10}$ haloalkyl, optionally substituted $C_2$-$C_{10}$ haloalkyl, optionally substituted $C_1$-$C_6$ haloalkyl, optionally substituted $C_6$-$C_{20}$ aryl, optionally substituted $C_6$-$C_{18}$ aryl, optionally substituted $C_6$-$C_{12}$ aryl, optionally substituted $C_6$-$C_{10}$ aryl, optionally substituted $C_6$-$C_{20}$ heteroaryl, optionally substituted $C_6$-$C_{18}$ heteroaryl, optionally substituted $C_6$-$C_{12}$ heteroaryl, optionally substituted $C_6$-$C_{10}$ heteroaryl, and butylated aryloxypropyl. Any one or more of the $R^6$ in each subunit b independently can be selected from among methyl, ethyl, propyl, butyl, pentyl, hexyl, heptyl, octyl, nonyl and decyl, which can be substituted or unsubstituted, such as with one or more halogens. For example, any of the $R^6$ substituents can be a trifluoromethyl, trifluoroethyl or trifluoropropyl group. One or more of the $R^6$ substituents can be an aryl, such as an optionally substituted phenyl. In some embodiments, at least one $R^6$ is butylated aryloxypropyl or at least one $R^6$ is trifluoropropyl or at least one $R^6$ is phenyl.

In the compounds provided herein, the $R^7$ in each subunit b independently can be an optionally substituted $C_1$-$C_{10}$ alkyl, optionally substituted $C_2$-$C_{10}$ alkyl, optionally substituted $C_1$-$C_6$ alkyl, optionally substituted $C_1$-$C_{20}$ haloalkyl, optionally substituted $C_1$-$C_{10}$ haloalkyl, optionally substituted $C_1$-$C_6$ haloalkyl, optionally substituted $C_2$-$C_{10}$ haloalkyl, optionally substituted $C_6$-$C_{20}$ aryl, optionally substituted $C_6$-$C_{18}$ aryl, optionally substituted $C_6$-$C_{12}$ aryl, optionally substituted $C_6$-$C_{10}$ aryl, optionally substituted $C_6$-$C_{20}$ heteroaryl, optionally substituted $C_6$-$C_{18}$ heteroaryl, optionally substituted $C_6$-$C_{12}$ heteroaryl, optionally substituted $C_6$-$C_{10}$ heteroaryl, an optionally substituted cyclosiloxane having three or more Si atoms or an optionally substituted cyclosiloxane having 3-20 Si atoms. Any one or more of the $R^7$ in each subunit b independently can be selected from among methyl, ethyl, propyl, butyl, pentyl, hexyl, heptyl, octyl, nonyl and decyl, which can be substituted or unsubstituted, such as with one or more halogens. For example, any of the $R^7$ substituents can be a trifluoromethyl, trifluoroethyl or trifluoropropyl group. One or more of the $R^7$ substituents can be an aryl, such as an optionally substituted phenyl. In some embodiments, at least one $R^7$ is butylated aryloxypropyl or at least one $R^7$ is trifluoropropyl or at least one $R^7$ is phenyl.

In some embodiments, the $R^7$ in at least two subunits b is an optionally substituted cyclosiloxane having at least four Si atoms or having 4-20 Si atoms. In some of the polysiloxanes, the $R^7$ in at least two subunits b is cyclosiloxane having at least four Si atoms, in which at least one Si atom is substituted with a moiety selected from among alkyl, haloalkyl, heteroalkyl, cycloalkyl, optionally substituted aryl, heteroaryl, non-aromatic heterocycle, hydroxy, alkoxy, aryloxy, mercapto, alkylthio, arylthio, cyano, halo, carbonyl, thiocarbonyl, O-carbamyl, N carbamyl, O thiocarbamyl, N thiocarbamyl, C amido, N amido, S-sulfonamido, N sulfonamido, azido, diazo, imino, formylamino, fluoro, iodo, oxo, cyano, cyanato, carboxy, C trihalomethanesulfonyl, O carboxy, isocyanato, thiocyanato, isothiocyanato, nitro, silyl, and amino, and mono- and di-substituted amino groups. Some of the polysiloxanes provided herein include an $R^7$ in at least two subunits b that is a cyclosiloxane having at least four Si atoms, in which at least one Si atom is substituted with a moiety selected from among halogen, hydroxyl, $C_1$-$C_6$ alkyl, $C_1$-$C_6$ alkoxy, $C_1$-$C_6$ haloalkyl, $C_1$-$C_6$ heteroalkyl, $C_3$-$C_{10}$ aryl, $C_3$-$C_{10}$ heteroaryl and $C_3$-$C_{10}$ aryl substituted with halogen or $C_1$-$C_6$ haloalkyl.

In the compounds provided herein, $R^8$ can selected from among an optionally substituted $C_1$-$C_{10}$ alkyl, an optionally substituted $C_1$-$C_6$ alkyl and an optionally substituted $C_2$-$C_{10}$ alkyl. Exemplary $R^2$ substituents include methyl, ethyl, propyl, butyl, pentyl, hexyl, heptyl, octyl, nonyl and decyl, which can be substituted or unsubstituted. In the compounds provided herein, $R^9$ can selected from among an optionally substituted $C_1$-$C_{10}$ alkyl, an optionally substituted $C_1$-$C_6$ alkyl and an optionally substituted $C_2$-$C_{10}$ alkyl. Exemplary $R^9$ substituents include methyl, ethyl, propyl, butyl, pentyl, hexyl, heptyl, octyl, nonyl and decyl, which can be substituted or unsubstituted.

In the compounds provided herein, $R^{10}$ can selected from among optionally substituted $C_1$-$C_{10}$ alkyl, optionally substituted $C_2$-$C_{10}$ alkyl, optionally substituted $C_1$-$C_6$ alkyl, optionally substituted $C_3$-$C_{20}$ cycloalkyl, optionally substituted $C_3$-$C_6$ cycloalkyl, an optionally substituted $C_6$-$C_{10}$ cycloalkyl, and an optionally substituted cyclosiloxane having three or more Si atoms. $R^{10}$ substituents can include methyl, ethyl, propyl, butyl, pentyl, hexyl, heptyl, octyl, nonyl and decyl, which can be substituted or unsubstituted. In some embodiments, $R^{10}$ can be an optionally substituted cyclosiloxane having at least four Si atoms or having 4-20 Si atoms or having 4, 5, 6, 7, 8, 9, 10, 11, 12, 13, 14, 15, 16, 17, 18, 19 or 20 Si atoms.

In the compounds provided herein, a can be 0-50, 1-25, 1-10, 1-5, 2-5, 2-30, 5-50, 5-40, 10-30 or any one of 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50. In the compounds provided herein, b can be 1-25, 1-15, 1-10, 1-5, 2-5, 2-25, 5-25, 5-40, 10-30 or any one of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50.

In the compounds provided herein, q can be 2-15, 2-10, 2-5, 5-10, 5-15, 10-15, 10-20 or any one of 2, 3, 4, 5, 6, 7, 8, 9, 10, 11, 12, 13, 14, 15, 16, 17, 18, 19 or 20. In the compounds provided herein, w can be 0-5, 1-10, 5-10, 3-6, 1-3, 8-10 or any one of 0, 1, 2, 3, 4, 5, 6, 7, 8, 9 or 10. In the compounds provided herein, y can be 0-5, 1-10, 5-10, 3-6, 1-3, 8-10 or any one of 0, 1, 2, 3, 4, 5, 6, 7, 8, 9 or 10.

In the compounds provided herein, each $R^7$ can an optionally substituted cyclosiloxane, and the polysiloxane can have a cyclosiloxane on every other non-terminal Si atom. In some embodiments, each $R^7$ is an optionally substituted cyclosiloxane and each $R^4$ is an optionally substituted aryl. In some of the compounds provided herein, at least one of $R^3$ or $R^{10}$ is a cyclosiloxane, while in some compounds, $R^3$ and $R^{10}$ each independently is a cyclosiloxane. In some of the compounds, at least one subunit q includes a Si atom that is not substituted with a cyclosiloxane. In some of the compounds, at least one of $R^5$ and $R^6$ is an aryl substituted with an alkyl or halogen. In some of the compounds, $R^5$ and $R^6$ are $C_1$-$C^6$ alkyl, $R^4$ is an optionally substituted aryl and $R^7$ is an optionally substituted cyclosiloxane. In some of the compounds, $R^5$ and $R^6$ are methyl, ethyl or propyl, $R^4$ is an optionally substituted $C_6$ aryl and $R^7$ is an optionally substituted cyclosiloxane.

The polysiloxanes provided herein can range in molecular weight from about 200 to over 500,000. The polysiloxanes exhibit thermal stability, e.g., they can be thermally stable at temperatures above 150° C. or above 200° C. or above 300° C. or above 400° C.

The polysiloxanes provided herein exhibit a range of viscosities. The polysiloxanes can have a viscosity of up to about 150,000 centipoise (cP) when measured at 25° C. at a shear rate of 100 sec$^{-1}$ or a viscosity of from 50 to 150,000 cP when measured at 25° C. at a shear rate of 100 sec$^{-1}$ or from 100 to 100,000 cP when measured at 25° C. at a shear rate of 100 sec$^{-1}$ or from 50 to 50,000 cP when measured at 25° C. at a shear rate of 100 sec$^{-1}$ or from 25 to 100,000 cP when measured at 25° C. at a shear rate of 100 sec$^{-1}$ or from 25 to 25,000 cP when measured at 25° C. at a shear rate of 100 sec$^{-1}$ or from 10 to 10,000 cP when measured at 25° C. at a shear rate of 100 sec$^{-1}$ or from 5 to 5,000 cP when measured at 25° C. at a shear rate of 100 sec$^{-1}$ or from 5 to 1,000 cP when measured at 25° C. at a shear rate of 100 sec$^{-1}$ or from 5 to 500 cP when measured at 25° C. at a shear rate of 100 sec$^{-1}$. The polysiloxanes provided herein can have a pseudoplastic rheology or a Newtonian rheology.

The polysiloxanes provided can include cyclosiloxane substituents that can have from 3 to 10 Si atoms or from 3 to 5 silicone atoms or from 7 to 10 silicon atoms or from 5 to 7 silicon atoms. The polysiloxanes provided herein can include one or more cyclosiloxane substituents selected from among hexamethyl cyclotrisiloxane, octamethyl cyclotetrasiloxane, decamethyl cyclopentasiloxane, dodecamethyl cyclohexasiloxane, tetradecamethyl cycloheptasiloxane, hexadecamethyl cyclooctasiloxane, tetramethyl cyclotetrasiloxane, pentamethyl cyclopentasiloxane, pentamethyl cyclotetrasiloxane, hexamethyl cyclotetrasiloxane, heptamethyl cyclotetrasiloxane, hexamethyl cyclopentasiloxane, octamethyl cyclopentasiloxane, heptamethyl cyclopentasiloxane and nonamethyl cyclopentasiloxane.

The polysiloxanes provided herein can have a compressibility at 1,000 psi of between 0.5% and 0.8% or a compressibility at 5,000 psi of between 1.7% and 2.8% or a compressibility at 10,000 psi of between 3.1% and 4.0% or a compressibility at 20,000 psi of between 5% and 10% or a compressibility at 30,000 psi of between 9.2% and 11%.

The polysiloxanes provided herein can contain a copolymer that includes a cyclosiloxane and a dialkylsiloxane, where the cyclosiloxane and/or the dialkylsiloxane can be substituted. In some embodiments, the cyclosiloxane includes from 3 to 15 Si atoms or from 3 to 10 Si atoms. The copolymer can include a tetrasiloxanyl, penta-siloxanyl, hexasiloxanyl, heptasiloxanyl, octasiloxanyl, enneasiloxanyl or nonasiloxanyl, decasiloxanyl, hendecasiloxanyl, dodecasiloxanyl, tridecasiloxanyl, tetradecasiloxanyl, pentadecasiloxanyl, hexadecasiloxanyl, heptadecasiloxanyl, octadecasiloxanyl, nonadeca-siloxanyl or an icosasiloxanyl, or a combination thereof.

When a polysiloxane provided herein includes a copolymer that includes a cyclosiloxane, the cyclosiloxane can include one or two $C_1$-$C_6$ substituents on one or more of the Si atoms. In some embodiments, non-adjacent Si atoms of the cyclosiloxane include a non-hydrogen substituent. In some embodiments, each Si atom of the cyclosiloxane includes a non-hydrogen substituent. Exemplary non-hydrogen substituents include a halogen, $C_1$-$C_6$ alkyl or $C_1$-$C_6$ haloalkyl. In some embodiments, no Si atom of the cyclosiloxane includes hydrogen as a substituent. In some embodiments, the polysiloxane can include a (cyclosiloxane-ethyl)-alkylsiloxane dialkylsiloxane copolymer. The copolymer can include from about 2% to about 98% by weight (cyclosiloxane-ethyl)-alkylsiloxane. The (cyclosiloxane-ethyl)-alkylsiloxane subunit can comprises from about 5% to about 95% by weight of the copolymer, or from about 5% to about 85% by weight of the copolymer, or from about 5% to about 80% by weight of the copolymer, or from about 5% to about 75% by weight of the copolymer, or from about 5% to about 70% by weight of the copolymer, or from about 5% to about 65% by weight of the copolymer, or from about 5% to about 60% by weight of the copolymer, or from about 5% to about 55% by weight of the copolymer, or from about 5% to about 50% by weight of the copolymer, or from about 10% to about 50% by weight of the copolymer, or from about 15% to about 65% by weight of the copolymer, or from about 20% to about 70% by weight of the copolymer or from about 25% to about 75% by weight of the copolymer.

Also provided are polysiloxanes that can include a copolymer that contains as a subunit a [2-(heptaalkyl-cyclotetrasiloxanyl)ethyl]-alkylsiloxane, [2-(heptamethyl-cyclotetrasiloxanyl)ethyl]-alkyl-siloxane, [2-(heptaethyl-cyclotetrasiloxanyl)ethyl]-alkylsiloxane, [2-(heptapropyl-cyclotetrasiloxanyl)ethyl]-alkylsiloxane, [2-(heptamethyl-cyclotetrasiloxanyl)ethyl]-methylsiloxane, [2-(heptamethyl-cyclotetra-siloxanyl)ethyl]-ethylsiloxane, [2-(hepta-methyl-cyclotetrasiloxanyl)ethyl]-propylsiloxane, [2-(heptamethyl-cyclotetrasiloxanyl)-ethyl]-butylsiloxane or combinations thereof. The copolymer can include a dialkylsiloxane. Any dialkylsiloxane known in the art can be included. Exemplary dialkylsiloxanes include dimethylsiloxane, a diethylsiloxane, dipropylsiloxane, dibutylsiloxane, a di(trifluoromethyl)siloxane, a methyl-trifluoromethylsiloxane or combinations thereof.

Also provided are polysiloxanes that include a copolymer that contains [2-(hepta-alkyl-cyclotetrasiloxanyl)ethyl]-alkylsiloxane subunits and dialkylsiloxane subunits. The dialkylsiloxane subunits can alternate with the [2-(heptaalkyl-cyclotetrasiloxanyl)ethyl]-alkylsiloxane subunits. Two or more dialkylsiloxane subunits can be present between [2-(heptaalkyl-cyclotetrasiloxanyl)-ethyl]-alkylsiloxane subunits. The copolymer also can include [2-(heptaalkyl-cyclotetrasiloxanyl)ethyl]-methylsiloxane and dimethylsiloxane.

The polysiloxanes provided herein can be included in a number of compositions. Exemplary compositions include anti-foam compositions, lubricant compositions, hydraulic fluid compositions, water repellant compositions, release agent compositions, personal care or cosmetic compositions, household care compositions, drug delivery compositions, transdermal drug delivery compositions, and personal lubricant compositions.

Provided herein are anti-foam compositions that include one or more of the polysiloxanes provided herein. The anti-foam compositions can include an emulsifying agent and/or a silicone resin composed of $R^*_3SiO_{0.5}$ units and $SiO_2$ units, wherein $R^*$ is selected from among monovalent hydrocarbon radicals, halogenated monovalent hydrocarbon radicals and an aryl group. In some embodiments, $R^*$ is selected from among $C_1$-$C_8$ alkyl radicals and phenyl. Any emulsifier known in the art can be included.

Exemplary emulsifying agents include sorbitan monostearate, polyoxyethylene sorbitan monostearate and polyoxyethylene stearate. In some compositions, the viscosity of the polysiloxane is from 100 to 100,000 centipoise (cP) when measured at 25° C. at a shear rate of 100 sec$^{-1}$. The anti-foam composition can be formulated to be an emulsion, such as an aqueous emulsion. The anti-foam composition also can include an optionally treated filler, such as an optionally treated fumed silica or precipitated silica. The filler can be treated with any compounds known to be used for treatment of filler in the art. For example, the filler can be treated with a filler treating compound selected from among a cyclic polysiloxane and low molecular weight linear polysiloxane.

Also provided are lubricant compositions that include a polysiloxane as described herein. The lubricant composition can include a polysiloxane having a viscosity of up to about 150,000 centipoise (cP) when measured at 25° C. at a shear rate of 100 sec$^{-1}$ or a viscosity of from 50 to 150,000 cP when measured at 25° C. at a shear rate of 100 sec$^{-1}$ or from 100 to 100,000 cP when measured at 25° C. at a shear rate of 100 sec$^{-1}$ or from 50 to 50,000 cP when measured at 25° C. at a shear rate of 100 sec$^{-1}$ or from 25 to 100,000 cP when measured at 25° C. at a shear rate of 100 sec$^{-1}$ or from 25 to 25,000 cP when measured at 25° C. at a shear rate of 100 sec$^{-1}$ or from 10 to 10,000 cP when measured at 25° C. at a shear rate of 100 sec$^{-1}$ or from 5 to 5,000 cP when measured at 25° C. at a shear rate of 100 sec$^{-1}$ or from 5 to 1,000 cP when measured at 25° C. at a shear rate of 100 sec$^{-1}$ or from 5 to 500 cP when measured at 25° C. at a shear rate of 100 sec$^{-1}$. In the lubricant compositions, the polysiloxane contained therein can be present at from about 0.1% to 50% by weight of the composition or from about 50% to 99% by weight of the composition. The lubricant composition further can include a solid lubricant. Any solid lubricant known in the art can be included. Exemplary solid lubricants include graphite, graphite fluoride, a buckyball, molybdenum disulfide, boron nitride, tungsten disulfide, hollow fullerene-like nanoparticles, metal dichalcogenides and polytetrafluoroethylene.

Also provided are hydraulic fluid compositions that include a polysiloxane provided herein. The hydraulic fluid composition can include a polysiloxane having a viscosity of up to about 150,000 centipoise (cP) when measured at 25° C. at a shear rate of 100 sec$^{-1}$ or a viscosity of from 50 to 150,000 cP when measured at 25° C. at a shear rate of 100 sec$^{-1}$ or from 100 to 100,000 cP when measured at 25° C. at a shear rate of 100 sec$^{-1}$ or from 50 to 50,000 cP when measured at 25° C. at a shear rate of 100 sec$^{-1}$ or from 25 to 100,000 cP when measured at 25° C. at a shear rate of 100 sec$^{-1}$ or from 25 to 25,000 cP when measured at 25° C. at a shear rate of 100 sec$^{-1}$ or from 10 to 10,000 cP when measured at 25° C. at a shear rate of 100 sec$^{-1}$ or from 5 to 5,000 cP when measured at 25° C. at a shear rate of 100 sec$^{-1}$ or from 5 to 1,000 cP when measured at 25° C. at a shear rate of 100 sec$^{-1}$ or from 5 to 500 cP when measured at 25° C. at a shear rate of 100 sec$^{-1}$. In the hydraulic fluid compositions, the polysiloxane contained therein can be present in any concentration, such as from about 0.1% to 50% by weight of the composition or from about 50% to 100% by weight of the composition. The hydraulic fluid composition also can further include one or more components, such as dyes, thermal stabilizers, antioxidants, dispersants, anti-wear additives, lubrication additives, metal passivators, anti-foaming agents, flammability resistance additives, fire retardants, rust inhibitors, friction modifiers and corrosion inhibitors.

In some embodiments, the hydraulic fluid composition can include from about 91.9-99.8% by weight polysiloxane provided herein; from about 0.005-0.1% or 0.02-0.2% by weight anti-oxidant; and optionally from about 0.01 to 1.0% by weight anti-foaming agent. The hydraulic fluid composition further can contain a pour point dispersant in the range of 0.01 to 1.0% by weight and/or a corrosion inhibitor in the range of 0.10-1.0% by weight and/or a lubricity additive in the range of 0.005-5.0% by weight. Any anti-oxidant known in the art can be included. Exemplary anti-oxidants include 2,4,6-tri-tert-butylphenol, 2,6-di-tert-butyl-4-n-butylphenol, 2,6-di-tert-butyl-4-methylphenol or n-octadecyl 3-(3,5-di-tert-butyl-4-hydroxy phenyl)propionate, penta erythrityl tetrakis[3-(3,5-di-tert-butyl-4-hydroxy-phenyl)propionate], di-n-octadecyl (3,5-di-tert-butyl-4-hydroxybenzyl) phosphonate, 2,4,6-tris(3,5-di-tert-butyl-4-hydroxy-benzyl)mesitylene, tris(3,5-di-tert-butyl-4-hydroxybenzyl)-isocyanurate or hindered piperidine carboxylic acids, acylated derivatives of 2,6-dihydroxy-9-azabicyclo[3.3.1]-nonane or bicyclic hindered amines or diphenyl-amines or dinaphthylamines, phenylnaphthyl amines, N,N'-diphenylphenylenediamine or p-octyl-diphenylamine, p,p-dioctyl diphenylamine, N-phenyl-1-naphthylamine, N-phenyl-2-naphthylamine, N-(p-dodecyl) phenyl-2-naphthylamine, di-1-naphthylamine, di-2-naphthylamine, N-alkyl phenothiazines, imino(bisbenzyl), 6-(tert-butyl)phenol, 2,6-di-(tert-butyl)phenol, 4-methyl-2,6-di-(tert-butyl)phenol, 4,4'-methylene-bis(-2,6-di-(tert-butyl)phenol), methyl hydroxy hydrocinnamide, phenothiazines derivatives, alkylated 5-amino tetrazole, di-tert-butyl-p-amino phenol and a mixture thereof.

In the hydraulic fluid compositions provided herein that contain an anti-foam agent, any anti-foam agent known in the art can be included. Exemplary anti-foam agents include silicone oil, polyvinyl alcohol, octanol, and a mixture thereof. In the hydraulic fluid compositions provided herein that contain a pour point dispersant, any pour point dispersant known in the art can be included. Exemplary pour point dispersants include diethylhexyl adipate, polymethacrylate, alkylated naphthalene derivatives, polyvinyl acrylate and mixtures thereof.

In the hydraulic fluid compositions provided herein that contain a corrosion inhibitor, any corrosion inhibitor known in the art can be included. Exemplary corrosion inhibitors include octyl-1H-benzotriazole, di-tertiary butylated 1H-benzotriazole, propyl gallate, polyoxyalkylene polyols, octadecyl amines, nonyl phenol ethoxylates, calcium phenolates of hydrogenated pentadecyl phenol, magnesium alkyl benzene sulfonates and mixtures thereof. In the hydraulic fluid compositions provided herein that contain a rust inhibitor, any rust inhibitor known in the art can be included. Exemplary rust inhibitors include organic acids and their esters, N-oleoyl-sarcosine, sorbitan monooleate, lead naphthenate, alkenyl succinic acid anhydrides, 4-nonylphenoxy-acetic acid; primary, secondary or tertiary aliphatic or cycloaliphatic amines and amine salts of organic and inorganic acids, substituted imidazolines and oxazolines; amine salts of phosphoric acid partial esters or phosphonic acid partial esters and zinc dialkyl-dithio-phosphates; barium dinonyl-naphthalene-sulfonates and calcium petroleum-sulfonates.

In the hydraulic fluid compositions provided herein that contain an anti-wear additive, any anti-wear additive known in the art can be included. Exemplary anti-wear additives include sulfurized vegetable oils, zinc dialkyl-dithio-phosphates, tritolyl-phosphate, chlorinated paraffins, alkyl and aryl di- and trisulfides, triphenyl-phosphoro-thionates, diethanolaminomethyltolyltriazole and di(2-ethylhexyl)aminomethyltolyltriazole.

Also provided are water repellent compositions that include a polysiloxane provided herein. The polysiloxane provided herein can be present at any concentration, such as between about 50% to 100% by weight of the composition or between about 0.5 to 50% by weight of the composition. The water repellent composition provided herein can further include one or more additives. Exemplary additives include waxes, tertiary fatty amines, metallic soaps, fungicides, bactericides, and fire-retardant materials and mixtures thereof. The one or more additives can be present at any concentration, such as from about 0.5 to 15% by weight of the composition. The water repellent composition can be in the form of an emulsion or in the form of a solution.

Also provided are release agent compositions that include a polysiloxane provided herein. The polysiloxane provided herein can be present at any concentration, such as between about 50% to 100% by weight of the composition or about 0.5 to 50% by weight of the composition. The release agent compositions further can include a thickening agent. Any thickening agent known in the art can be included. Exemplary thickening agents include sulfonated polystyrene, hydrophilic clays, digested starch, xanthan gum, gellan gum, welan gum, rhamsan gum, diutan, alginic acid sodium alginate, potassium alginate, curdlan, chitosan, guar gum, locust bean gum, carboxy-substituted cellulose ethers, such as carboxymethyl cellulose, hydroxypropyl cellulose, methyl cellulose and combinations thereof. The thickener can be present at any concentration, such as between 0.05% to about 50% by weight of the composition.

The release agent compositions provided herein can include an organic solvent. Exemplary organic solvents include toluene, xylene, methanol, ethanol, isobutanol, n-butanol, ethyl acetate, methyl ethyl ketone, acetone, tetrahydrofuran, isopropanol, dimethylformamide and N-methylpyrrolidine and combinations thereof. The organic solvent can be present at any concentration, such as from about 1 to 80% by weight of the composition. The release agent compositions can further include one or more additives. Any additive known in the art can be included. Exemplary additives include an anti-static agent, a surface active agent, an antioxidant, a lubricant, a flame retardant, a colorant, a light stabilizer and a heat stabilizer and combinations thereof.

Also provided are personal care compositions and cosmetic compositions that include a polysiloxane provided herein. The compositions can include any amount of the polysiloxane. For example, the polysiloxane can be present at a concentration between about 50% to 100% by weight of the composition or between about 0.5 to 50% by weight of the composition. The personal care compositions and cosmetic compositions can be in the form of a solution, emulsion, foam, mousse, cream, gel, lotion, ointment, solid, powder, paste, semi-solid, stick, spray or a combination thereof. Exemplary personal care compositions or cosmetic compositions include deodorants, antiperspirants, insect repellants, anesthetics, skin conditioners, skin lotions, skin moisturizers, skin toners, skin sanitizers, skin cleansing compositions, skin soothing and lubricating compositions, sunscreen, anti-aging products, concealer products, soaps, foaming bath products, shower gels, cleansing products, shampoos, hair conditioners, hair styling gels, hair anti-dandruff compositions, hair growth promoter compositions, hair colorant compositions, hair bleaching agent compositions, hair anti-frizzing agent compositions, hair shining compositions, hair relaxer compositions, mousses, styling gels, hair sprays, hair dyes, hair waving products, hair straightening products, shaving product compositions, personal lubricant compositions, spermicidal gel compositions, manicure products, nail polish, nail polish remover, nail creams and lotions, cuticle softeners, color cosmetics, lipsticks, lip balms, foundations, face powders, eye liners, eye shadows, blushes, makeup, mascaras and color cosmetic removers.

The personal care compositions and cosmetic compositions further can include an additive compatible with personal care compositions and cosmetic compositions. Any additive known in the art can be included. Exemplary additives include emollients, moisturizers, humectants, pigments, dyes, pearlescent compounds, nacreous pigments, bismuth oxychloride coated mica, titanium dioxide coated mica, colorants, fragrances, biocides, preservatives, alpha hydroxy acids, antioxidants, anti-microbial agents, anti-fungal agents, antiperspirant agents, exfoliants, hormones, enzymes, medicinal compounds, vitamins, salts, electrolytes, alcohols, polyols, polypropylene glycol, polyisobutene, polyoxyethylene, behenic acid, behenyl, sugar-alcohols, absorbing agents for ultraviolet radiation, botanical extracts, surfactants, silicone oils, organic oils, waxes, alkaline or acidic or buffering agents, film formers, thickening agents, hyaluronic acid, fumed silica, hydrated silica, talc, kaolin, starch, modified starch, mica, nylon, clay, bentonite, organo-modified clays and combinations thereof.

For example, the additive can be an emollient. Exemplary emollients include isododecane, isohexadecane, hydrogenated polyisobutene, waxes, cocoa butter, shea butter, cyclopentasiloxane, dimethicone, bis-phenylpropyl dimethicone, octyldodecyl neopentanoate, oleyl oleate, oleyl alcohol and isomyristyl alcohol and combinations thereof. The additive can be a wax. Exemplary waxes include jojoba wax, beeswax, carnauba wax, candelilla wax, sugar cane wax, paraffin wax, lignite wax, microcrystalline waxes, and lanolin wax, polyethylene waxes derived from the polymerization of ethylene, silicone waxes and combinations thereof.

Also provided are household care compositions that include a polysiloxane provided herein. The compositions can include any amount of the polysiloxane. For example, the polysiloxane can be present at a concentration between about 50% to 100% by weight of the composition or between about 0.5 to 50% by weight of the composition. Exemplary household care compositions include laundry detergents and softeners, fabric sizing agents, dish and hard surface detergents, hard surface sanitizing agents, all purpose kitchen cleaners and disinfectants, toilet, tub and tile cleaning and disinfectant preparations, polishing compositions, waxes and polishing compositions for treating wood, furniture, automobiles or boats, pesticide preparations, static control preparations, air deodorants/fresheners, and rug and upholstery shampoos, cleaners and deodorizers.

Also provided are drug delivery compositions for topical application of a medicinal composition to the skin, where the compositions include a polysiloxane provided herein. The drug delivery composition can be formulated as a transdermal drug delivery composition or system. The compositions can include any amount of the polysiloxane. For example, the polysiloxane can be present at a concentration between about 50% to 100% by weight of the composition or between about 0.5 to 50% by weight of the composition.

Also provided are personal lubricant compositions that include a polysiloxane provided herein. The compositions can include any amount of the polysiloxane. For example, the polysiloxane can be present at a concentration between about 50% to 100% by weight of the composition or between about 0.5 to 50% by weight of the composition. The personal lubricant compositions further can include a linear and/or cyclic silicone fluid. Exemplary silicone fluids include cyclomethicone, trisiloxane, volatile dimethicones, polyalkylsiloxanes, polydialkylsiloxanes, methyl trimethicone, cyclopolysiloxanes, and mixtures thereof. In compositions that include a cyclopolysiloxane, the cyclopolysiloxane can contain any number of alkyl groups, such as $C_1$-$C_{10}$ alkyl groups, or any number of alkoxy groups, such as $C_1$-$C_{10}$ alkoxy groups. In compositions that include a silicone fluid, any silicone fluid known in the art can be included. Exemplary silicone fluids include octamethyl cyclotetrasiloxane (cyclomethicone tetramer), decamethyl cyclopentasiloxane (cyclomethicone pentamer), cyclomethicone hexamer, cyclopentasiloxane, methoxypropyl heptamethyl cyclotetrasiloxane and combinations thereof. The personal lubricant composition can include a tocopherol or tocotrienol. The personal lubricant composition further can include an additive, such as a preservative, colorant or flavoring agent.

Also provided are methods of using the cyclosiloxane-substituted polysiloxanes provided herein and methods of using compositions that contain the polysiloxanes. Provided are methods of reducing frictional force between two or more interacting surfaces, e.g., metal/metal, metal/plastic, plastic/rubber and metal/rubber surface interaction, such as in mechanical operations and equipment. The methods include applying a lubricant composition containing one or more cyclosiloxane-substituted polysiloxanes provided herein to at least one of the interacting surfaces. Also provided are methods for imparting lubricity to one or more components in a system, where the methods include contacting one or more of the components with a lubricant composition containing a cyclosiloxane-substituted polysiloxane provided herein.

Also provided are methods for transmitting force hydraulically. The methods include applying a force to a confined fluid and the fluid transmits the force, often across some distance, where the confined fluid is a hydraulic fluid that contains a cyclosiloxane-substituted polysiloxane provided herein.

The polysiloxanes provided herein also have utility as aids in manufacturing. For example, provided are methods of reducing foam in a system where foaming is a problem, where the method includes adding thereto a foam inhibiting quantity of an anti-foam composition that contains a cyclosiloxane-substituted polysiloxane provided herein.

The polysiloxanes provided herein also can be used to modify the properties of a surface of a substrate. For example, provided are methods of making a substrate water-proof or water repellant, where the method includes applying to the substrate a water repellant composition that contains a cyclosiloxane-substituted polysiloxane provided herein. The surface to be modified can be on any substrate, such as concrete, mortar, brick, stucco, tile, wood, ceramic, metal, plastic, glass, textiles, leather and paper. The water repellant composition can be applied to the substrate by any method known in the art, such as dipping, spraying, or brushing the composition onto the substrate.

Also provided are methods of making a coated substrate. The methods include applying a layer of a release agent composition that contains a cyclosiloxane-substituted polysiloxane provided herein to a first substrate and drying the composition, where the coating on the first substrate forms a film that prevents or decreases the adhesion of a second substrate to the first substrate. The coating can be applied to any surface to form a release coating. Exemplary substrates include a plastic, a film, a die or mold, a paper, a nonwoven fabric, a metal and a metal foil. Exemplary films can contain one or more polymers, such as polyethylene, polypropylene, polybutene, polybutadiene, vinyl chloride, polyethylene terephthalate, polyethylene naphthalate, polybutylene terephthalate, polyimide, polyether imide, polyether ketone, polyether ether ketone, an ethylene/vinyl acetate copolymer, an ethylene/(meth)acrylic acid copolymer, polycarbonate, polymethyl methacrylate, triacetyl cellulose and polynorbornene or combinations thereof. The coating can be applied to any paper or nonwoven article known in the art. Exemplary papers include coated or uncoated groundwood, calendared or uncalendared kraft paper, acid-free paper, coated or uncoated wood-free paper, lint-free paper, glassine paper, clay coated paper, resin coated paper, polyethylene laminated paper, polypropylene laminated paper and paperboard. In the methods provided herein, the release agent composition can be applied using any method known in the art, such as gravure coating, roll coating, blade coating, knife coating, bar coating or spray coating.

Also provided are methods of delivering an active agent to a subject. The methods include dissolving, solvating or dispersing the active agent in a composition that contains a cyclosiloxane-substituted polysiloxane provided herein to form an active agent delivery composition; and administering the active agent delivery composition to a subject in need thereof. The active agent delivery composition can be formulated to be a dosage form, such as a cream, ointment, lotion, solution, emulsion or a transdermal delivery device, such as a patch-type transdermal delivery device. When formulated as a patch, the surface area can be of any size, such as having a surface area in the range of 1 to 200 cm$^2$.

Also provided are methods of lubricating a surface on the body a subject, where the method includes applying an amount, e.g., from 25 µl to 100 mL, of a personal lubricant composition that contains a cyclosiloxane-substituted polysiloxane provided herein to the body surface and rubbing the lubricant composition to produce a lubricating effect. Also provided are methods of lubricating the genitals of a subject, where the method includes applying a quantity of a personal lubricant composition that contains a cyclosiloxane-substituted polysiloxane provided herein to one or more surfaces of the genitals of a subject. The composition can be applied to the vagina, the penis or both. Also provided are methods of providing vaginal lubrication where the methods include applying a personal lubricant composition that contains a cyclosiloxane-substituted polysiloxane provided herein to the vagina of a patient in need thereof. Also provided are methods of delivering a pharmaceutical or nutraceutical composition to the genitals of a subject. The method includes dissolving or dispersing the pharmaceutical or nutraceutical in a personal lubricant composition that contains a cyclosiloxane-substituted polysiloxane provided herein to form a delivery composition; and applying the delivery composition to the genitals of a patient in need thereof.

DETAILED DESCRIPTION

For clarity of disclosure, and not by way of limitation, the detailed description is divided into subsections that follow.
Outline
   A. Definitions
   B. Silicones
   C. Description of the Compounds
     1. Cyclosiloxane-substituted Polysiloxanes of Formula I
     2. Shear Thinning Cyclosiloxane-substituted polysiloxanes of Formula I
       C. Preparation of the Compounds
   D. Preparation of Cyclosiloxane-substituted Polysiloxanes of Formula I
   E. Applications
     1. Mechanical Lubricant Fluid Compositions
     2. Hydraulic Fluid Compositions
     3. Anti-Foam Compositions
     4. Water Repellent Agent Compositions
     5. Release Agent Compositions
     6. Personal Care & Cosmetic Applications
     7. Household Care Compositions
   F. Articles of manufacture
   G. Examples A. Definitions Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it understood that such identifiers can change and particular information on the internet can come and go, but equivalent information can be found by searching the interne. Reference thereto evidences the availability and public dissemination of such information.

As used herein, the term "active agent" refers to a drug or any compound that is a therapeutic agent or a candidate for use as a therapeutic or as lead compound for designing a therapeutic or that is a known pharmaceutical. Such compounds can be small molecules, including small organic molecules, peptides, peptide mimetics, antisense molecules, antibodies, fragments of antibodies, recombinant antibodies.

As used herein, "biological activity" refers to the in vivo activities of a compound or physiological responses that result upon in vivo administration of a compound, composition or other mixture. Biological activity, thus, encompasses therapeutic effects and pharmaceutical activity of such compounds, compositions and mixtures. Biological activities can be observed in in vitro systems designed to test or use such activities.

As used herein, the term "assess" and grammatical variations thereof, are intended to include quantitative and qualitative determination in the sense of obtaining an absolute value for the activity of a polypeptide, and also of obtaining an index, ratio, percentage, visual or other value indicative of the level of the activity. Assessment can be direct or indirect.

As used herein, the term "emulsion" refers to a stable suspension of two incompatible fluid materials, where one fluid (such as a liquid) is suspended or dispersed as minute particles or globules in another fluid (for example, oil dispersed in water or silicone dispersed in a carrier fluid).

As used herein, "fluid" refers to any composition that can flow. Fluids thus encompass compositions that are in the form of semi-solids, pastes, solutions, aqueous mixtures, gels, lotions, creams and other such compositions.

As used herein, $C_1$-$C_x$ includes $C_1$-$C_2$, $C_1$-$C_3$ .... $C_1$-$C_x$.

As used herein, the term "alkyl" alone or in combination refers to a straight, branched, or cyclic chain containing at least one carbon atom and no double or triple bonds between carbon atoms. As used herein, the term "lower alkyl" refers to a $C_1$-$C_6$ alkyl.

In certain embodiments, an alkyl contains 1 to 20 carbon atoms (whenever it appears herein, a numerical range such as "1 to 20" refers to each integer in the given range; e.g., "1 to 20 carbon atoms" means that an alkyl group can contain only 1 carbon atom, 2 carbon atoms, 3 carbon atoms, etc., up to and including 20 carbon atoms, although the term "alkyl" also includes instances where no numerical range of carbon atoms is designated). In certain embodiments, an alkyl contains 1 to 10 carbon atoms. In certain embodiments, an alkyl contains 1 to 8 carbon atoms. An alkyl can be designated as "$C_1$-$C_4$ alkyl" or similar designations. By way of example only, "$C_1$-$C_4$ alkyl" indicates an alkyl having one, two, three, or four carbon atoms, i.e., the alkyl is selected from among methyl, ethyl, propyl, iso-propyl, n-butyl, iso-butyl, sec-butyl and t-butyl. Thus $C_1$-$C_4$ includes $C_1$-$C_2$ and $C_1$-$C_3$ alkyl. Alkyls can be substituted or unsubstituted. Alkyls include, but are not limited to, methyl, ethyl, propyl, isopropyl, butyl, isobutyl, tertiary butyl, pentyl, hexyl, ethenyl, propenyl, butenyl, cyclopropyl, cyclobutyl, cyclopentyl, and cyclohexyl, each of which optionally are substituted.

As used herein, the term "alkenyl" alone or in combination refers to an alkyl containing at least two carbon atoms and at least one carbon-carbon double bond (an alkene group). In certain embodiments, alkenyls are optionally substituted.

As used herein, the term "alkynyl" alone or in combination refers to an alkyl containing at least two carbon atoms and at least one carbon-carbon triple bond (an alkyne group). In certain embodiments, alkynyls are optionally substituted.

As used herein, the term "halo" or "halogen" refers to an element in Group VIIA of the periodic table having seven valence electrons. Exemplary halogens include fluorine, chlorine, bromine and iodine.

As used herein, "pseudohalo" or "pseudohalogen" refers to compounds that behave substantially similar to halides/halogens. Such compounds can be used in the same manner and treated in the same manner as halides/halogens (X—, in which X is a halogen, such as Cl, F, I or Br). Pseudohalogens include, but are not limited to, cyanide, cyanate, thiocyanate, selenocyanate, trifluoromethoxy, trifluoromethyl and azide.

As used herein, the term "haloalkyl" alone or in combination refers to an alkyl in which at least one hydrogen atom is replaced with a halogen atom. In certain of the embodiments in which two or more hydrogen atom are replaced with halogen atoms, the halogen atoms are all the same as one another. In certain of such embodiments, the halogen atoms are not all the same as one another. Certain haloalkyls are saturated haloalkyls, which do not include any carbon-carbon double bonds or any carbon-carbon triple bonds. Certain haloalkyls are haloalkenes, which include one or more carbon-carbon double bonds. Certain haloalkyls are haloalkynes, which include one or more carbon-carbon triple bonds. In certain embodiments, haloalkyls are optionally substituted.

Where the number of any given substituent is not specified (e.g., "haloalkyl"), there can be one or more substituents present. For example, "haloalkyl" can include one or more of the same or different halogens. For example, "haloalkyl" includes each of the substituents $CF_3$, $CHF_2$ and $CH_2F$.

As used herein, the term "heteroalkyl" alone or in combination refers to a group containing an alkyl and one or more heteroatoms. Certain heteroalkyls are saturated heteroalkyls, which do not contain any carbon-carbon double bonds or any carbon-carbon triple bonds. Certain heteroalkyls are heteroalkenes, which include at least one carbon-carbon double bond. Certain heteroalkyls are heteroalkynes, which include at least one carbon-carbon triple bond. Certain heteroalkyls are acylalkyls, in which the one or more heteroatoms are within an alkyl chain. Examples of heteroalkyls include, but are not limited to, $CH_3C(=O)CH_2$—, $CH_3C(=O)CH_2CH_2$—, $CH_3CH_2C(=O)CH_2CH_2$—, $CH_3C(=O)CH_2CH_2CH_2$—, $CH_3OCH_2CH_2$—, $CH_3C(=O)CH_2$— and $CH_3NHCH_2$—. In certain embodiments, heteroalkyls are optionally substituted.

As used herein, the term "heterohaloalkyl" alone or in combination refers to a heteroalkyl in which at least one hydrogen atom is replaced with a halogen atom. In certain embodiments, heteroalkyls are optionally substituted.

As used herein, the term "ring" refers to any covalently closed structure. Rings include, for example, carbocycles (e.g., aryls and cycloalkyls), heterocycles (e.g., heteroaryls and non-aromatic heterocycles), aromatics (e.g., aryls and heteroaryls), and non-aromatics (e.g., cycloalkyls and non-aromatic heterocycles). Rings can be optionally substituted. Rings can form part of a ring system.

As used herein, the term "ring system" refers to two or more rings, wherein two or more of the rings are fused. The term "fused" refers to structures in which two or more rings share one or more bonds.

As used herein, the term "heterocycle" refers to a ring wherein at least one atom forming the ring is a carbon atom and at least one atom forming the ring is a heteroatom. Heterocyclic rings can be formed by three, four, five, six, seven, eight, nine, or more than nine atoms. Any number of those atoms can be heteroatoms (i.e., a heterocyclic ring can contain one, two, three, four, five, six, seven, eight, nine, or more than nine heteroatoms, provided that at lease one atom in the ring is a carbon atom). Herein, whenever the number of carbon atoms in a heterocycle is indicated (e.g., $C_1$-$C_6$ heterocycle), at least one other atom (the heteroatom) must be present in the ring. Designations such as "$C_1$-$C_6$ heterocycle" refer only to the number of carbon atoms in the ring and do not refer to the total number of atoms in the ring. It is understood that the heterocyclic ring will have additional heteroatoms in the ring. Designations such as "4-6 membered heterocycle" refer to the total number of atoms that comprise the ring (i.e., a four, five, or six membered ring, in which at least one atom is a carbon atom, at least one atom is a heteroatom and the remaining two to four atoms are either carbon atoms or heteroatoms). In heterocycles containing two or more heteroatoms, those two or more heteroatoms can be the same or different from one another. Heterocycles can be optionally substituted. Binding to a heterocycle can be at a heteroatom or via a carbon atom. Examples of heterocycles include, but are not limited to the following:

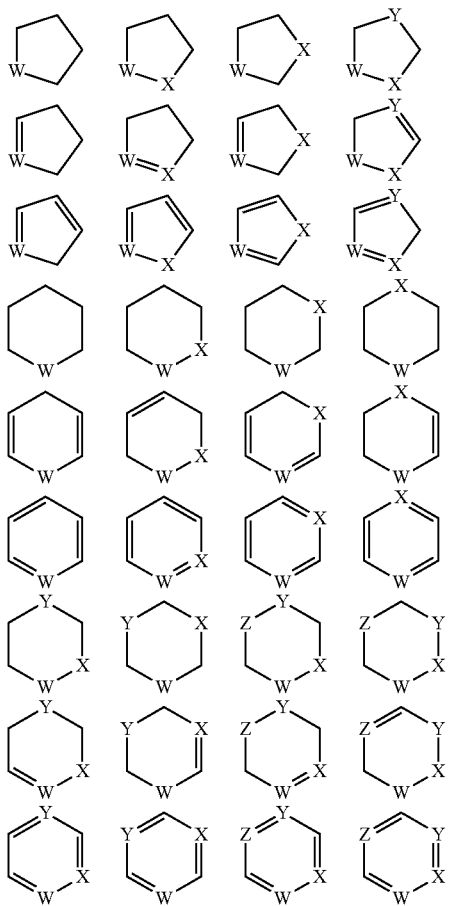

where W, X, Y and Z independently represent a heteroatom. Each of W, X, Y and Z can be the same or different from one another.

As used herein, the term "carbocycle" refers to a ring, where each of the atoms forming the ring is a carbon atom. Carbocyclic rings can be formed by 3, 4, 5, 6, 7, 8, 9, or more than 9 carbon atoms. Carbocycles can be optionally substituted.

As used herein, the term "heteroatom" refers to an atom other than carbon or hydrogen. Heteroatoms are typically independently selected from oxygen, sulfur, nitrogen and phosphorus, but are not limited to those atoms. In embodiments in which two or more heteroatoms are present, the two or more heteroatoms can all be the same as one another, or some or all of the two or more heteroatoms can each be different from the others.

As used herein, the term "bicyclic ring" refers to two rings, where the two rings are fused. Bicyclic rings include, e.g., decaline, pentalene, indene, naphthalene, azulene, heptalene, isobenzofuran, chromene, indolizine, isoindole, indole, indoline, purine, quinolizine, isoquinoline, quinoline, phthalazine, naphthyrididine, quinoxaline, cinnoline, pteridine, isochroman, chroman and various hydrogenated derivatives thereof. Bicyclic rings can be optionally substituted. Each ring is independently aromatic or non-aromatic. In certain embodiments, both rings are aromatic. In certain embodiments, both rings are non-aromatic. In certain embodiments, one ring is aromatic and one ring is non-aromatic.

As used herein, the term "aromatic" refers to a planar ring having a delocalized π-electron system containing $4n+2$ π electrons, where n is an integer. Aromatic rings can be formed by five, six, seven, eight, nine, or more than nine atoms. Aromatics optionally can be substituted. Examples of aromatic groups include, but are not limited to, phenyl, tetralinyl, naphthalenyl, phenanthrenyl, anthracenyl, fluorenyl, indenyl and indanyl. The teem aromatic includes, e.g., benzenoid groups, connected via one of the ring-forming carbon atoms, and optionally carrying one or more substituents selected from an aryl, a heteroaryl, a cycloalkyl, a non-aromatic heterocycle, a halo, a hydroxy, an amino, a cyano, a nitro, an alkylamido, an acyl, a $C_{1-6}$ alkoxy, a $C_{1-6}$ alkyl, a $C_{1-6}$ hydroxyalkyl, a $C_{1-6}$ aminoalkyl, a $C_{1-6}$ alkylamino, an alkylsulfenyl, an alkylsulfinyl, an alkylsulfonyl, an sulfamoyl, or a trifluoro-methyl. In certain embodiments, an aromatic group is substituted at one or more of the para, meta, and/or ortho positions. Examples of aromatic groups containing substitutions include, but are not limited to, phenyl, 3-halophenyl, 4-halophenyl, 3-hydroxyphenyl, 4-hydroxy-phenyl, 3-aminophenyl, 4-aminophenyl, 3-methylphenyl, 4-methylphenyl, 3-methoxyphenyl, 4-methoxyphenyl, 4-trifluoromethoxyphenyl, 3-cyano-phenyl, 4-cyanophenyl, naphthyl, dimethylphenyl, hydroxynaphthyl, hydroxymethyl-phenyl, (trifluoromethyl)phenyl, alkoxyphenyl, 4-morpholin-4-ylphenyl, 4-pyrrolidin-1-ylphenyl, 4-pyrazolylphenyl, 4-triazolylphenyl and 4-(2-oxopyrrolidin-1-yl)phenyl.

As used herein, the term "aryl" refers to a monocyclic, bicyclic or tricyclic aromatic system that contains no ring heteroatoms. Where the systems are not monocyclic, the term aryl includes for each additional ring the saturated form (perhydro form) or the partially unsaturated form (for example the dihydro form or tetrahydro form) or the maximally unsaturated (nonaromatic) form. In some embodiments, the term aryl refers to bicyclic radicals in which the two rings are aromatic and bicyclic radicals in which only one ring is aromatic. Examples of aryl include phenyl, naphthyl, anthracyl, indanyl, 1,2-dihydro-naphthyl, 1,4-dihydronaphthyl, indenyl, 1,4-naphthoquinonyl and 1,2,3,4-tetrahydronaphthyl.

Aryl rings can be formed by three, four, five, six, seven, eight, nine, or more than nine carbon atoms. In some embodiments, aryl refers to a 3-, 4-, 5-, 6-, 7-, 8-, 9-, 10-, 11-, 12-, 13- or 14-membered, aromatic mono-, bi- or tricyclic system. In some embodiments, aryl refers to an aromatic $C_3$-$C_9$ ring. In some embodiments, aryl refers to an aromatic $C_4$-$C_8$ ring. Aryl groups can be optionally substituted.

As used herein, the term "heteroaryl" refers to an aromatic ring in which at least one atom forming the aromatic ring is a heteroatom. Heteroaryl rings can be foamed by three, four, five, six, seven, eight, nine and more than nine atoms. Heteroaryl groups can be optionally substituted. Examples of heteroaryl groups include, but are not limited to, aromatic $C_{3-8}$ heterocyclic groups containing one oxygen or sulfur atom, or two oxygen atoms, or two sulfur atoms or up to four nitrogen atoms, or a combination of one oxygen or sulfur atom and up to two nitrogen atoms, and their substituted as well as benzo- and pyrido-fused derivatives, for example, connected via one of the ring-forming carbon atoms. In certain embodiments, heteroaryl is selected from among oxazolyl, isoxazolyl, oxadiazolyl, thiazolyl, isothiazolyl, pyridinyl, pyridazinyl, pyrimidinal, pyrazinyl, indolyl, benzimidazolyl, quinolinyl, isoquinolinyl, quinazolinyl or quinoxalinyl.

In some embodiments, a heteroaryl group is selected from among pyrrolyl, furanyl (furyl), thiophenyl (thienyl), imidazolyl, pyrazolyl, 1,2,3-triazolyl, 1,2,4-triazolyl, 1,3-oxazolyl (oxazolyl), 1,2-oxazolyl (isoxazolyl), oxadiazolyl, 1,3-thiazolyl (thiazolyl), 1,2-thiazolyl (isothiazolyl), tetrazolyl, pyridinyl (pyridyl)pyridazinyl, pyrimidinyl, pyrazinyl, 1,2,3-triazinyl, 1,2,4-triazinyl, 1,3,5-triazinyl, 1,2,4,5-tetrazinyl, indazolyl, indolyl, benzothiophenyl, benzofuranyl, benzothiazolyl, benzimidazolyl, benzodioxolyl, acridinyl, quinolinyl, isoquinolinyl, quinazolinyl, quinoxalinyl, phthalazinyl, thienothiophenyl, 1,8-naphthyridinyl, other naphthyridinyls, pteridinyl or phenothiazinyl. Where the heteroaryl group includes more than one ring, each additional ring is the saturated form (perhydro form) or the partially unsaturated form (e.g., the dihydro form or tetrahydro form) or the maximally unsaturated (nonaromatic) form. The term heteroaryl thus includes bicyclic radicals in which the two rings are aromatic and bicyclic radicals in which only one ring is aromatic. Such examples of heteroaryl are include 3H-indolinyl, 2(1H)-quinolinonyl, 4-oxo-1,4-dihydroquinolinyl, 2H-1-oxoisoquinolyl, 1,2-dihydroquinolinyl, (2H)quinolinyl N-oxide, 3,4-dihydroquinolinyl, 1,2-dihydroisoquinolinyl, 3,4-dihydro-isoquinolinyl, chromonyl, 3,4-dihydroiso-quinoxalinyl, 4-(3H)quinazolinonyl, 4H-chromenyl, 4-chromanonyl, oxindolyl, 1,2,3,4-tetrahydroisoquinolinyl, 1,2,3,4-tetrahydro-quinolinyl, 1H-2,3-dihydroisoindolyl, 2,3-dihydrobenzo[f]isoindolyl, 1,2,3,4-tetrahydrobenzo-[g]isoquinolinyl, 1,2,3,4-tetrahydro-benzo[g]isoquinolinyl, chromanyl, isochromanonyl, 2,3-dihydrochromonyl, 1,4-benzo-dioxanyl, 1,2,3,4-tetrahydro-quinoxalinyl, 5,6-dihydro-quinolyl, 5,6-dihydroiso-quinolyl, 5,6-dihydroquinoxalinyl, 5,6-dihydroquinazolinyl, 4,5-dihydro-1H-benzimidazolyl, 4,5-dihydro-benzoxazolyl, 1,4-naphthoquinolyl, 5,6,7,8-tetrahydro-quinolinyl, 5,6,7,8-tetrahydro-isoquinolyl, 5,6,7,8-tetrahydroquinoxalinyl, 5,6,7,8-tetrahydroquinazolyl, 4,5,6,7-tetrahydro-1H-benzimidazolyl, 4,5,6,7-tetrahydro-benzoxazolyl, 1H-4-oxa-1,5-diaza-naphthalen-2-onyl, 1,3-dihydroimidizolo-[4,5]-pyridin-2-onyl, 2,3-dihydro-1,4-dinaphtho-quinonyl, 2,3-dihydro-1H-pyrrol[3,4-b]quinolinyl, 1,2,3,4-tetrahydrobenzo[b]-[1,7]naphthyridinyl, 1,2,3,4-tetrahydrobenz[b][1,6]-naphthyridinyl, 1,2,3,4-tetrahydro-9H-pyrido[3,4-b]indolyl, 1,2,3,4-tetrahydro-9H-pyrido[4,3-b]indolyl, 2,3-dihydro-1H-pyrrolo-[3,4-b]indolyl, 1H-2,3,4,5-tetrahydro-azepino[3,4-b]indolyl, 1H-2,3,4,5-tetrahydroazepino-[4,3-b]indolyl, 1H-2,3,4,5-tetrahydro-azepino[4,5-b]indolyl, 5,6,7,8-tetrahydro[1,7]napthyridinyl, 1,2,3,4-tetrahydro-[2,7]-naphthyridyl, 2,3-dihydro[1,4]dioxino[2,3-b]pyridyl, 2,3-dihydro[1,4]-dioxino[2,3-b]pryidyl, 3,4-dihydro-2H-1-oxa[4,6]diazanaphthalenyl, 4,5,6,7-tetrahydro-3H-imidazo-[4,5-c]pyridyl, 6,7-dihydro[5,8]diazanaphthalenyl, 1,2,3,4-tetrahydro[1,5]-napthyridinyl, 1,2,3,4-tetrahydro[1,6]napthyridinyl, 1,2,3,4-tetrahydro[1,7]napthyridinyl, 1,2,3,4-tetrahydro-[1,8]napthyridinyl or 1,2,3, 4-tetrahydro[2,6]napthyridinyl. In some embodiments, heteroaryl groups are optionally substituted. In one embodiment, the one or more substituents are each independently selected from among halo, hydroxy, amino, cyano, nitro, alkylamido, acyl, $C_{1-6}$-alkyl, $C_{1-6}$-haloalkyl, $C_{1-6}$-hydroxyalkyl, $C_{1-6}$-aminoalkyl, $C_{1-6}$-alkylamino, alkylsulfenyl, alkylsulfinyl, alkylsulfonyl, sulfamoyl, or trifluoromethyl.

Examples of heteroaryl groups include, but are not limited to, unsubstituted and mono- or di-substituted derivatives of furan, benzofuran, thiophene, benzothiophene, pyrrole, pyridine, indole, oxazole, benzoxazole, isoxazole, benzisoxazole, thiazole, benzothiazole, isothiazole, imidazole, benzimidazole, pyrazole, indazole, tetrazole, quinoline, isoquinoline, pyridazine, pyrimidine, purine and pyrazine, furazan, 1,2,3-oxadiazole, 1,2,3-thiadiazole, 1,2,4-thiadiazole, triazole, benzotriazole, pteridine, phenoxazole, oxadiazole, benzopyrazole, quinolizine, cinnoline, phthalazine, quinazoline and quinoxaline. In some embodiments, the substituents are halo, hydroxy, cyano, O—$C_{1-6}$-alkyl, $C_{1-6}$-alkyl, hydroxy-$C_{1-6}$-alkyl and amino-$C_{1-6}$-alkyl.

As used herein, the term "arylalkyl" alone or in combination, refers to an alkyl substituted with an aryl that can be optionally substituted.

As used herein, the term "non-aromatic ring" refers to a ring that does not have a delocalized 4n+2 π-electron system.

As used herein, the term "cycloalkyl" refers to a group containing a non-aromatic ring wherein each of the atoms forming the ring is a carbon atom. Cycloalkyls can be formed by three, four, five, six, seven, eight, nine, or more than nine carbon atoms. Cycloalkyls can be optionally substituted. In certain embodiments, a cycloalkyl contains one or more unsaturated bonds. Examples of cycloalkyls include, but are not limited to, cyclopropane, cyclobutane, cyclopentane, cyclopentene, cyclopentadiene, cyclohexane, cyclohexene, 1,3-cyclohexadiene, 1,4-cyclohexadiene, cycloheptane and cycloheptene.

As used herein, the term "arylalkyl" alone or in combination, refers to an alkyl substituted with an aryl that can be optionally substituted.

As used herein, the term "heteroarylalkyl" alone or in combination, refers to an alkyl substituted with a heteroaryl that can be optionally substituted.

As used herein, the substituent "R" appearing by itself and without an accompanying number or letter designation refers to a substituent selected from among alkyl, cycloalkyl, aryl, heteroaryl (bonded through a ring carbon) and non-aromatic heterocycle (bonded through a ring carbon).

As used herein, the term "ester" refers to a chemical moiety with formula —$(R)_n$—COOR', where R and R' are independently selected from alkyl, cycloalkyl, aryl, heteroaryl (bonded through a ring carbon) and non-aromatic heterocycle (bonded through a ring carbon), where n is 0 or 1.

As used herein, the term "amide" refers to a chemical moiety with formula —$(R)_n$—C(O)NHR' or —$(R)_n$—NHC(O)R', where R and R' are independently selected from alkyl, cycloalkyl, aryl, heteroaryl (bonded through a ring carbon) and heteroalicyclic (bonded through a ring carbon), where n is 0 or 1. In certain embodiments, an amide can be an amino acid or a peptide.

Unless otherwise indicated, the term "optionally substituted," refers to a group in which none, one, or more than one of the hydrogen atoms has been replaced with one or more group(s) individually and independently selected from among alkyl, cycloalkyl, aryl, heteroaryl, hydroxy, alkoxy, aryloxy, halo, carbonyl, azido, oxo, cyano, cyanato, carboxy, isocyanato, thiocyanato, isothiocyanato, nitro, silyl, and mono- and di-substituted amino groups.

As used herein, the term "hydrophilic" refers to having an affinity for, attracting, adsorbing, or absorbing water. A hydrophilic moiety tends to dissolve readily in water and is often is not soluble in a fat. Examples of hydrophilic moieties include, without limitation, hydroxyl, hydroxyalkyl, alkoxy (methoxy, ethoxy), phenol, carboxylic acids and salts thereof, methyl and ethyl esters of carboxylic acids, amides, amino, aminoalkyl, cyano, ammonium salts, monoalkyl-substituted amino groups, di-alkyl-substituted amino groups, sulfonium salts, phosphonium salts, polyalkyleneglycols (e.g., polyethyleneglycols and polypropyleneglycols), epoxy groups, acrylates, sulfonamides, nitro, guanidinium, aminate, acrylamide, and pyridinium groups, poly(oxyalkylene) groups, glucoside groups, poly(glucoside) groups, and glycidal, isocyanato, and glycidal alkyl groups.

As used herein, the term "hydrophobic" refers to refers to lacking an affinity for, repelling, or failing to absorb water. A hydrophobic moiety tends not to dissolve readily in water, is often fat-soluble and generally is nonpolar. Hydrophobic moieties include, but are not limited to, hydrocarbons, such as alkanes, alkenes, alkynes, cycloalkanes, cycloalkenes, cycloalkynes, haloalkanes, haloalkenes, haloalkynes, aromatic hydrocarbons, such as aryls, arylalkyl, heteroaryl, heteroarylaklyl, certain saturated and unsaturated heterocycles, lipids, steroids, sterols such as cholesterol, terpenes, and moieties that are substantially similar to the side chains of hydrophobic natural and unnatural α-amino acids, including valine, leucine, isoleucine, methionine, phenylalanine, α-amino isobutyric acid, alloisoleucine, tyrosine, and tryptophan.

As used herein, the terms "silicone" and "siloxane" are synonymous. As used herein, the term "siloxane" refers to a class of compounds that include alternate silicon and oxygen atoms, and can include carbon and hydrogen atoms. A siloxane contains a repeating silicon-oxygen backbone and can include organic groups $R^S$ attached to a significant proportion of the silicon atoms by silicon-carbon bonds. In commercial silicones most $R^S$ groups are methyl; longer alkyl, fluoroalkyl, phenyl, vinyl, and a few other groups are substituted for specific purposes. Some of the $R^S$ groups also can be hydrogen, chlorine, alkoxy, acyloxy, or alkylamino. These polymers can be combined with fillers, additives, and solvents to result in products classed as silicones. See Kirk-Othmer *Encyclopedia of Polymer Science and Technology*, Volume 15, John Wiley & Sons, Inc. (New York: 1989), pages 204-209, 234-265, incorporated herein by reference. The siloxanes include any organosilicone polymers or oligomers having a linear or cyclic, branched or crosslinked structure, of variable molecular weight, and essentially based on recurring structural units in which the silicone atoms are linked to each other by oxygen atoms (—Si—O—Si—), and where optionally substituted, substituents can be linked via a carbon atom to the silicone atoms.

As used herein, the term "polysiloxane" refers to a polymeric material that includes siloxane units, where the Si atom can include alkyl or aryl substituents. For example, a polymer that includes ($R^S_2$SiO), where $R^S$ is methyl is known as a methylsiloxane or dimethylsiloxane.

As used herein, the term "cyclosiloxane" refers to a cyclic siloxane.

As used herein, "solvent" refers to a compound capable of solubilizing (dissolving, making miscible, etc.) another compound or solute. Exemplary solvents include, but are not limited to, water, monohydric alcohols (e.g., methanol, ethanol), dihydric alcohols (e.g., ethylene glycol and propylene glycol), trihydric alcohols (e.g., trimethylolpropane and glycerol), tetrahydric alcohols (pentaerythritol), hexahydric alcohols (e.g., sorbitol), hydrocarbons such as alkanes (e.g., hexane), alkenes and alkynes, ethers, esters, ketones, oils, polar or non-polar solvents and silicone fluids (e.g., organosilicon compounds having a hydroxyl group via an organic group bound to the silicon atom).

As used herein, "partition" refers to the interaction or distribution of a material, such as a surfactant, between two immiscible solvents or materials.

As used herein, "heat stable" refers to the ability of an ingredient to withstand exposure to elevated temperatures or thermal processing such that it does not lose one or more functional properties.

As used herein, "anti-microbial agent" refers to a molecule or compound suitable for use in a formulation, such as a cosmetic, personal care, paper or textile application, that reduces or prevents microorganism growth. See, for example, U.S. Pat. Nos. 3,202,514 and 3,915,889. Examples of anti-microbial agents include, but are not limited to, sorbic acid and its salts, such as calcium sorbate, sodium sorbate and potassium sorbate, and benzoic acid and its salts, such as calcium benzoate, sodium benzoate and potassium benzoate, natamycin (pimaricin), nisin, and propionic acid and its salts.

As used herein, "rheology" refers to a study of the change in form and flow of matter under the influence of stresses, embracing elasticity, viscosity, and plasticity. For example, when liquids are subjected to stress they will deform irreversibly and flow. The measurement of this flow is the measurement of viscosity.

As used herein, "shear rate" refers to shearing forces experienced by a liquid. A unit of measure thereof is a "reciprocal second" ($sec^{-1}$).

As used herein, "shear stress" refers to the force per unit area required to produce the shearing action. A unit of measurement therefore is "dynes per square centimeter" (dynes/$cm^2$).

As used herein, "viscosity" refers to the tendency of a fluid to resist flow and is defined as shear stress divided by shear strain. A fundamental unit of viscosity measurement is the "poise." A material requiring a shear stress of one dyne per square centimeter to produce a shear rate of one reciprocal second has a viscosity of one poise, or 100 centipoise (cP). Viscosity measurements can be expressed in "Pascal-seconds" (Pa·s) or "milli-Pascal-seconds" (mPa·s), which are units of the International System and are sometimes used in preference to the Metric designations. One Pascal-second is equal to ten poise; one milli-Pascal-second is equal to one centipoise (cP). Conditions used to measure the viscosity should be provided since non-ideal liquids have different values of viscosity for different test conditions of shear rate, shear stress and temperature.

As used herein, "fluid" refers to a substance that undergoes continuous deformation when subjected to shear stress.

As used herein, "Newtonian fluid" or "fluid that has a Newtonian flow" refers to a fluid whose viscosity is independent of the shear on the fluid. Examples of Newtonian liquids are mineral oil, water and molasses.

As used herein, "pseudoplastic fluid" refers to a liquid having a viscosity that changes with the shear it encounters, and specifically for a fluid where increasing shear rate results in a gradual decreasing shear stress, or a thinning of viscosity with increasing shear.

As used herein, the term "contacting" refers to bringing two or more materials into close enough proximity whereby they can interact. In certain embodiments, contacting can be accomplished in a vessel such as a test tube, a Petri dish, or the like. In certain embodiments, contacting can be performed in the presence of additional materials. In certain embodiments, contacting can be performed in the presence of cells. In certain of such embodiments, one or more of the materials that are being contacted can be inside a cell. Cells can be alive or can be dead. Cells can or can not be intact.

As used herein, "derivative" of a molecule refers to a compound derived from or a modified version of the molecule.

As used herein, an "analog" of a molecule refers to a compound having a similar structure and similar chemical properties to those of another compound, but differs from it by a change in an element or group, such as by modification of side chains, replacement of one or more atoms or substitutions, or addition of one or more substitutions.

As used herein, the term "triglyceride" means a lipid or neutral fat consisting of glycerol combined with three fatty acid molecules.

As used herein, a "combination" refers to any association between two or among more items. The association can be spatial or refer to the use of the two or more items for a common purpose.

As used herein, a "composition" refers to any mixture of two or more products or compounds (e.g., agents, modulators, regulators, etc.). It can be a solution, a suspension, liquid, powder, a paste, aqueous or non-aqueous formulations or any combination thereof.

As used herein, an "article of manufacture" is a product that is made and sold. As used throughout this application, the term is intended to encompass the transdermal drug delivery compositions described herein contained in articles of packaging.

As used herein, a "kit" refers to a combination in which items or components are packaged optionally with instructions for use and/or reagents and apparatus for use with the combination.

As used herein, "animal" includes any animal, such as, but not limited to, primates including humans, gorillas and monkeys; rodents, such as mice and rats; fowl, such as chickens; ruminants, such as goats, cows, deer, sheep; ovine, such as pigs and other animals. Non-human animals exclude humans as the contemplated animal.

As used herein, the singular forms "a," "an" and "the" include plural referents unless the context clearly dictates otherwise.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where the event or circumstance occurs and instances where it does not. For example, an optionally substituted group means that the group is unsubstituted or is substituted.

As used herein, the abbreviations for any protective groups, amino acids and other compounds, are, unless indicated otherwise, in accord with their common usage, recognized abbreviations, or the IUPAC-IUB Commission on Biochemical Nomenclature (see, e.g., *Biochem.* 11:1726 (1972)).

As used herein, the term "sample" refers to any composition, whether liquid, gas or solid, that includes a molecule or material to be detected or examined. A sample can be water or a buffered solution or be composed of any artificially introduced chemicals, and may or may not contain nucleic acids, amino acids or peptides. The sample can be a biological sample, such as a biological fluid or a biological tissue obtained from any organism or a cell of or from an organism or a viral particle or portions thereof.

As used herein, the term "hard metal" refers to any of the classes of materials called "hard metals" in the metallurgical literature and generally refers to what is obtained by sintering a carbide, nitride, boride, or silicide of a metal of Groups IV, V, or VI in the Periodic Table of Elements by the use of a binder of such a metal as Co, Ni, or Fe or an alloy thereof. Hard metals are refractory compounds of heavy metals such as tungsten, tantalum, uranium, niobium, titanium and zirconium, and in particular, the carbides, nitrides, silicides, oxides, and borides of these metals. Hard metals have the refractory properties of hardness which cause the entire group to be known to metallurgists as hard metals. These materials are generally prepared in a finely particulate form bound by a suitable matrix metal, such as an iron group metal, viz. iron, cobalt or nickel. Hardened steel is also considered a hard metal.

As used herein, the term "soft metal" refers to a metal having a modulus of elasticity well below that of steel. Examples of common soft metal materials include aluminum, tin, zinc, lead, copper, copper alloys, aluminum alloys, copper-tin alloys and lead-tin alloys.

As used herein "subunit a" refers to the subunit portion of the polymer compounds of Formula I provided herein that are repeated "a" times. Each "subunit a" of Formula I has the following structure:

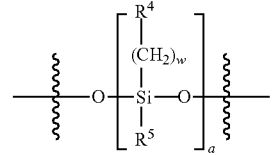

where, e.g., each occurrence of $R^4$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl, a cyclosiloxane having three or more Si atoms and a substituted cyclosiloxane having three or more Si atoms; each occurrence of $R^5$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl and butylated aryloxypropyl; a is 1 to 50; and w is 0 to 10.

As used herein "subunit b" refers to the subunit portion of the polymer compounds of Formula I provided herein that are repeated "b" times. Each "subunit b" of Formula I has the following structure:

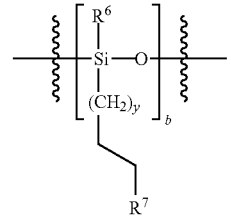

where, e.g., each occurrence of $R^6$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl and butylated aryloxypropyl; each occurrence of $R^7$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl, a cyclosiloxane having three or more Si atoms and a substituted cyclosiloxane having three or more Si atoms; b is 1 to 50; and y is 0 to 10.

As used herein "subunit q" refers to the subunit portion of the polymer compounds of Formula I provided herein that are repeated "q" times. Each "subunit q" of Formula I has the following structure:

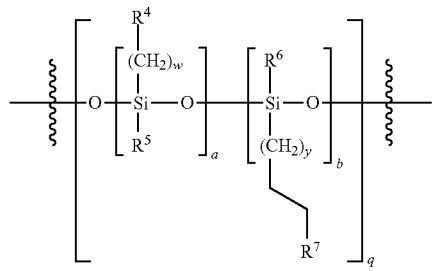

where, e.g., each occurrence of $R^4$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl, a cyclosiloxane having three or more Si atoms and a substituted cyclosiloxane having three or more Si atoms; each occurrence of $R^5$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl and butylated aryloxypropyl; each occurrence of $R^6$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl and butylated aryloxypropyl; each occurrence of $R^7$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl, a cyclosiloxane having three or more Si atoms and a substituted cyclosiloxane having three or more Si atoms; a is 1 to 50; b is 1 to 50; w is 0 to 10; and y is 0 to 10.

B. Silicones

Silicones or siloxanes, including organo-substituted polysiloxanes, are known in the art. These include dimethylpolysiloxanes, methylphenylpolysiloxanes, cyclic silicones, and also amino-, fatty acid-, alcohol-, polyether-, epoxy-, fluorine-, glycoside- and/or alkyl-modified silicone compounds, which at room temperature can be in either liquid or resinous form, linear polysiloxanes, dimethicone (e.g., Dow Corning 200 fluid), dimethiconol, cyclic silicone fluids, cyclopentasiloxanes (e.g., Dow Corning 345 fluid), phenyltrimethicone (e.g., Dow Corning 556 fluid), and dimethicones, which are mixtures of dimethicones having an average chain length of from 200 to 300 dimethylsiloxane units with hydrogenated silicates. For a detailed survey of silicones known in the art, see Todd et al., Cosm. Toil. 91: 27 (1976).

Organopolysiloxane fluids are known lubricants. For many of these polymers to function as effective lubricants, however, additives, such as chlorinated phosphites and chlorinated phosphonate additives, must be included to impart superior anti-wear properties. Although any chlorinated phosphite or phosphonate may be utilized, the most often used for most silicone lubricants is tris-chloroethylphosphite and bis-chloroethylchloroethyl-phosphonate. It should be noted that it has been theorized that the tris-chloroethylphosphite changes to a bis-chloroethylchloroethyl phosphonate over time, at which point the two compounds are in equilibrium with each other. It has been found that these two compounds are the most effective anti-wear additives for the prior art silicone lubricants with respect to soft metals, such as, copper, brass or bronze. Generally, at least 0.01 parts by weight or more of the chlorinated phosphite or phosphonate are needed per 100 parts by weight of the prior art organopolysiloxane polymers for the phosphite or phosphonate to impart to the silicone lubricant sizable anti-wear properties for soft metals. Chlorinated phosphites and phosphonates are commercially available.

Dimethylpolysiloxanes are general lubricants but have poor anti-wear characteristics when used to lubricate steel on steel sliding surfaces. Fluorosilicones, such as trifluoro-propylinethylpolysiloxanes, are much better lubricants for steel on steel but exhibit poor lubrication for steel on brass and steel on aluminum. Thus, the fluorosilicone fluids find only limited use in environments requiring lubrication of metal surfaces other than or in addition to steel on steel.

C. Description of the Compounds

The polysiloxanes provided herein include at least one cyclosiloxane substituent. The cyclosiloxane substituents protect the linear polysiloxane backbone from the chemical effects of oxygen and heat and mechanical breakdown due to shear. The degree of substitution (i.e., the number of cyclosiloxane substituents) can be varied to modify the viscosity of the polymer, such as to provide polysiloxanes having high boiling points with the desired viscosity. In some embodiments, it has been observed that the higher the number of cyclosiloxane substituents, the greater the oxidative and thermal stability of the polymer. In some embodiments, aryl or haloalkyl substituents can be included on the polysiloxane, in addition to the cyclosiloxane substituents. The addition of aryl and/or haloalkyl substituents can yield polymers with enhanced thermal and/or oxidative stability. Thus, the cyclosiloxane-substituted polysiloxanes provided herein exhibit excellent thermal stability, lubricity, viscosity and oxidative stability.

The polysiloxanes that include at least one cyclosiloxane substituent as provided herein exhibit enhanced thermal stability and resistance to oxygen and oxidation and exhibit good film forming ability on many surfaces, including metal, glass, plastic, textiles, leather and paper. The substituted polysiloxanes provided herein, which include at least one cyclosiloxane substituent, exhibit good hard metal and soft metal lubricating properties and anti-wear properties and do not require the addition of additives, such as chlorinated phosphites and chlorinated phosphonate additives to impart anti-wear properties.

The cyclosiloxane-substituted polysiloxanes provided herein exhibit enhanced lubricating properties and anti-wear properties when used as a lubricant for lubricating soft metals as well as for hard metals. The presence of the one or more cyclosiloxane substituents on the polysiloxane provides improved anti-wear characteristics on steel on brass, e.g., as compared to fluorosilicones, and the thermal stability of the cyclosiloxane-substituted polysiloxanes is increased, thus rendering the cyclosiloxane-substituted polysiloxanes suitable for the high temperature lubrication of various metals and thus are ideal for lubrication of mechanical devices.

The substituted polysiloxanes provided herein, which include at least one cyclosiloxane substituent, exhibit good hard metal and soft metal lubricating properties and anti-wear properties and do not require the addition of additives, such as chlorinated phosphites and chlorinated phosphonate additives to impart anti-wear properties. These additives can be included in formulations that include the cyclosiloxane-substituted polysiloxanes provided herein, but are not required. The presence of the one or more cyclosiloxane substituents on the polysiloxane provides improved anti-wear characteristics on steel on brass, e.g., as compared to fluorosilicones, and the thermal stability of the cyclosiloxane-substituted polysiloxanes is increased, thus rendering the cyclosiloxane-substituted polysiloxanes suitable for the high temperature lubrication of various metals. Because the cyclosiloxane-substituted polysiloxanes provided herein exhibit excellent thermal stability, lubricity, viscosity and oxidative stability as well as high compressibility, they are particularly useful as a hydraulic fluid. The cyclosiloxane-substituted polysiloxanes provided herein also exhibit anti-foam activity and form films that are resistant to the transmission of water, and thus can be used as water repellents. In some embodiments, the cyclosiloxane-substituted polysiloxanes provided herein can be applied to a textile or leather and the films formed thereby exhibit very good water resistance, drape and handfeel. On some substrates, the films formed by the cyclosiloxane-substituted polysiloxanes provided herein exhibit a preferential adhesion to one substrate compared to another substrate. Thus, in some embodiments, the cyclosiloxane-substituted polysiloxanes provided herein can be used as release agents or in release coatings that are applied to a first substrate to prevent or decrease the adhesion of a second substance to the first substrate. In personal care and cosmetic applications, the cyclosiloxane-substituted polysiloxanes provided herein provide smooth silky feel on dry-down.

1. Cyclosiloxane-Substituted Polysiloxanes of Formula I

Provided are substituted polysiloxanes of formula I:

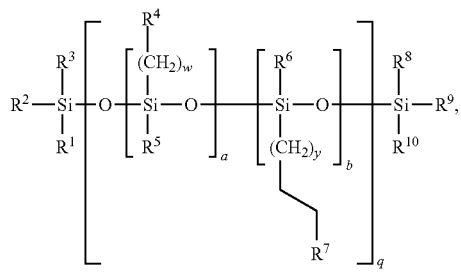

(I)

where:

$R^1$ and $R^2$ each independently is selected from among $C_1$-$C_{20}$ alkyl and substituted $C_1$-$C_{20}$ alkyl;

$R^3$ is selected from among $C_1$-$C_{20}$ alkyl, substituted $C_1$-$C_{20}$ alkyl, $C_3$-$C_{20}$ cycloalkyl, substituted $C_3$-$C_{20}$ cycloalkyl, a cyclosiloxane having three or more Si atoms and a substituted cyclosiloxane having three or more Si atoms;

each occurrence of $R^4$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl, a cyclosiloxane having three or more Si atoms and a substituted cyclosiloxane having three or more Si atoms;

each occurrence of $R^5$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl and butylated aryloxypropyl;

each occurrence of $R^6$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl and butylated aryloxypropyl;

each occurrence of $R^7$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl, a cyclosiloxane having three or more Si atoms and a substituted cyclosiloxane having three or more Si atoms;

$R^8$ and $R^9$ each independently is selected from among alkyl and substituted alkyl;

$R^{10}$ is selected from among alkyl, substituted alkyl, cycloalkyl, substituted cycloalkyl, a cyclosiloxane having three or more Si atoms and a substituted cyclosiloxane having three or more Si atoms;

a is selected from among 1 to 50;
b is selected from among 1 to 50;
q is selected from among 2 to 50;
w is selected from among 0 to 10;
y is selected from among 0 to 10;
with the proviso that $R^7$ is a cyclosiloxane when b=1.

The compounds of formula I include at least 1 non-terminal optionally substituted cyclosiloxane substituent, e.g., at position $R^4$ or $R^7$ of at least one subunit q. The cyclosiloxane has at least 3 Si atoms. In some embodiments, the cyclosiloxane is selected from among a cycloheptasiloxane, cyclohexasiloxane, cyclopentasiloxane, cyclotetrasiloxane and cyclotrisiloxane. In some embodiments, the cyclosiloxane is selected from among decamethyl cyclopentasiloxane, dodecamethyl cyclohexasiloxane, tetradecamethyl cycloheptasiloxane, octamethyl cyclotetrasiloxane, decamethyl cyclopentasiloxane, dodecamethyl cyclohexasiloxane and tetradecamethyl cycloheptasiloxane. The cyclosiloxanes can be substituted or unsubstituted. In some embodiments, the cyclosiloxane is substituted with a group selected from among halogen, hydroxy, $C_1$-$C_6$ alkyl, $C_1$-$C_6$ alkoxyl, $C_1$-$C_6$ haloalkyl, $C_1$-$C_6$ heteroalkyl, $C_3$-$C_{10}$ aryl, $C_3$-$C_{10}$ heteroaryl and $C_3$-$C_{10}$ aryl substituted with halogen or $C_1$-$C_6$ haloalkyl.

In some embodiments, $R^1$ is selected from among an optionally substituted $C_1$-$C_{10}$ alkyl. In some embodiments, $R^1$ is selected from among an optionally substituted $C_1$-$C_6$ alkyl. In some embodiments, $R^1$ is selected from among an optionally substituted $C_2$-$C_{10}$ alkyl. In some embodiments, $R^1$ is selected from among methyl, ethyl, propyl, butyl, pentyl, hexyl, heptyl, octyl, nonyl and decyl. In some embodiments, $R^1$ is selected from among an $C_1$-$C_{10}$ alkyl substituted with one or more substituents selected from among halogen, hydroxyl, $C_1$-$C_6$ alkoxyl, $C_1$-$C_6$ haloalkyl, $C_1$-$C_6$ heteroalkyl, $C_3$-$C_{10}$ aryl and $C_3$-$C_{10}$ heteroaryl.

In some embodiments, $R^2$ is selected from among an optionally substituted $C_1$-$C_{10}$ alkyl. In some embodiments, $R^2$ is selected from among an optionally substituted $C_1$-$C_6$ alkyl. In some embodiments, $R^2$ is selected from among an optionally substituted $C_2$-$C_{10}$ alkyl. In some embodiments, $R^2$ is selected from among methyl, ethyl, propyl, butyl, pentyl, hexyl, heptyl, octyl, nonyl and decyl. In some embodiments, $R^2$ is selected from among an $C_1$-$C_{10}$ alkyl substituted with one or more substituents selected from among halogen, hydroxyl, $C_1$-$C_6$ alkoxyl, $C_1$-$C_6$ haloalkyl, $C_1$-$C_6$ heteroalkyl, $C_3$-$C_{10}$ aryl and $C_3$-$C_{10}$ heteroaryl.

In some embodiments, $R^3$ is selected from among optionally substituted $C_1$-$C_{10}$ alkyl, optionally substituted $C_3$-$C_{20}$ cycloalkyl and an optionally substituted cyclosiloxane having three or more Si atoms. In some embodiments, $R^3$ is selected from among optionally substituted $C_1$-$C_{10}$ alkyl, optionally substituted $C_3$-$C_{10}$ cycloalkyl and an optionally substituted cyclosiloxane having three or more Si atoms. In some embodiments, $R^3$ is selected from among optionally substituted $C_2$-$C_{10}$ alkyl, optionally substituted $C_3$-$C_{20}$ cycloalkyl and an optionally substituted cyclosiloxane having three or more Si atoms. In some embodiments, $R^3$ is selected from among optionally substituted $C_1$-$C_6$ alkyl, optionally substituted $C_3$-$C_{10}$ cycloalkyl and an optionally substituted cyclosiloxane having three or more Si atoms. In some embodiments, $R^3$ is selected from among an optionally substituted $C_1$-$C_{10}$ alkyl. In some embodiments, $R^3$ is selected from among an optionally substituted $C_1$-$C_6$ alkyl. In some embodiments, $R^3$ is selected from among an optionally substituted $C_2$-$C_{10}$ alkyl. In some embodiments, $R^3$ is selected from among methyl, ethyl, propyl, butyl, pentyl, hexyl, heptyl, octyl, nonyl and decyl. In some embodiments, $R^3$ is selected from among an optionally substituted $C_3$-$C_{10}$ cycloalkyl. In some embodiments, $R^3$ is selected from among an optionally substituted $C_3$-$C_6$ cycloalkyl. In some embodiments, $R^3$ is selected from among an optionally substituted $C_6$-$C_{10}$ cycloalkyl. In some embodiments, $R^3$ is an optionally substituted cyclosiloxane having at least four Si atoms. In some embodiments, $R^3$ is an optionally substituted cyclosiloxane having 4, 5, 6, 7, 8, 9, 10, 11, 12, 13, 14, 15, 16, 17, 18, 19 or 20 Si atoms. In some embodiments, one or more $R^3$ is cyclosiloxane substituted with one or more moieties selected from among alkyl, haloalkyl, heteroalkyl, cycloalkyl, optionally substituted aryl, heteroaryl, non-aromatic heterocycle, hydroxy, alkoxy, aryloxy, mercapto, alkylthio, arylthio, cyano, halo, carbonyl, thiocarbonyl, O-carbamyl, N carbamyl, O thiocarbamyl, N thiocarbamyl, C amido, N amido, S-sulfonamido, N sulfonamido, azido, diazo, imino, formylamino, fluoro, iodo, oxo, cyano, cyanato, carboxy, C trihalomethanesulfonyl, O carboxy, isocyanato, thiocyanato, isothiocyanato, nitro, silyl, and amino, and mono- and di-substituted amino groups. In some embodiments, $R^3$ is cyclosiloxane substituted with one or more moieties selected from among halogen, hydroxyl, $C_1$-$C_6$ alkoxyl, $C_1$-$C_6$ haloalkyl, $C_1$-$C_6$ heteroalkyl, $C_3$-$C_{10}$ aryl and $C_3$-$C_{10}$ heteroaryl.

In some embodiments, the $R^4$ in each subunit a independently is selected from among optionally substituted $C_1$-$C_{10}$ alkyl, optionally substituted $C_1$-$C_{20}$ haloalkyl, optionally substituted $C_6$-$C_{20}$ aryl, optionally substituted $C_6$-$C_{20}$ heteroaryl, a cyclosiloxane having three or more Si atoms and a substituted cyclosiloxane having three or more Si atoms. In some embodiments, the $R^4$ in each subunit a independently is selected from among optionally substituted $C_1$-$C_{10}$ alkyl, optionally substituted $C_1$-$C_{10}$ haloalkyl, optionally substituted $C_6$-$C_{20}$ aryl and optionally substituted $C_6$-$C_{20}$ heteroaryl. In some embodiments, the $R^4$ in each subunit a independently is selected from among $C_1$-$C_{10}$ alkyl, $C_1$-$C_{10}$ haloalkyl, $C_6$-$C_{20}$ aryl and $C_6$-$C_{20}$ heteroaryl. In some embodiments, the $R^4$ in each subunit a independently is selected from among $C_1$-$C_{10}$ alkyl, $C_1$-$C_{10}$ haloalkyl, $C_6$-$C_{20}$ aryl and $C_6$-$C_{20}$ heteroaryl, where one or more of the alkyl, haloalkyl, aryl and/or heteroaryl groups is substituted with one or more substituents selected from among halogen, hydroxyl, $C_1$-$C_6$ alkyl, $C_1$-$C_6$ alkoxyl, $C_1$-$C_6$ haloalkyl, $C_1$-$C_6$ heteroalkyl, $C_3$-$C_{10}$ aryl and $C_3$-$C_{10}$ heteroaryl. In some embodiments, the $R^4$ in each subunit a independently is selected from among optionally substituted $C_1$-$C_{10}$ alkyl, optionally substituted $C_1$-$C_{10}$ haloalkyl, optionally substituted $C_6$-$C_{18}$ aryl and optionally substituted $C_6$-$C_{18}$ heteroaryl. In some embodiments, the $R^4$ in each subunit a independently is selected from among optionally substituted $C_1$-$C_{10}$ alkyl, optionally substituted $C_1$-$C_{10}$ haloalkyl, optionally substituted $C_6$-$C_{12}$ aryl and optionally substituted $C_6$-$C_{12}$ heteroaryl. In some embodiments, the $R^4$ in each subunit a independently is selected from among optionally substituted $C_2$-$C_8$ alkyl, optionally substituted $C_1$-$C_{10}$ haloalkyl, optionally substituted $C_6$-$C_{12}$ aryl and optionally substituted $C_6$-$C_{12}$ heteroaryl. In some embodiments, the $R^4$ in each subunit a independently is selected from among optionally substituted $C_2$-$C_{10}$ alkyl, optionally substituted $C_2$-$C_{10}$ haloalkyl, optionally substituted $C_6$-$C_{12}$ aryl and optionally substituted $C_6$-$C_{12}$ heteroaryl. In some embodiments, the $R^4$ in each subunit a independently is selected from among an optionally substituted $C_1$-$C_{10}$ alkyl. In some embodiments, the $R^4$ in each subunit a independently is selected from among an optionally substituted $C_1$-$C_6$ alkyl. In some embodiments, the $R^4$ in each subunit a independently is selected from among an optionally substituted $C_2$-$C_{10}$ alkyl. In some embodiments, the $R^4$ in each subunit a independently is selected from among methyl, ethyl, propyl, butyl, pentyl, hexyl, heptyl, octyl, nonyl and decyl. In some embodiments, the $R^4$ in each subunit a independently is selected from among an optionally substituted $C_1$-$C_{10}$ haloalkyl. In some embodiments, the $R^4$ in each subunit a independently is selected from among an optionally substituted $C_1$-$C_6$ haloalkyl. In some embodiments, the $R^4$ in each subunit a independently is selected from among an optionally substituted $C_2$-$C_{10}$ haloalkyl. In some embodiments, one or more $R^4$ is trifluoropropyl. In some embodiments, in each $R^4$ in each subunit a independently is selected from among an optionally substituted $C_6$-$C_{18}$ aryl. In some embodiments, the $R^4$ in each subunit a independently is selected from among an optionally substituted $C_6$-$C_{12}$ aryl. In some embodiments, the $R^4$ in each subunit a independently is selected from among an optionally substituted $C_6$-$C_{10}$ aryl. In some embodiments, one or more $R^4$ is an optionally substituted phenyl. In some embodiments, the $R^4$ in each subunit a independently is selected from among an optionally substituted $C_6$-$C_{18}$ heteroaryl. In some embodiments, the $R^4$ in each subunit a independently is selected from among an optionally substituted $C_6$-$C_{12}$ heteroaryl. In some embodiments, the $R^4$ in each subunit a independently is selected from among an optionally substituted $C_6$-$C_{10}$ heteroaryl.

In some embodiments, one or more $R^4$ is a cyclosiloxane having three or more Si atoms. In some embodiments, $R^4$ is an optionally substituted cyclosiloxane having at least four Si atoms. In some embodiments, $R^4$ is an optionally substituted cyclosiloxane having 3, 4, 5, 6, 7, 8, 9, 10, 11, 12, 13, 14, 15, 16, 17, 18, 19 or 20 Si atoms. In some embodiments, one or more $R^4$ is a cyclosiloxane having 3-8 Si atoms. In some embodiments, one or more $R^4$ is a cyclosiloxane having 4-6 Si atoms. In some embodiments, one or more $R^4$ is a substituted cyclosiloxane having three or more Si atoms. In some embodiments, one or more $R^4$ is a substituted cyclosiloxane having 3-8 Si atoms. In some embodiments, one or more $R^4$ is a substituted cyclosiloxane having 4-6 Si atoms. In some embodiments, one or more $R^4$ is a substituted cyclosiloxane having 3, 4, 5, 6, 7 or 8 Si atoms. In some embodiments, one or more $R^4$ is cyclosiloxane substituted with one or more moieties selected from among alkyl, haloalkyl, heteroalkyl, cycloalkyl, optionally substituted aryl, heteroaryl, non-aromatic heterocycle, hydroxy, alkoxy, aryloxy, mercapto, alkylthio, arylthio, cyano, halo, carbonyl, thiocarbonyl, O-carbamyl, N carbamyl, O thiocarbamyl, N thiocarbamyl, C amido, N amido, S-sulfonamido, N sulfonamido, azido, diazo, imino, formylamino, fluoro, iodo, oxo, cyano, cyanato, carboxy, C trihalomethanesulfonyl, O carboxy, isocyanato, thiocyanato, isothiocyanato, nitro, silyl, and amino, and mono- and di-substituted amino groups. In some embodiments, one or more $R^4$ is cyclosiloxane substituted with one or more moieties selected from among hydrogen, halogen, hydroxyl, $C_1$-$C_6$ alkyl, $C_1$-$C_6$ alkoxy, $C_1$-$C_6$ haloalkyl, $C_1$-$C_6$ heteroalkyl, $C_3$-$C_{10}$ aryl, $C_3$-$C_{10}$ heteroaryl and $C_3$-$C_{10}$ aryl substituted with halogen or $C_1$-$C_6$ haloalkyl. In some embodiments, one or more $R^4$ is cyclosiloxane substituted with one or more moieties selected from among halogen, hydroxyl, $C_1$-$C_4$ alkyl, $C_1$-$C_4$ alkoxy, $C_1$-$C_4$ haloalkyl, $C_3$-$C_{10}$ aryl and $C_3$-$C_{10}$ aryl substituted with halogen or $C_1$-$C_6$ haloalkyl.

In some embodiments, the $R^5$ in each subunit a independently is selected from among optionally substituted $C_1$-$C_{10}$ alkyl, optionally substituted $C_1$-$C_{20}$ haloalkyl, optionally substituted $C_6$-$C_{20}$ aryl, optionally substituted $C_6$-$C_{20}$ heteroaryl and butylated aryloxypropyl. In some embodiments, the $R^5$ in each subunit a independently is selected from among optionally substituted $C_1$-$C_{10}$ alkyl, optionally substituted $C_1$-$C_{10}$ haloalkyl, optionally substituted $C_6$-$C_{20}$ aryl, optionally substituted $C_6$-$C_{20}$ heteroaryl and butylated aryloxypropyl. In some embodiments, the $R^5$ in each subunit a independently is selected from among optionally substituted $C_1$-$C_{10}$ alkyl, optionally substituted $C_1$-$C_{10}$ haloalkyl, optionally substituted $C_6$-$C_{12}$ aryl, optionally substituted $C_6$-$C_{20}$ heteroaryl and butylated aryloxypropyl. In some embodiments, the $R^5$ in each subunit a independently is selected from among optionally substituted $C_1$-$C_{10}$ alkyl, optionally substituted $C_1$-$C_{10}$ haloalkyl, optionally substituted $C_6$-$C_{12}$ aryl and optionally substituted $C_6$-$C_{12}$ heteroaryl. In some embodiments, the $R^5$ in each subunit a independently is selected from among an optionally substituted $C_1$-$C_{10}$ alkyl. In some embodiments, the $R^5$ in each subunit a independently is selected from among an optionally substituted $C_1$-$C_6$ alkyl. In some embodiments, the $R^5$ in each subunit a independently is selected from among an optionally substituted $C_2$-$C_{10}$ alkyl. In some embodiments, the $R^5$ in each subunit a independently is selected from among methyl, ethyl, propyl, butyl, pentyl, hexyl, heptyl, octyl, nonyl and decyl. In some embodiments, the $R^5$ in each subunit a independently is selected from among $C_1$-$C_{10}$ alkyl, $C_1$-$C_{10}$ haloalkyl, $C_6$-$C_{20}$ aryl and $C_6$-$C_{20}$ heteroaryl. In some embodiments, the $R^5$ in each subunit a independently is selected from among $C_1$-$C_{10}$ alkyl, $C_1$-$C_{10}$ haloalkyl, $C_6$-$C_{20}$ aryl and $C_6$-$C_{20}$ heteroaryl, where one or more of the alkyl, haloalkyl, aryl and/or heteroaryl groups is substituted with one or more substituents selected from among halogen, hydroxyl, $C_1$-$C_6$ alkyl, $C_1$-$C_6$ alkoxyl, $C_1$-$C_6$ haloalkyl, $C_1$-$C_6$ heteroalkyl, $C_3$-$C_{10}$ aryl and $C_3$-$C_{10}$ heteroaryl. In some embodiments, the $R^5$ in each subunit a independently is selected from among an optionally substituted $C_1$-$C_{10}$ haloalkyl. In some embodiments, the $R^5$ in each subunit a independently is selected from among an optionally substituted $C_1$-$C_6$ haloalkyl. In some embodiments, the $R^5$ in each subunit a independently is selected from among an optionally substituted $C_2$-$C_{10}$ haloalkyl. In some embodiments, one or more $R^5$ is trifluoropropyl. In some embodiments, the $R^5$ in each subunit a independently is selected from among an optionally substituted $C_6$-$C_{18}$ aryl. In some embodiments, the $R^5$ in each subunit a independently is selected from among an optionally substituted $C_6$-$C_{12}$ aryl. In some embodiments, the $R^5$ in each subunit a independently is selected from among an optionally substituted $C_6$-$C_{10}$ aryl. In some embodiments, one or more $R^5$ is an optionally substituted phenyl. In some embodiments, the $R^5$ in each subunit a independently is selected from among an optionally substituted $C_6$-$C_{18}$ heteroaryl. In some embodiments, the $R^5$ in each subunit a independently is selected from among an optionally substituted $C_6$-$C_{12}$ heteroaryl. In some embodiments, the $R^5$ in each subunit a independently is selected from among an optionally substituted $C_6$-$C_{10}$ heteroaryl. In some embodiments, at least one $R^5$ is butylated aryloxypropyl. In some embodiments, at least one $R^5$ is trifluoropropyl. In some embodiments, at least one $R^5$ is phenyl.

In some embodiments, the $R^6$ in each subunit b independently is selected from among optionally substituted $C_1$-$C_{10}$ alkyl, optionally substituted $C_1$-$C_{20}$ haloalkyl, optionally substituted $C_6$-$C_{20}$ aryl, optionally substituted $C_6$-$C_{20}$ heteroaryl and butylated aryloxypropyl. In some embodiments, the $R^6$ in each subunit b independently is selected from among optionally substituted $C_1$-$C_{10}$ alkyl, optionally substituted $C_1$-$C_{10}$ haloalkyl, optionally substituted $C_6$-$C_{20}$ aryl, optionally substituted $C_6$-$C_{20}$ heteroaryl and butylated aryloxypropyl. In some embodiments, the $R^6$ in each subunit b independently is selected from among optionally substituted $C_1$-$C_{10}$ alkyl, optionally substituted $C_1$-$C_{10}$ haloalkyl, optionally substituted $C_6$-$C_{12}$ aryl, optionally substituted $C_6$-$C_{20}$ heteroaryl and butylated aryloxypropyl. In some embodiments, the $R^6$ in each subunit b independently is selected from among optionally substituted $C_1$-$C_{10}$ alkyl, optionally substituted $C_1$-$C_{10}$ haloalkyl, optionally substituted $C_6$-$C_{12}$ aryl and optionally substituted $C_6$-$C_{12}$ heteroaryl. In some embodiments, the $R^6$ in each subunit b independently is selected from among an optionally substituted $C_1$-$C_{10}$ alkyl. In some embodiments, the $R^6$ in each subunit b independently is selected from among an optionally substituted $C_1$-$C_6$ alkyl. In some embodiments, the $R^6$ in each subunit b independently is selected from among an optionally substituted $C_2$-$C_{10}$ alkyl. In some embodiments, the $R^6$ in each subunit b independently is selected from among methyl, ethyl, propyl, butyl, pentyl, hexyl, heptyl, octyl, nonyl and decyl. In some embodiments, the $R^6$ in each subunit b independently is selected from among $C_1$-$C_{10}$ alkyl, $C_1$-$C_{10}$ haloalkyl, $C_6$-$C_{20}$ aryl and $C_6$-$C_{20}$ heteroaryl. In some embodiments, the $R^6$ in each subunit b independently is selected from among $C_1$-$C_{10}$ alkyl, $C_1$-$C_{10}$ haloalkyl, $C_6$-$C_{20}$ aryl and $C_6$-$C_{20}$ heteroaryl, where one or more of the alkyl, haloalkyl, aryl and/or heteroaryl groups is substituted with one or more substituents selected from among halogen, hydroxyl, $C_1$-$C_6$ alkyl, $C_1$-$C_6$ alkoxyl, $C_1$-$C_6$ haloalkyl, $C_1$-$C_6$ heteroalkyl, $C_3$-$C_{10}$ aryl and $C_3$-$C_{10}$ heteroaryl.

In some embodiments, the $R^6$ in each subunit b independently is selected from among an optionally substituted $C_1$-$C_{10}$ haloalkyl. In some embodiments, the $R^6$ in each subunit b independently is selected from among an optionally substituted $C_1$-$C_6$ haloalkyl. In some embodiments, the $R^6$ in each subunit b independently is selected from among an optionally substituted $C_2$-$C_{10}$ haloalkyl. In some embodiments, one or more $R^6$ is trifluoropropyl. In some embodiments, the $R^6$ in each subunit b independently is selected from among an optionally substituted $C_6$-$C_{18}$ aryl. In some embodiments, the $R^6$ in each subunit b independently is selected from among an optionally substituted $C_6$-$C_{12}$ aryl. In some embodiments, the $R^6$ in each subunit b independently is selected from among an optionally substituted $C_6$-$C_{10}$ aryl. In some embodiments, one or more $R^6$ is an optionally substituted phenyl. In some embodiments, the $R^6$ in each subunit b independently is selected from among an optionally substituted $C_6$-$C_{18}$ heteroaryl. In some embodiments, the $R^6$ in each subunit b independently is selected from among an optionally substituted $C_6$-$C_{12}$ heteroaryl. In some embodiments, the $R^6$ in each subunit b independently is selected from among an optionally substituted $C_6$-$C_{10}$ heteroaryl. In some embodiments, at least one $R^6$ is butylated aryloxypropyl. In some embodiments, at least one $R^6$ is trifluoropropyl. In some embodiments, at least one $R^6$ is phenyl.

In some embodiments, the $R^7$ in each subunit b independently is selected from among optionally substituted $C_1$-$C_{10}$ alkyl, optionally substituted $C_1$-$C_{20}$ haloalkyl, optionally substituted $C_6$-$C_{20}$ aryl, and optionally substituted $C_6$-$C_{20}$ heteroaryl. In some embodiments, the $R^7$ in each subunit b independently is selected from among optionally substituted $C_1$-$C_{10}$ alkyl, optionally substituted $C_1$-$C_{10}$ haloalkyl, optionally substituted $C_6$-$C_{20}$ aryl, and optionally substituted $C_6$-$C_{20}$ heteroaryl. In some embodiments, the $R^7$ in each subunit b independently is selected from among optionally substituted $C_1$-$C_{10}$ alkyl, optionally substituted $C_1$-$C_{10}$ haloalkyl, optionally substituted $C_6$-$C_{18}$ aryl, and optionally substituted $C_6$-$C_{18}$ heteroaryl. In some embodiments, the $R^7$ in each subunit b independently is selected from among optionally substituted $C_1$-$C_{10}$ alkyl, optionally substituted $C_1$-$C_{10}$ haloalkyl, optionally substituted $C_6$-$C_{12}$ aryl, and optionally substituted $C_6$-$C_{12}$ heteroaryl. In some embodiments, the $R^7$ in each subunit b independently is selected from among optionally substituted $C_2$-$C_{10}$ alkyl, optionally substituted $C_1$-$C_{10}$ haloalkyl, optionally substituted $C_6$-$C_{12}$ aryl, and optionally substituted $C_6$-$C_{12}$ heteroaryl. In some embodiments, the $R^7$ in each subunit b independently is selected from among optionally substituted $C_2$-$C_{10}$ alkyl, optionally substituted $C_2$-$C_{10}$ haloalkyl, optionally substituted $C_6$-$C_{12}$ aryl, and optionally substituted $C_6$-$C_{12}$ heteroaryl. In some embodiments, the $R^7$ in each subunit b independently is selected from among an optionally substituted $C_1$-$C_{10}$ alkyl. In some embodiments, the $R^7$ in each subunit b independently is selected from among an optionally substituted $C_1$-$C_6$ alkyl. In some embodiments, the $R^7$ in each subunit b independently is selected from among an optionally substituted $C_2$-$C_{10}$ alkyl. In some embodiments, the $R^7$ in each subunit b independently is selected from among methyl, ethyl, propyl, butyl, pentyl, hexyl, heptyl, octyl, nonyl and decyl. In some embodiments, the $R^7$ in each subunit b independently is selected from among $C_1$-$C_{10}$ alkyl, $C_1$-$C_{10}$ haloalkyl, $C_6$-$C_{20}$ aryl and $C_6$-$C_{20}$ heteroaryl. In some embodiments, the $R^7$ in each subunit b independently is selected from among $C_1$-$C_{10}$ alkyl, $C_1$-$C_{10}$ haloalkyl, $C_6$-$C_{20}$ aryl and $C_6$-$C_{20}$ heteroaryl, where one or more of the alkyl, haloalkyl, aryl and/or heteroaryl group is substituted with one or more substituents selected from among halogen, hydroxyl, $C_1$-$C_6$ alkyl, $C_1$-$C_6$ alkoxyl, $C_1$-$C_6$ haloalkyl, $C_1$-$C_6$ heteroalkyl, $C_3$-$C_{10}$ aryl and $C_3$-$C_{10}$ heteroaryl.

In some embodiments, the $R^7$ in each subunit b independently is selected from among an optionally substituted $C_1$-$C_{10}$ haloalkyl. In some embodiments, the $R^7$ in each subunit b independently is selected from among an optionally substituted $C_1$-$C_6$ haloalkyl. In some embodiments, the $R^7$ in each subunit a independently is selected from among an optionally substituted $C_2$-$C_{10}$ haloalkyl. In some embodiments, one or more $R^7$ is trifluoropropyl. In some embodiments, the $R^7$ in each subunit b independently is selected from among an optionally substituted $C_6$-$C_{18}$ aryl. In some embodiments, the $R^7$ in each subunit b independently is selected from among an optionally substituted $C_6$-$C_{12}$ aryl. In some embodiments, the $R^7$ in each subunit b independently is selected from among an optionally substituted $C_6$-$C_{10}$ aryl. In some embodiments, one or more $R^7$ is an optionally substituted phenyl. In some embodiments, the $R^7$ in each subunit b independently is selected from among an optionally substituted $C_6$-$C_{18}$ heteroaryl. In some embodiments, the $R^7$ in each subunit b independently is selected from among an optionally substituted $C_6$-$C_{12}$ heteroaryl. In some embodiments, the $R^7$ in each subunit b independently is selected from among an optionally substituted $C_6$-$C_{10}$ heteroaryl. In some embodiments, at least one $R^7$ is butylated aryloxypropyl. In some embodiments, at least one $R^7$ is trifluoropropyl. In some embodiments, at least one $R^7$ is phenyl.

In some embodiments, one or more $R^7$ is a cyclosiloxane having three or more Si atoms. In some embodiments, $R^7$ is an optionally substituted cyclosiloxane having at least four Si atoms. In some embodiments, $R^7$ is an optionally substituted cyclosiloxane having 3, 4, 5, 6, 7, 8, 9, 10, 11, 12, 13, 14, 15, 16, 17, 18, 19 or 20 Si atoms. In some embodiments, one or more $R^7$ is a cyclosiloxane having 3-8 Si atoms. In some embodiments, one or more $R^7$ is a cyclosiloxane having 4-6 Si atoms. In some embodiments, one or more $R^7$ is a substituted cyclosiloxane having three or more Si atoms. In some embodiments, one or more $R^7$ is a substituted cyclosiloxane having 3-8 Si atoms. In some embodiments, one or more $R^7$ is a substituted cyclosiloxane having 4-6 Si atoms. In some embodiments, one or more $R^7$ is a substituted cyclosiloxane having 3, 4, 5, 6, 7 or 8 Si atoms. In some embodiments, one or more $R^7$ is cyclosiloxane substituted with one or more moieties selected from among hydrogen, alkyl, haloalkyl, heteroalkyl, cycloalkyl, heteroaryl, non-aromatic heterocycle, hydroxy, alkoxy, aryloxy, mercapto, alkylthio, arylthio, cyano, halo, carbonyl, thiocarbonyl, O-carbamyl, N carbamyl, O thiocarbamyl, N thiocarbamyl, C amido, N amido, S-sulfon-amido, N sulfonamido, azido, diazo, imino, formylamino, fluoro, iodo, oxo, cyano, cyanato, carboxy, C trihalomethanesulfonyl, O carboxy, isocyanato, thiocyanato, isothiocyanato, nitro, silyl, and amino, and mono- and di-substituted amino groups. In some embodiments, one or more $R^7$ is cyclosiloxane substituted with one or more moieties selected from among hydrogen, halogen, hydroxyl, $C_1$-$C_6$ alkyl, $C_1$-$C_6$ alkoxy, $C_1$-$C_6$ haloalkyl, $C_1$-$C_6$ heteroalkyl, $C_3$-$C_{10}$ heteroaryl and $C_3$-$C_{10}$ aryl substituted with halogen or $C_1$-$C_6$ haloalkyl. In some embodiments, one or more $R^7$ is cyclosiloxane substituted with one or more moieties selected from among halogen, hydroxyl, $C_1$-$C_4$ alkyl, $C_1$-$C_4$ alkoxy, $C_1$-$C_4$ haloalkyl, and $C_3$-$C_{10}$ aryl substituted with halogen or $C_1$-$C_6$ haloalkyl.

In some embodiments, $R^8$ is selected from among an optionally substituted $C_1$-$C_{10}$ alkyl. In some embodiments, $R^8$ is selected from among an optionally substituted $C_1$-$C_6$ alkyl. In some embodiments, $R^8$ is selected from among an optionally substituted $C_2$-$C_{10}$ alkyl. In some embodiments, $R^8$ is selected from among methyl, ethyl, propyl, butyl, pentyl, hexyl, heptyl, octyl, nonyl and decyl. In some embodiments, $R^8$ is a $C_1$-$C_{10}$ alkyl. In some embodiments, $R^8$ is a $C_1$-$C_{10}$ alkyl substituted with one or more substituents selected from among halogen, hydroxyl, $C_1$-$C_6$ alkoxyl, $C_1$-$C_6$ haloalkyl, $C_1$-$C_6$ heteroalkyl, $C_3$-$C_{10}$ aryl and $C_3$-$C_{10}$ heteroaryl.

In some embodiments, $R^9$ is selected from among an optionally substituted $C_1$-$C_{10}$ alkyl. In some embodiments, $R^9$ is selected from among an optionally substituted $C_1$-$C_6$ alkyl. In some embodiments, $R^9$ is selected from among an optionally substituted $C_2$-$C_{10}$ alkyl. In some embodiments, $R^9$ is selected from among methyl, ethyl, propyl, butyl, pentyl, hexyl, heptyl, octyl, nonyl and decyl. In some embodiments, $R^9$ is a $C_1$-$C_{10}$ alkyl. In some embodiments, $R^9$ is a $C_1$-$C_{10}$ alkyl substituted with one or more substituents selected from among halogen, hydroxyl, $C_1$-$C_6$ alkoxyl, $C_1$-$C_6$ haloalkyl, $C_1$-$C_6$ heteroalkyl, $C_3$-$C_{10}$ aryl and $C_3$-$C_{10}$ heteroaryl.

In some embodiments, $R^{10}$ is selected from among optionally substituted $C_1$-$C_{10}$ alkyl, optionally substituted $C_3$-$C_{20}$ cycloalkyl and an optionally substituted cyclosiloxane having three or more Si atoms. In some embodiments, $R^{10}$ is selected from among optionally substituted $C_1$-$C_{10}$ alkyl, optionally substituted $C_3$-$C_{10}$ cycloalkyl and an optionally substituted cyclosiloxane having three or more Si atoms. In some embodiments, $R^{10}$ is selected from among $C_1$-$C_{10}$ alkyl, $C_3$-$C_{20}$ cycloalkyl and a cyclosiloxane having three or more Si atoms. In some embodiments, $R^{10}$ is selected from among $C_1$-$C_{10}$ alkyl, $C_3$-$C_{20}$ cycloalkyl and a cyclosiloxane having three or more Si atoms, where one or more of the alkyl, cycloalkyl or cyclosiloxane groups is substituted with one or more substituents selected from among halogen, hydroxyl, $C_1$-$C_6$ alkoxyl, $C_1$-$C_6$ haloalkyl, $C_1$-$C_6$ hetero-alkyl, $C_3$-$C_{10}$ aryl and $C_3$-$C_{10}$ heteroaryl. In some embodiments, $R^{10}$ is selected from among optionally substituted $C_2$-$C_{10}$ alkyl, optionally substituted $C_3$-$C_{20}$ cycloalkyl and an optionally substituted cyclosiloxane having three or more Si atoms. In some embodiments, $R^{10}$ is selected from among optionally substituted $C_1$-$C_6$ alkyl, optionally substituted $C_3$-$C_{10}$ cycloalkyl and an optionally substituted cyclosiloxane having three or more Si atoms. In some embodiments, $R^{10}$ is selected from among an optionally substituted $C_1$-$C_{10}$ alkyl. In some embodiments, $R^{10}$ is selected from among an optionally substituted $C_1$-$C_6$ alkyl. In some embodiments, $R^{10}$ is selected from among an optionally substituted $C_2$-$C_{10}$ alkyl. In some embodiments, $R^{10}$ is selected from among methyl, ethyl, propyl, butyl, pentyl, hexyl, heptyl, octyl, nonyl and decyl. In some embodiments, $R^{10}$ is selected from among an optionally substituted $C_3$-$C_{10}$ cycloalkyl. In some embodiments, $R^{10}$ is selected from among an optionally substituted $C_3$-$C_6$ cycloalkyl. In some embodiments, $R^{10}$ is selected from among an optionally substituted $C_6$-$C_{10}$ cycloalkyl. In some embodiments, $R^{10}$ is an optionally substituted cyclosiloxane having at least four Si atoms. In some embodiments, $R^{10}$ is an optionally substituted cyclosiloxane having 4, 5, 6, 7, 8, 9, 10, 11, 12, 13, 14, 15, 16, 17, 18, 19 or 20 Si atoms. In some embodiments, one or more $R^{10}$ is cyclosiloxane substituted with one or more moieties selected from among alkyl, haloalkyl, heteroalkyl, cycloalkyl, heteroaryl, non-aromatic heterocycle, hydroxy, alkoxy, aryloxy, mercapto, alkylthio, arylthio, cyano, halo, carbonyl, thiocarbonyl, O-carbamyl, N carbamyl, O thiocarbamyl, N thiocarbamyl, C amido, N amido, S-sulfonamido, N sulfonamido, azido, diazo, imino, formylamino, fluoro, iodo, oxo, cyano, cyanato, carboxy, C trihalomethanesulfonyl, O carboxy, isocyanato, thiocyanato, isothiocyanato, nitro, silyl, and amino, and mono- and di-substituted amino groups.

In some embodiments, a is selected from 1-25. In some embodiments, a is selected from 1-15. In some embodiments, a is selected from 1-10. In some embodiments, a is selected from 1-5. In some embodiments, a is selected from 5-25. In some embodiments, a is selected from 5-40. In some embodiments, a is selected from 10-30. In some embodiments, a is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50.

In some embodiments, b is selected from 1-25. In some embodiments, b is selected from 1-15. In some embodiments, b is selected from 1-10. In some embodiments, b is selected from 1-5. In some embodiments, b is selected from 5-25. In some embodiments, b is selected from 5-40. In some embodiments, b is selected from 10-30. In some embodiments, b is 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50.

In some embodiments, q is selected from 2-45. In some embodiments, q is selected from 2-40. In some embodiments, q is selected from 2-35. In some embodiments, q is selected from 2-30. In some embodiments, q is selected from 2-25. In some embodiments, q is selected from 2-20. In some embodiments, q is selected from 2-15. In some embodiments, q is selected from 2-10. In some embodiments, q is selected from 2-5. In some embodiments, q is selected from 5-10. In some embodiments, q is selected from 5-15. In some embodiments, q is selected from 10-20. In some embodiments, q is selected from 10-15. In some embodiments, q is 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50.

In some embodiments, w is selected from 0-5. In some embodiments, w is selected from 1-10. In some embodiments, w is selected from 5-10. In some embodiments, w is selected from 3-6. In some embodiments, w is selected from 1-3. In some embodiments, w is selected from 8-10. In some embodiments, w is 0, 1, 2, 3, 4, 5, 6, 7, 8, 9 or 10.

In some embodiments, y is selected from 0-5. In some embodiments, y is selected from 1-10. In some embodiments, y is selected from 5-10. In some embodiments, y is selected from 3-6. In some embodiments, y is selected from 1-3. In some embodiments, y is selected from 8-10. In some embodiments, y is 0, 1, 2, 3, 4, 5, 6, 7, 8, 9 or 10.

In some embodiments, each $R^7$ is a cyclosiloxane or a cyclosiloxane substituted with one or more substituents selected from among selected from among halogen, hydroxyl, $C_1$-$C_6$ alkoxyl, $C_1$-$C_6$ haloalkyl, $C_1$-$C_6$ heteroalkyl, $C_3$-$C_{10}$ aryl and $C_3$-$C_{10}$ heteroaryl, resulting in a polymer that includes a cyclosiloxane on at least every other non-terminal Si atom. In some embodiments, each $R^7$ is an optionally substituted cyclosiloxane and each $R^4$ is an optionally substituted aryl. In some embodiments, at least one of $R^3$ or $R^{10}$ is a cyclosiloxane. In some embodiments, each of $R^3$ and $R^{10}$ is a cyclosiloxane. In some embodiments, at least one subunit q includes a Si atom that is not substituted with a cyclosiloxane. In some embodiments, at least one of $R^5$ and $R^6$ is an aryl substituted with an alkyl or halogen. In some embodiments, $R^5$ and $R^6$ are $C_1$-$C^6$ alkyl, $R^4$ is an optionally substituted aryl and $R^7$ is an optionally substituted cyclosiloxane. In some embodiments, $R^5$ and $R^6$ are methyl, ethyl or propyl, $R^4$ is an optionally substituted $C_6$ aryl and $R^7$ is an optionally substituted cyclosiloxane.

In some embodiments, the compounds of formula I range in molecular weight from about 200 to over 500,000, and in some embodiments over 750,000, and are thermally stable indefinitely at 150° C. It has been found that polysiloxanes as described herein having viscosities of up to about 150,000 centipoise (cP) when measured at 25° C. at a shear rate of 100 $sec^{-1}$ are useful as lubricants. In some embodiments, the cyclosiloxane-containing polysiloxane lubricant has a viscosity varying from 20 to 200,000 cP when measured at 25° C. at a shear rate of 100 $sec^{-1}$. In some embodiments, the cyclosiloxane-containing polysiloxane lubricant has a viscosity varying from 50 to 150,000 cP when measured at 25° C. at a shear rate of 100 $sec^{-1}$. In some embodiments, the cyclosiloxane-containing polysiloxane lubricant has a viscosity varying from about 100 to 100,000 cP when measured at 25° C. at a shear rate of 100 $sec^{-1}$. In some embodiments, the cyclosiloxane-containing polysiloxane lubricant has a viscosity varying from 50 to 50,000 cP when measured at 25° C. at a shear rate of 100 $sec^{-1}$. In some embodiments, the cyclosiloxane-containing polysiloxane lubricant has a viscosity varying from 25 to 100,000 cP when measured at 25° C. at a shear rate of 100 $sec^{-1}$. In some embodiments, the cyclosiloxane-containing polysiloxane lubricant has a viscosity varying from 10 to 10,000 cP when measured at 25° C.

at a shear rate of 100 sec$^{-1}$. In some embodiments, the cyclosiloxane-containing polysiloxane lubricant has a viscosity varying from 5 to 5,000 cP when measured at 25° C. at a shear rate of 100 sec$^{-1}$.

In some embodiments, the cyclosiloxane substituents have from 3 to 10 Si atoms. In some embodiments, the cyclosiloxane substituents have from 3 to 5 silicone atoms. In some embodiments, cyclosiloxane substituents have from 7 to 10 silicon atoms. In some embodiments, cyclosiloxane substituents have from 5 to 7 silicon atoms. Exemplary cyclosiloxane substituents include cyclic organopolysiloxanes such as hexamethyl cyclotrisiloxane, octamethyl cyclotetrasiloxane, decamethyl cyclopentasiloxane, dodecamethyl cyclohexasiloxane, tetradecamethyl cycloheptasiloxane, hexadecamethyl cyclooctasiloxane, tetramethyl cyclotetrasiloxane, pentamethyl cyclopentasiloxane, pentamethyl cyclotetrasiloxane, hexamethyl cyclotetrasiloxane, heptamethyl cyclotetrasiloxane, hexamethyl cyclopentasiloxane, octamethyl cyclopentasiloxane, heptamethyl cyclopentasiloxane and nonamethyl cyclopentasiloxane.

In some embodiments, the Si atoms of the cyclosiloxane are substituted with a substituent selected from among hydrogen, halogen, $C_1$-$C_6$ alkyl and $C_1$-$C_6$ haloalkyl. In some embodiments, the Si atoms of the cyclosiloxane are substituted with a substituent selected from among hydrogen and $C_1$-$C_6$ haloalkyl. In some embodiments, all of the Si atoms of the cyclosiloxane are substituted with a $C_1$-$C_6$ haloalkyl. In some embodiments, all of the Si atoms of the cyclosiloxane are substituted with methyl.

In some embodiments, the cyclosiloxane substituents constitute from about 1 mole % to about 20 mole % of the compound. In some embodiments, the cyclosiloxane substituents constitute from about 2 mole % to about 15 mole % of the compound. In some embodiments, the cyclosiloxane substituents constitute from about 3 mole % to about 10 mole % of the compound. In some embodiments, the cyclosiloxane substituents constitute from about 4 mole % to about 9 mole % of the compound. In some embodiments, the cyclosiloxane substituents constitute from about 5 mole % to about 8 mole % of the compound. In some embodiments, the cyclosiloxane substituents constitute 1, 2, 3, 4, 5, 6, 7, 8, 9, 10, 11, 12, 13, 14, 15, 16, 17, 18, 19 or 20 mole % of the compound.

In some embodiments, the cyclosiloxane substituents constitute from about 2 mole % to about 15 mole % of the compound and the compound has a molecular weight of between 5,000 and 100,000 daltons. In some embodiments, the cyclosiloxane substituents constitute from about 3 mole % to about 10 mole % of the compound and the compound has a molecular weight of between 7,500 and 75,000 daltons. In some embodiments, the cyclosiloxane substituents constitute from about 2 mole % to about 15 mole % of the compound and the compound has a molecular weight of between 5,000 and 50,000 daltons. In some embodiments, the cyclosiloxane substituents constitute from about 3 mole % to about 10 mole % of the compound and the compound has a molecular weight of between 7,500 and 45,000 daltons.

In some embodiments, each of $R^1$, $R^2$, $R^3$, $R^4$, $R^5$, $R^6$, $R^8$, $R^9$ and $R^{10}$ is alkyl. In some embodiments, each of $R^1$, $R^2$, $R^3$, $R^4$, $R^5$, $R^6$, $R^8$, $R^9$ and $R^{10}$ is a $C_1$-$C_6$ alkyl. In some embodiments, each of $R^1$, $R^2$, $R^3$, $R^4$, $R^5$, $R^6$, $R^8$, $R^9$ and $R^{10}$ is methyl.

In some embodiments, each of $R^1$, $R^2$, $R^3$, $R^4$, $R^5$, $R^6$, $R^8$, $R^9$ and $R^{10}$ is methyl or ethyl, $R^7$ is a cyclosiloxane, q is 1, w and y each is 0, a is 1-30 and b is 20-40. In some embodiments, each of $R^1$, $R^2$, $R^3$, $R^4$, $R^5$, $R^6$, $R^8$, $R^9$ and $R^{10}$ is methyl, $R^7$ is a cyclosiloxane containing 3 to 7 Si atoms, q is 1, w and y each is 0, a is 1-30 and b is 25-35. In some embodiments, each of $R^1$, $R^2$, $R^3$, $R^4$, $R^5$, $R^6$, $R^8$, $R^9$ and $R^{10}$ is methyl, $R^7$ is a cyclosiloxane containing 3 to 7 Si atoms, and each Si atom is substituted with a substituent selected from among hydrogen, halogen, $C_1$-$C_6$ alkyl and $C_1$-$C_6$ haloalkyl, q is 1, w and y each is 0, a is 1-30 and b is 25-35. In some embodiments, each of $R^1$, $R^2$, $R^3$, $R^4$, $R^5$, $R^6$, $R^8$, $R^9$ and $R^{10}$ is methyl, $R^7$ is a cyclosiloxane containing 3 to 5 Si atoms, and each Si atom is substituted with a substituent selected from among $C_1$-$C_6$ alkyl and $C_1$-$C_6$ haloalkyl, q is 1, w and y each is 0, a is 1-30 and b is 25-35. In some embodiments, each of $R^1 R^2$, $R^3$, $R^4$, $R^5$, $R^6$, $R^8$, $R^9$ and $R^{10}$ is methyl, $R^7$ is a cyclosiloxane containing 3 to 5 Si atoms, and each Si atom is substituted with a methyl, q is 1, w and y each is 0, a is 1-30 and b is 25-35.

In some embodiments, the cyclosiloxane-substituted polysiloxanes are compounds of Formula IA:

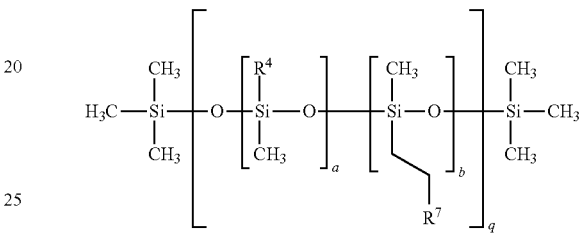

where each occurrence of $R^4$ independently is selected from among substituted or unsubstituted $C_1$-$C_8$ alkyl, substituted or unsubstituted $C_1$-$C_8$ haloalkyl, substituted or unsubstituted $C_6$-$C_{12}$ aryl, and substituted or unsubstituted $C_6$-$C_{12}$ heteroaryl; $R^7$ is an optionally substituted cyclosiloxane having at least three Si atoms; a is 0-50; b is 1-100 and q is 2-50. In some embodiments, $R^7$ is an optionally substituted cyclosiloxane having 3, 4, 5, 6, 7, 8, 9, 10, 11, 12, 13, 14, 15, 16, 17, 18, 19 or 20 Si atoms. In some embodiments, $R^7$ is a cyclosiloxane substituted with one or more substituents selected from among halogen, hydroxyl, $C_1$-$C_6$ alkyl, $C_1$-$C_6$ alkoxyl, $C_1$-$C_6$ haloalkyl, $C_1$-$C_6$ heteroalkyl, $C_3$-$C_{10}$ aryl, $C_3$-$C_{10}$ heteroaryl and $C_3$-$C_{10}$ aryl substituted with halogen or $C_1$-$C_6$ haloalkyl. In some embodiments, $R^4$ independently is $C_1$-$C_8$ alkyl, $C_1$-$C_8$ haloalkyl, $C_6$-$C_{12}$ aryl or $C_6$-$C_{12}$ heteroaryl. In some embodiments, $R^4$ independently is $C_1$-$C_8$ alkyl, $C_1$-$C_8$ haloalkyl, $C_6$-$C_{12}$ aryl or $C_6$-$C_{12}$ heteroaryl, where one or more of the alkyl, haloalkyl, aryl or heteroaryl groups is substituted with one or more substituents selected from among halogen, hydroxyl, $C_1$-$C_6$ alkoxyl, $C_1$-$C_6$ haloalkyl, $C_1$-$C_6$ hetero-alkyl, $C_3$-$C_{10}$ aryl and $C_3$-$C_{10}$ heteroaryl.

In some embodiments, the compounds of Formula IA have the formula:

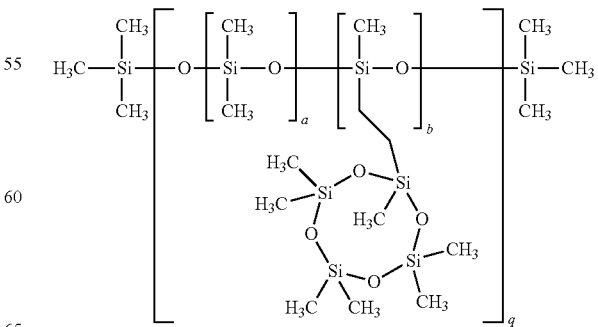

where a is 0-50; b is 1-100; and q is 2-50.

2. Shear Thinning Cyclosiloxane-Substituted Polysiloxanes of Formula I

In some embodiments, the cyclosiloxane-substituted polysiloxanes provided herein are pseudoplastic under shear. Without being bound by any particular theory, it is believed that the cyclosiloxane-substituted polysiloxanes provided herein form a network by means of secondary bonds that surround and enclose other materials, including solvents. The cyclosiloxane-substituted polysiloxanes provided herein can form intra- and inter-chain interactions at low shear. As the shear forces increase, these interactions dissipate, and the polymers align with the shear forces, resulting in a lower apparent viscosity. When the shear force is removed or decreased, the polymers can re-establish the intra- and/or inter-chain interactions, resulting in a higher apparent viscosity. In some instances the solvents, if they are polar, will join in the network by means of Van der Waal bonds to crosslink from one polysiloxane molecule to another. In other cases, it is believed that the polysiloxanes, with their bulky cyclosiloxane substituents, align through secondary forces to form a network, which produces a large apparent viscosity. When shear is applied, shear forces disrupt the secondary bonds to break down the structure and cause it to behave in a manner similar to a non-Newtonian solution. As soon as the shear forces are removed, however, the polysiloxanes align themselves into a network again which encloses the solvent and causes the composition to assume a more viscous state. In some embodiments, the cyclosiloxane-substituted polysiloxane exhibits Newtonian solution rheological characteristics up to a certain shear rate, at which point the polysiloxane exhibits non-Newtonian flow and a more pseudoplastic rheology.

In some embodiments, the apparent viscosity as a function of shear rate decreases as shear rate increases, exhibiting non-Newtonian fluid characteristics. Upon reduction of the rate of shear, viscosity increases, indicating that no or minimal degradation of the polymer has occurred. In some embodiments, the apparent viscosity at a shear rate of $5,000$ $sec^{-1}$ is about 95% of the viscosity measured at a shear rate of $1$ $sec^{-1}$. In some embodiments, the apparent viscosity at a shear rate of $5,000$ $sec^{-1}$ is about 90% of the viscosity measured at a shear rate of $1$ $sec^{1}$. In some embodiments, the apparent viscosity at a shear rate of $5,000$ $sec^{-1}$ is about 85% of the viscosity measured at a shear rate of $1$ $sec^{-1}$. In some embodiments, the apparent viscosity at a shear rate of $5,000$ $sec^{-1}$ is about 80% of the viscosity measured at a shear rate of $1$ $sec^{-1}$. In some embodiments, the apparent viscosity at a shear rate of $5,000$ $sec^{-1}$ is about 75% of the viscosity measured at a shear rate of $1$ $sec^{-1}$. In some embodiments, the apparent viscosity at a shear rate of $5,000$ $sec^{-1}$ is about 70% of the viscosity measured at a shear rate of $1$ $sec^{-1}$. In some embodiments, the apparent viscosity at a shear rate of $5,000$ $sec^{-1}$ is about 60% of the viscosity measured at a shear rate of $1$ $sec^{-1}$. In some embodiments, the apparent viscosity at a shear rate of $5,000$ $sec^{-1}$ is about 50% of the viscosity measured at a shear rate of $1$ $sec^{-1}$. In some embodiments, the apparent viscosity at a shear rate of $5,000$ $sec^{-1}$ is about 40% of the viscosity measured at a shear rate of $1$ $sec^{-1}$. In some embodiments, the apparent viscosity at a shear rate of $5,000$ $sec^{-1}$ is about 30% of the viscosity measured at a shear rate of $1$ $sec^{-1}$. In some embodiments, the apparent viscosity at a shear rate of $5,000$ $sec^{-1}$ is about 25% of the viscosity measured at a shear rate of $1$ $sec^{-1}$. In some embodiments, the apparent viscosity at a shear rate of $5,000$ $sec^{-1}$ is about 20% of the viscosity measured at a shear rate of $1$ $sec^{-1}$. In some embodiments, the apparent viscosity at a shear rate of $5,000$ $sec^{-1}$ is about 15% of the viscosity measured at a shear rate of $1$ $sec^{-1}$. In some embodiments, the apparent viscosity at a shear rate of $5,000$ $sec^{-1}$ is about 10% of the viscosity measured at a shear rate of $1$ $sec^{-1}$.

In some embodiments, the apparent viscosity at a shear rate of $100,000$ $sec^{-1}$ is about 75% of the viscosity measured at a shear rate of $1$ $sec^{-1}$. In some embodiments, the apparent viscosity at a shear rate of $100,000$ $sec^{-1}$ is about 70% of the viscosity measured at a shear rate of $1$ $sec^{-1}$. In some embodiments, the apparent viscosity at a shear rate of $100,000$ $sec^{-1}$ is about 60% of the viscosity measured at a shear rate of $1$ $sec^{-1}$. In some embodiments, the apparent viscosity at a shear rate of $100,000$ $sec^{-1}$ is about 50% of the viscosity measured at a shear rate of $1$ $sec^{-1}$. In some embodiments, the apparent viscosity at a shear rate of $100,000$ $sec^{-1}$ is about 40% of the viscosity measured at a shear rate of $1$ $sec^{-1}$. In some embodiments, the apparent viscosity at a shear rate of $100,000$ $sec^{-1}$ is about 30% of the viscosity measured at a shear rate of $1$ $sec^{-1}$. In some embodiments, the apparent viscosity at a shear rate of $100,000$ $sec^{-1}$ is about 25% of the viscosity measured at a shear rate of $1$ $sec^{-1}$. In some embodiments, the apparent viscosity at a shear rate of $100,000$ $sec^{-1}$ is about 20% of the viscosity measured at a shear rate of $1$ $sec^{-1}$. In some embodiments, the apparent viscosity at a shear rate of $100,000$ $sec^{-1}$ is about 15% of the viscosity measured at a shear rate of $1$ $sec^{-1}$. In some embodiments, the apparent viscosity at a shear rate of $100,000$ $sec^{-1}$ is about 10% of the viscosity measured at a shear rate of $1$ $sec^{-1}$. In some embodiments, the apparent viscosity at a shear rate of $100,000$ $sec^{-1}$ is about 5% of the viscosity measured at a shear rate of $1$ $sec^{-1}$.

For example, in some embodiments, the viscosity measured at $25°$ C. at $1$ $s^{-1}$ went from $5,000$ cP to $4,500$ cP when measured at $1,000$ $s^{-1}$. In some embodiments, the viscosity measured at $25°$ C. at $1$ $s^{-1}$ went from $49,900$ cP to $25,000$ cP when measured at $1,000$ $s^{-1}$. In some embodiments, the viscosity measured at $25°$ C. at $1$ $s^{-1}$ went from $99,500$ cP to $30,000$ cP when measured at $1,000$ $s^{-1}$. In some embodiments, the viscosity measured at $25°$ C. at $1$ $s^{-1}$ went from $2000$ cP to $1800$ cP when measured at $5,000$ $s^{-1}$. In some embodiments, the viscosity measured at $25°$ C. at $1$ $s^{-1}$ went from $5000$ cP to $2800$ cP when measured at $5,000$ $s^{-1}$. In some embodiments, the viscosity measured at $25°$ C. at $1$ $s^{-1}$ went from $9800$ cP to $4900$ cP when measured at $5,000$ $s^{-1}$. In some embodiments, the viscosity measured at $25°$ C. at $1$ $s^{-1}$ went from $49500$ cP to $13000$ cP when measured at $5,000$ $s^{-1}$. In some embodiments, the viscosity measured at $25°$ C. at $1$ $s^{-1}$ went from $99800$ cP to $17000$ cP when measured at $5,000$ $s^{-1}$. In some embodiments, the viscosity measured at $25°$ C. at $1,000$ $s^{-1}$ went from $1,000$ cP to $900$ cP when measured at $5,000$ $s^{-1}$. In some embodiments, the viscosity measured at $25°$ C. at $1,000$ $s^{-1}$ went from $2,000$ cP to $1,800$ cP when measured at $5,000$ $s^{-1}$. In some embodiments, the viscosity measured at $25°$ C. at $1000$ $s^{-1}$ went from $4,500$ cP to $2,800$ cP when measured at $5,000$ $s^{-1}$. In some embodiments, the viscosity measured at $25°$ C. at $1,000$ $s^{-1}$ went from $9,900$ cP to $4,900$ cP when measured at $5,000$ $s^{-1}$. In some embodiments, the viscosity measured at $25°$ C. at $1000$ $s^{-1}$ went from $25,000$ cP to $13,000$ cP when measured at $5,000$ $s^{-1}$. In some embodiments, the viscosity measured at $25°$ C. at $1000$ $s^{-1}$ went from $30,000$ cP to $17,000$ cP when measured at $5,000$ $s^{-1}$. In some embodiments, the viscosity measured at $25°$ C. at $1$ $s^{-1}$ went from $2,000$ cP to $500$ cP when measured at $100,000$ $s^{-1}$. In some embodiments, the viscosity measured at $25°$ C. at $1$ $s^{-1}$ went from $5,000$ cP to $1,100$ cP when measured at $100,000$ $s^-$. In some embodiments, the viscosity measured at $25°$ C. at $1$ $s^{-1}$ went from $9,800$ cP to $1,400$ cP when measured at $100,000$ $s^{-1}$. In some embodiments, the viscosity measured at $25°$ C. at 1 s$^{-1}$ went from 49,500 cP to 1,800 cP when measured at 100,000 s$^{-1}$. In some embodiments, the viscosity measured at 25° C. at 1 s$^{-1}$ went from 99,800 cP to 2.00 cP when measured at 100,000 s$^{-1}$.

The cyclosiloxane-substituted polysiloxanes have a refractive index of between 1.33 and 1.59. In some embodiments, the cyclosiloxane-substituted polysiloxanes have a refractive index of about 1.33, 1.34, 1.35, 1.36, 1.37, 1.38, 1.39, 1.4, 1.41, 1.42, 1.43, 1.44, 1.45, 1.46, 1.47, 1.48, 1.49, 1.5, 1.51, 1.52, 1.53, 1.54, 1.55, 1.56, 1.57, 1.58 and 1.59.

The cyclosiloxane-substituted polysiloxanes exhibit excellent compressibility characteristics that make them suitable for use in a variety of hydraulic applications. In some embodiments, the cyclosiloxane-substituted polysiloxanes exhibit a compressibility at 1,000 psi of between 0.5% and 0.8%. In some embodiments, the cyclosiloxane-substituted polysiloxanes exhibit a compressibility at 1,000 psi of about 0.5%, 0.525%, 0.55%, 0.565%, 0.6%, 0.625%, 0.65%, 0.675%, 0.7%, 0.725%, 0.75%, 0.775% and 0.8%. In some embodiments, the cyclosiloxane-substituted polysiloxanes exhibit a compressibility at 5,000 psi of between 1.7% and 2.8%. In some embodiments, the cyclosiloxane-substituted polysiloxanes exhibit a compressibility at 5,000 psi of about 1.7%, 1.75%, 1.8%, 1.85%, 1.9%, 1.95%, 2%, 2.05%, 2.1%, 2.15%, 2.2%, 2.25%, 2.3%, 2.35%, 2.4%, 2.45%, 2.5%, 2.55%, 2.6%, 2.65%, 2.7%, 2.75% and 2.8%. In some embodiments, the cyclosiloxane-substituted polysiloxanes exhibit a compressibility at 10,000 psi of between 3.1% and 4.0%. In some embodiments, the cyclosiloxane-substituted polysiloxanes exhibit a compressibility at 10,000 psi of about 3.1%, 3.15%, 3.2%, 3.25%, 3.3%, 3.35%, 3.4%, 3.45%, 3.5%, 3.55%, 3.6%, 3.65%, 3.7%, 3.75%, 3.8%, 3.85%, 3.9%, 3.95% and 4.0%. In some embodiments, the cyclosiloxane-substituted polysiloxanes exhibit a compressibility at 20,000 psi of between 5% and 10%. In some embodiments, the cyclosiloxane-substituted polysiloxanes exhibit a compressibility at 20,000 psi of about 5%, 5.1%, 5.15%, 5.2%, 5.25%, 5.3%, 5.35%, 5.4%, 5.45%, 5.5%, 5.55%, 5.6%, 5.65%, 5.7%, 5.75%, 5.8%, 5.85%, 5.9%, 5.95%, 6.0%, 6.1%, 6.15%, 6.2%, 6.25%, 6.3%, 6.35%, 6.4%, 6.45%, 6.5%, 6.55%, 6.6%, 6.65%, 6.7%, 6.75%, 6.8%, 6.85%, 6.9%, 6.95%, 7.0%, 7.1%, 7.15%, 7.2%, 7.25%, 7.3%, 7.35%, 7.4%, 7.45%, 7.5%, 7.55%, 7.6%, 7.65%, 7.7%, 7.75%, 7.8%, 7.85%, 7.9%, 7.95%, 8.0%, 8.1%, 8.15%, 8.2%, 8.25%, 8.3%, 8.35%, 8.4%, 8.45%, 8.5%, 8.55%, 8.6%, 8.65%, 8.7%, 8.75%, 8.8%, 8.85%, 8.9%, 8.95%, 9.0%, 9.1%, 9.15%, 9.2%, 9.25%, 9.3%, 9.35%, 9.4%, 9.45%, 9.5%, 9.55%, 9.6%, 9.65%, 9.7%, 9.75%, 9.8%, 9.85%, 9.9%, 9.95% and 10.0%. In some embodiments, the cyclosiloxane-substituted polysiloxanes exhibit a compressibility at 30,000 psi of between 9.2% and 11%. In some embodiments, the cyclosiloxane-substituted polysiloxanes exhibit a compressibility at 30,000 psi of about 9.2%, 9.25%, 9.3%, 9.35%, 9.4%, 9.45%, 9.5%, 9.55%, 9.6%, 9.65%, 9.7%, 9.75%, 9.8%, 9.85%, 9.9%, 9.95%, 10.0%, 10.1%, 10.15%, 10.2%, 10.25%, 10.3%, 10.35%, 10.4%, 10.45%, 10.5%, 10.55%, 10.6%, 10.65%, 10.7%, 10.75%, 10.8%, 10.85%, 10.9%, 10.95% and 11%. The cyclosiloxane-substituted polysiloxanes also exhibit superior wear and lubricity properties.

The cyclosiloxane-substituted polysiloxanes also exhibit improved thermal properties. The cyclosiloxane-substituted polysiloxanes have a coefficient of thermal expansion of between about 9.25×10$^{-4}$ to about 12.0×10$^{-4}$.

In some embodiments, the cyclosiloxane-substituted polysiloxanes contain a copolymer that includes a cyclosiloxane and a dialkylsiloxane, where the cyclosiloxane and/or the dialkylsiloxane can be substituted. The cyclosiloxane can include from 3 to 15 Si atoms, particularly from 3 to 10 Si atoms. In some embodiments, the copolymer includes a tetrasiloxanyl, pentasiloxanyl, hexasiloxanyl, heptasiloxanyl, octasiloxanyl, enneasiloxanyl or nonasiloxanyl, decasiloxanyl, hendecasiloxanyl, dodecasiloxanyl, tridecasiloxanyl, tetradecasiloxanyl, pentadecasiloxanyl, hexadecasiloxanyl, heptadecasiloxanyl, octadecasiloxanyl, nonadecasiloxanyl or an icosasiloxanyl, or a combination thereof. In some embodiments, the cyclosiloxane includes $C_1$-$C_6$ substituents on one or more of the Si atoms. In some embodiments, non-adjacent Si atoms include a non-hydrogen substituent, such as a halogen, $C_1$-$C_6$ alkyl or $C_1$-$C_6$ haloalkyl or a combination thereof. In some embodiments, each Si includes a non-hydrogen substituent, such as a halogen, $C_1$-$C_6$ alkyl or $C_1$-$C_6$ haloalkyl or a combination thereof. In some embodiments, none of the Si atoms includes hydrogen as a substituent.

In some embodiments, the cyclosiloxane-substituted polysiloxane is a (cyclosiloxane-ethyl)-alkylsiloxane dialkylsiloxane copolymer. The (cyclosiloxane-ethyl)-alkylsiloxane can constitute from about 2% to about 98% of the copolymer. In some embodiments, the cyclosiloxane-substituted polysiloxane includes from about 5% to about 95% (cyclosiloxane-ethyl)-alkylsiloxane. In some embodiments, the cyclosiloxane-substituted polysiloxane includes from about 5% to about 90% (cyclosiloxane-ethyl)-alkylsiloxane. In some embodiments, the cyclosiloxane-substituted polysiloxane includes from about 5% to about 85% (cyclosiloxane-ethyl)-alkylsiloxane. In some embodiments, the cyclosiloxane-substituted polysiloxane includes from about 5% to about 80% (cyclosiloxane-ethyl)-alkylsiloxane. In some embodiments, the cyclosiloxane-substituted polysiloxane includes from about 5% to about 75% (cyclosiloxane-ethyl)-alkylsiloxane. In some embodiments, the cyclosiloxane-substituted polysiloxane includes from about 5% to about 70% (cyclosiloxane-ethyl)-alkylsiloxane. In some embodiments, the cyclosiloxane-substituted polysiloxane includes from about 5% to about 65% (cyclosiloxane-ethyl)-alkylsiloxane. In some embodiments, the cyclosiloxane-substituted polysiloxane includes from about 5% to about 60% (cyclosiloxane-ethyl)-alkylsiloxane. In some embodiments, the cyclosiloxane-substituted polysiloxane includes from about 5% to about 55% (cyclosiloxane-ethyl)-alkylsiloxane. In some embodiments, the cyclosiloxane-substituted polysiloxane includes from about 5% to about 50% (cyclosiloxane-ethyl)-alkylsiloxane. In some embodiments, the cyclosiloxane-substituted polysiloxane includes 0.5%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49% or 50% (cyclosiloxane-ethyl)-alkylsiloxane. In some embodiments, the cyclosiloxane-substituted polysiloxane includes 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 99.5% (cyclosiloxane-ethyl)-alkylsiloxane.

In some embodiments, the cyclosiloxane-substituted polysiloxane is a copolymer that includes [2-(heptaalkyl-cyclotetrasiloxanyl)ethyl]-alkylsiloxane subunits, where the alkyl can be $C_1$-$C_6$ alkyl. For example, the copolymer can include as one or more subunits a [2-(heptamethyl-cyclotetrasiloxanyl)ethyl]-alkylsiloxane, [2-(heptaethyl-cyclotetrasiloxanyl)ethyl]-alkylsiloxane, [2-(heptapropylcyclotetrasiloxanyl)ethyl]-alkylsiloxane, [2-(heptamethyl-cyclotetrasiloxanyl)ethyl]-methylsiloxane, [2-(heptamethylcyclotetra-siloxanyl)ethyl]-ethylsiloxane, [2-(heptamethyl-cyclotetrasiloxanyl)ethyl]-propylsiloxane, [2-(heptamethyl-cyclotetrasiloxanyl)ethyl]-butylsiloxane or combinations thereof.

In some embodiments, the cyclosiloxane-substituted polysiloxane is a copolymer that includes a dialkylsiloxane. For example, the copolymer can include a dimethyl-siloxane, a diethylsiloxane, dipropylsiloxane, dibutylsiloxane, a di(trifluoromethyl)-siloxane, a methyl-trifluoromethylsiloxane or combinations thereof. In some embodiments, the cyclosiloxane-substituted polysiloxane is a copolymer that includes [2-(heptaalkyl-cyclotetrasiloxanyl)-ethyl]-alkylsiloxane and dialkylsiloxane subunits. In some embodiments, the dialkyl-siloxane subunits alternate with the [2-(heptaalkylcyclotetrasiloxanyl)ethyl]-alkylsiloxane subunits. In some embodiments, two or more dialkyl-siloxane subunits are present between [2-(hepta-alkylcyclotetrasiloxanyl)-ethyl]-alkyl-siloxane subunits. In some embodiments, the cyclosiloxane-substituted polysiloxane includes a [2-(heptaalkyl-cyclotetrasiloxanyl)ethyl]-methylsiloxane dimethylsiloxane copolymer.

D. Preparation of the Cyclosiloxane-Substituted Polysiloxanes

Any method known in the art can be used to synthesize the polysiloxanes having at least one cyclosiloxane group thereon as described herein, including the polysiloxane of formula I. For example, see Mukbaniani et al., Polymer Yearbook 18 (Pethrick & Zaikov, eds., Shrewsbury, UK, Smithers Rapra, pages 157-199 (2003)). Exemplary schemes are shown in Schemes I through IV below.

The preparation of the methyl polysiloxane polymers and other substituted polysiloxanes are known in the art, e.g., see U.S. Pat. Nos. 3,669,884 and U.S. Pat. No. 2,970,162, which are incorporated herein by reference. Also, see *Silicones* (S. Fordham, ed., (1960), pages 6-73) and *Silicones*, Meals & Lewis (Reinhold Plastics Applications Series, (1959), pages 98-141), which are incorporated by reference herein.

Methods for producing cyclosiloxanes also are known in the art. Exemplary processes for producing cyclic siloxanes and producing a polymer therefrom, are described in U.S. Pat. Nos. 3,937,684; 5,455,208; 5,670,689 and 5,789,516, which are incorporated into the present case by reference. It should also be noted that cyclosiloxanes are easily produced by the hydrolysis of the appropriate dichlorosilanes, such as dimethyldichloro-silane and methyltrifluoropropyldichlorosilane. By hydrolyzing such chlorosilanes in water there is obtained a mixture of cyclic and low molecular weight linear polysiloxanes and the cyclic material is increased in concentration and stripped off in fairly pure quantities by simply cracking the hydrolyzate with an alkali metal hydroxide at elevated temperatures.

Scheme I

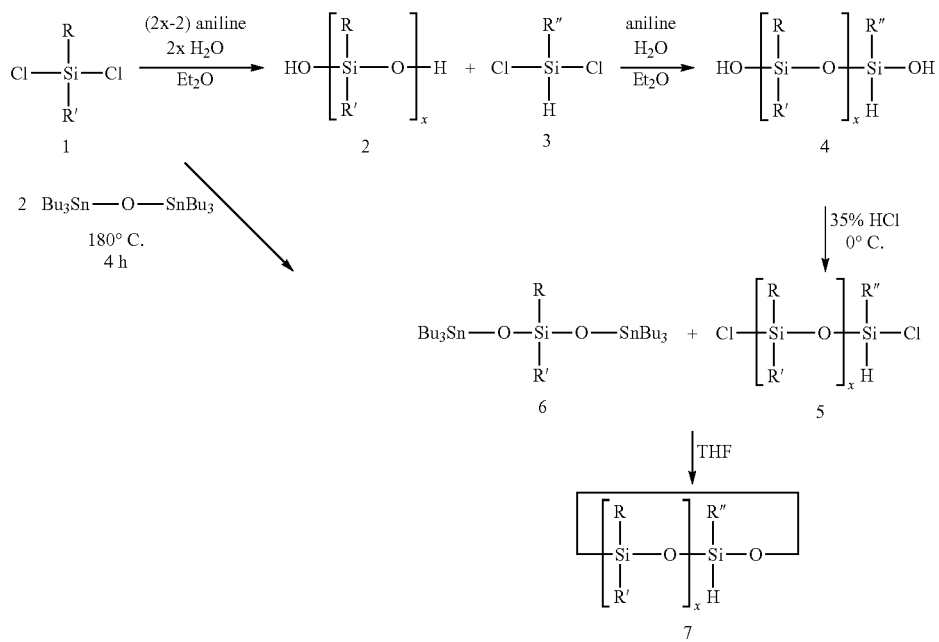

Scheme I shows the preparation of cyclosiloxanes of structure 7 from commercially available starting materials, chlorosilanes 1 and 3. Examples of commercially available dichlorosilanes with two R groups (1) include dichlorodimethylsilane (Sigma Aldrich, Milwaukee, Wis., Cat. No. 440272), dichloro-cyclohexyl-methylsilane (Sigma Aldrich, Milwaukee, Wis., Cat. No. 29462), and n-butylmethyldichlorosilane (Gelest, Morrisville, Pa., Cat. No. SIB1972.0). Commercially available dichlorosilanes of structure 3, with one R group and hydrogen, include dichloromethylsilane (Sigma Aldrich, Milwaukee, Wis., Cat. No. 440248), dichloroethylsilane (Sigma Aldrich, Milwaukee, Wis., Cat. No. 03420), and dichlorophenylsilane (Sigma Aldrich, Milwaukee, Wis., Cat. No. 597864). Chlorosilanes can also be prepared using methods well known in the art. For example, chlorosilanes of the structure $R_nSiX_{4-n}$ can be made by the Direct Process involving the oxidation of $Si^0$ in the presence of a transition metal catalyst and desired organic halide (see e.g., Rochow, E. G., J. Am. Chem. Soc., 67:963-965, 1945; Lewis, L. N., Catalyzed Direct Reactions of Silicon, Vol. 2, Wiley, U. K., 1998, Chap. 26, p. 1581).

Addition of 2x equivalents of water and (2x-2) equivalents of aniline to compound 1 in ether results in controlled hydrolysis and condensation to form polysiloxanes of structure 2. The polymerization effect of HCl is controlled by the use of aniline as an HCl scavenger. Addition of 3, in the presence of aniline and water (2:3:aniline:$H_2O$=1:0.5:1:1), affords polysilanol 4, which is converted to the corresponding dichlorosilane 5 by treatment with 35% aqueous HCl in hexane at 0° C. (Masaoka, S., J. Organomet. Chem., 691:174-181, 2006). Cyclosiloxane 7 is then formed by an oxygen-halogen exchange between silicon and tin of dichlorosilane 5 and organodistannoxane 6, obtained in the reaction of chlorosilane 1 and commercially available bis(tributyltin) oxide (Sigma Aldrich, Milwaukee, Wis., Cat. No. B53383) (Lucy, V.V. et al., Rus. J. Gen. Chem., 73:546-549, 2003). In some instances, the resulting product at each step can be purified using a chromatographic method, such as HPLC, to separate the desired polymer from any unreacted starting material or unwanted side products.

(Gelest, Morrisville, Pa., Cat. No. SID 2742.0), and chloromethyl-phenyl-vinylsilane (Sigma Aldrich, Milwaukee, Wis., Cat. No. 68755).

Hydrosilylation of compound 8 with cyclosiloxane 7 in the presence of a transition metal catalyst yields dichlorosilane 9 (Hayashi, T., Comprehensive Asymmetric Catalysis, Supp. 2, Jacobsen, E. N., Pfaltz, A., Yamamoto, H. (eds.), Springer, Germany, 2004, Chap. 7, p. 319). Examples of transition metals employed in the catalyst include platinum, palladium and rhodium. The catalyst is chosen based on the substituents on the silicon atom. Especially applicable to reactions containing hydrosilanes of the formula $HSiCl_nR_{3-n}$ (n=2,3), such as cyclosiloxane 7, are palladium complexes, in particular $[PdCl(\eta^3-C_3H_5)]_2$ (Sigma Aldrich, Milwaukee, Wis., Cat. No. 222380) (Jensen, J. F. et al., J. Am. Chem. Soc. 124:4558-4559, 2002). In another example, the catalyst can be platinum divinyltetramethyldisiloxane (Zhang, Z. et al., Chem. Mater., 17(23):5646-5650, 2005).

Addition of 2b equivalents of water and (2b-2) equivalents of aniline to dichlorosilane 9 in ether results in controlled hydrolysis and condensation to form polysiloxanes of structure 10.

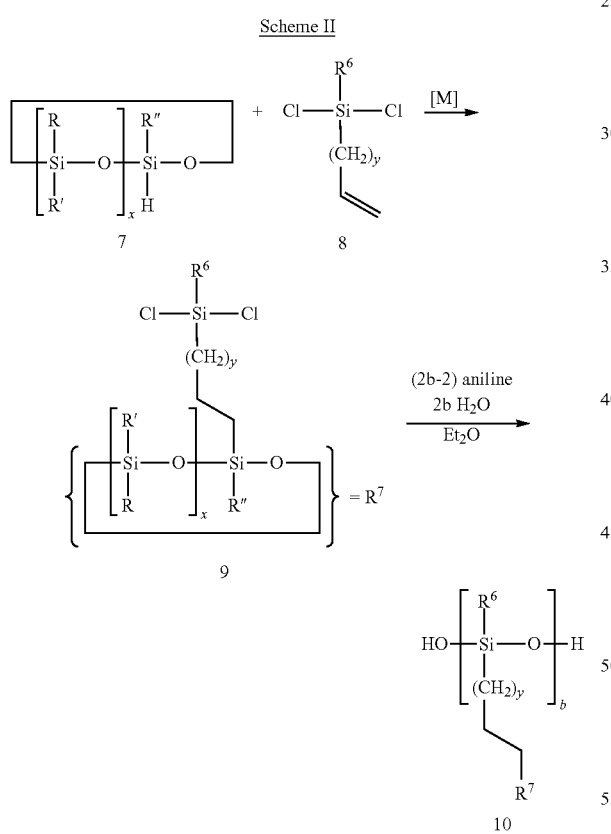

Scheme II

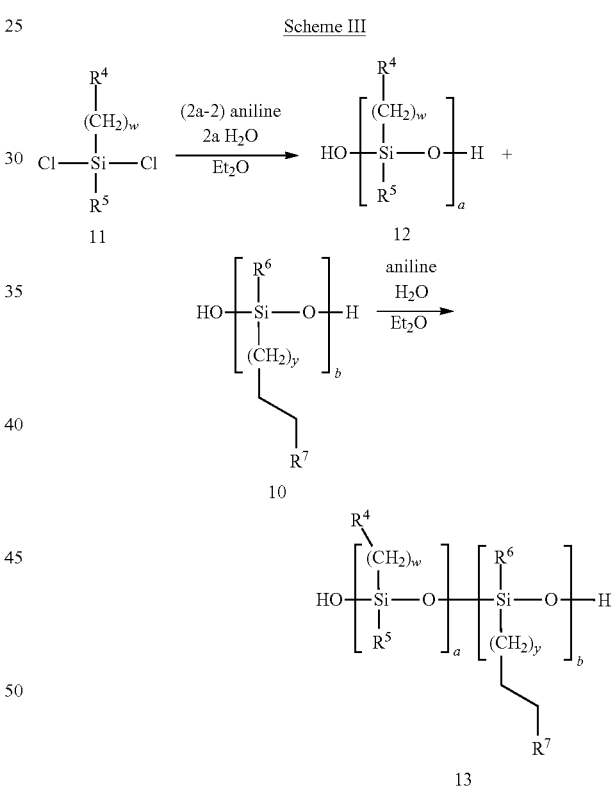

Scheme III

Scheme III describes the hydrolysis and condensation reactions involving polysiloxanes of structure 10 and commercially available dichlorosilanes 11. In some examples, compounds of structure 11 may possess an alkyl linker, such as commercially available dichloromethyl(2-phenethyl)silane (Sigma Aldrich, Milwaukee, Wis., Cat. No. 570974) and dichloromethyl(4-methylphenethyl)silane (Sigma Aldrich, Milwaukee, Wis., Cat. No. 448893). Other examples of commercially available compounds of structure 11 include dibenzyloxydichlorosilane (Gelest, Morrisville, Pa., Cat. No. SID 2755.0), bis(nonafluorohexyl)dichlorosilane (Gelest, Morrisville, Pa., Cat. No. SIB 1705.0), dimesityldichlorosilane When $R^7$ is a cyclosiloxane such as compound 7, the synthetic route follows Scheme II. Scheme II describes the addition of cyclosiloxane 7 to dichlorosilane 8, followed by hydrolysis and condensation to form polysiloxanes of structure 10. Commercially available dichlorosilanes of structure 8 contain an alkene connected to the central silicon atom by an alkyl linker, where y is greater than or equal to zero. Examples include butenylmethyldichlorosilane (Gelest, Morrisville, Pa., Cat. No. SIB1926.0), diallyldichlorosilane (Gelest, Morrisville, Pa., Cat. No. SID 3540.0) and diphenyldichlorosilane (Gelest, Morrisville, Pa., Cat. No. SID 4510.0).

Addition of 2a equivalents of water and (2a-2) equivalents of aniline to compound 11 in ether results in controlled hydrolysis and condensation to form polysiloxanes of structure 12. The polymerization effect of HCl is controlled by the use of aniline as an HCl scavenger. Compound 12 is reacted with polysiloxane 10 to afford polysiloxanes of structure 13. In some instances, the resulting product at each step can be purified using a chromatographic method, such as HPLC, to separate the desired polymer from any unreacted starting material or unwanted side products.

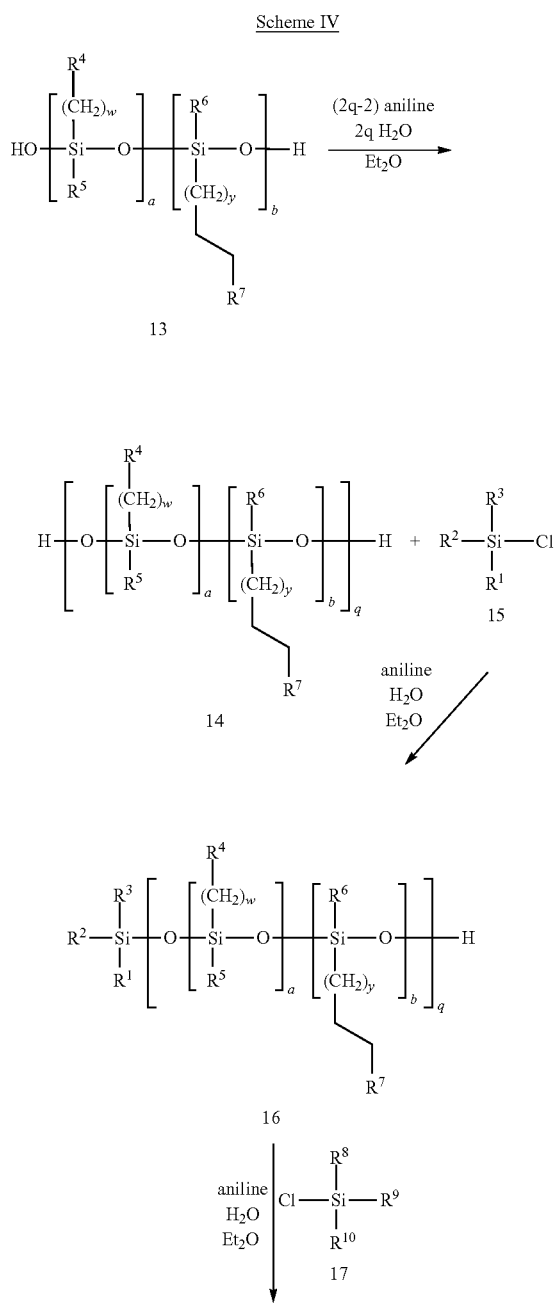

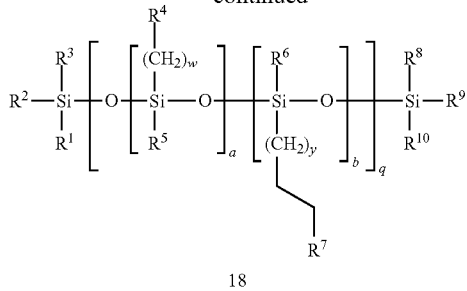

Scheme IV describes the preparation of end-capped polysiloxanes of structure 18 using commercially available compounds such as chlorosilanes of structures 15 and 17. For example, [(bicycloheptenyl)ethyl]dimethylchlorosilane (Gelest, Morrisville, Pa., Cat. No. SIB 0982.0), [2-(3-cyclohexenyl)ethyl]dimethylchlorosilane (Gelest, Morrisville, Pa., Cat. No. SIC 2457.0), and chloro-dimethyl(3,3,3-trifluoropropyl)silane (Sigma Aldrich, Milwaukee, Wis., Cat. No. 41715) are commercially available. Chlorosilanes of structures 15 and 17 can also be synthesized by the Direct Process as mentioned above.

Polysiloxanes of structure 13 are treated with water and aniline in ether to form controlled condensation product 14, which is then end-capped with chlorosilane 15 (14:15: aniline:$H_2O$=1:0.5:1:1), followed by chlorosilane 17 (16:17: aniline:$H_2O$=1:0.5:1:1) to afford polysiloxane 18. In some instances, the resulting product at each step can be purified using a chromatographic method, such as HPLC, to separate the desired polymer from any unreacted starting material or unwanted side products.

The hydrolysis and condensation reactions of chlorosilanes used to make the polysiloxanes described herein are well known to those skilled in the art (see e.g., Patnode and Wilcock, J. Am. Chem. Soc. 68:358-363, 1946; Takiguchi, J. Am. Chem. Soc. 81:2359-2361, 1959). The synthesis of chlorinated or partially chlorinated organosilanes and organopolysilanes can be effected by contacting an organosilane or organopolysilane with anhydrous $CuCl_2$ in a nonpolar alkane solvent, such as pentane or hexadecane, optionally using ultraviolet (366 nm) radiation in initiating the chlorination reaction (e.g., see U.S. Pat. No. 5,939,577). Ishikawa et al. (U.S. Pat. No. 5,258,535) describes a method for the synthesis of partially chlorinated organosilane or organopolysilanes that includes the stepwise substitution of Cl for H on a Si atom by the use of $CuCl_2$ in the presence of a CuI catalyst. Masaoka et al. describes the synthesis of chlorosilanes from alkoxysilanes, silanols, and hydrosilanes with bulky substituents (Journal of Organometallic Chemistry 691(1-2): 174-181 (2006). The Rochow-Muller Direct Synthesis is the one-step preparation of organohalosilanes from copper-activated silicon and an organohalide. This reaction is described in U.S. Pat. Nos. 2,380,995 and 2,488,487. Modifications of the Direct Synthesis are known in the art, such as those using modified catalysts (see, e.g., U.S. Pat. No. 7,153,991). Bažnt et al. (Angewandte Chemie (International Edition in English) 7(2): 112-120 (1968) describes the direct synthesis of organohalogenosilanes, particularly methyl- and phenylchlorosilanes. Phenylchlorosilanes also can be prepared using a Grignard reaction:

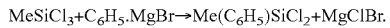

$MeSiCl_3 + C_6H_5 \cdot MgBr \rightarrow Me(C_6H_5)SiCl_2 + MgClBr$.

It is also possible to replace the chlorine groups on a Si atom by alcoholysis:

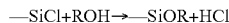

In this way, various silanes with different functionalities can be prepared. Various versions of these methods are used to produce chlorosilanes on a large scale and chlorosilanes are commercially available. Examples of commercially available dichlorosilanes where the R group is alkyl include dichlorodimethylsilane (Sigma Aldrich, Milwaukee, Wis., Cat. No. 440272), dichloro-methyl-octadecylsilane (Sigma Aldrich, Milwaukee, Wis., Cat. No. 76016), and n-butylmethyldichlorosilane (Gelest, Morrisville, Pa., Cat. No. SIB1972.0). Other commercially available dichlorosilanes include dichloromethyl(2-phenethyl)silane (Sigma Aldrich, Milwaukee, Wis., Cat. No. 570974), allyl(dichloro)methylsilane (Sigma Aldrich, Cat. No. 447277), dichloro(methyl)phenylsilane (Sigma Aldrich, Cat. No. 68650), dichloro-cyclohexylmethylsilane (Sigma Aldrich, Cat. No. 29462), dichloro(methyl)-propylsilane (Sigma Aldrich, Cat. No. 68940), t-butylphenyldichlorosilane (Gelest, Morrisville, Pa., Cat. No. SIB1974.0), diphenyldichlorosilane (Gelest, Cat. No. DID4510.1) and dibenzyloxydichlorosilane (Gelest, Cat. No. SID2755.0).

E. Applications

The cyclosiloxane-substituted polysiloxanes provided herein can be used by itself or in combination with other ingredients to formulate compositions for many applications. Non-limiting examples of such applications include mechanical lubricant fluid compositions, hydraulic fluid compositions, anti-foam compositions, water repellant compositions, release agent compositions, personal care and cosmetic compositions and in household care compositions.

1. Mechanical Lubricant Fluid Compositions

Lubricants are used in many applications to reduce frictional force between two or more interacting surfaces. Among the uses of lubricants are ball bearing and gear lubrication, and the lubrication of interacting surfaces, including metal/metal, metal/plastic, plastic/rubber and plastic/fiber surface interactions. Organopolysiloxane fluids are known lubricants. For many of these polymers to function as effective lubricants, however, additives, such as chlorinated phosphites and chlorinated phosphonate additives, must be included to impart superior anti-wear properties.

The substituted polysiloxanes provided herein, which include at least one cyclosiloxane substituent, exhibit good hard metal and soft metal lubricating properties and anti-wear properties and do not require the addition of additives, such as chlorinated phosphites and chlorinated phosphonate additives to impart anti-wear properties. These additives can be included in formulations that include the cyclosiloxane-substituted polysiloxanes provided herein, but are not required. The presence of the one or more cyclosiloxane substituents on the polysiloxane provides improved anti-wear characteristics on steel on brass, e.g., as compared to fluorosilicones, and the thermal stability of the cyclosiloxane-substituted polysiloxanes is increased, thus rendering the cyclosiloxane-substituted polysiloxanes suitable for the high temperature lubrication of various metals.

The mechanical lubricant fluid composition can include any amount of the cyclosiloxane-substituted polysiloxanes provided herein, alone or in combination with other polysiloxanes or with other lubricants or additives. In some embodiments, the cyclosiloxane-substituted polysiloxane is present at a concentration between about 50% to 100% by weight of the composition. In some embodiments, the cyclosiloxane-substituted polysiloxane is present at from about 60% to 99% by weight of the composition. In some embodiments, the cyclosiloxane-substituted polysiloxane is present at from about 0.1% to 50% by weight of the composition. In some embodiments, the cyclosiloxane-substituted polysiloxane is present at from about 0.5% to 45% by weight of the composition. In some embodiments, the cyclosiloxane-substituted polysiloxane is present at from about 1% to 40% by weight of the composition. In some embodiments, the cyclosiloxane-substituted polysiloxane is present at from about 2% to 35% by weight of the composition. In some embodiments, the cyclosiloxane-substituted polysiloxane is present at from about 3% to 30% by weight of the composition. In some embodiments, the cyclosiloxane-substituted polysiloxane is present in the mechanical lubricant composition at a concentration of 0.1, 0.2.0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5, 99.9 or 100 percent of the weight of the composition.

It is desirable to lubricate the interacting moving parts of mechanical devices while at the same time protecting the same from corrosion. It has been well known over the years to use hydrocarbon oils for lubricating mechanical devices. Silicone lubricants, or mixtures of silicone and hydrocarbon oils, have been suggested for use in lubricating mechanical devices.

The cyclosiloxane-substituted polysiloxanes provided herein are ideal for lubrication of mechanical devices. The cyclosiloxane substituents protect the linear polysiloxane backbone from the chemical effects of oxygen and heat and the mechanical breakdown due to shear. The cyclosiloxane-substituted polysiloxanes provided herein can be used in many damping devices, such as shock absorbers, torsional vibrational dampers and dash pot dampers. Thus, the polymers provided herein have application in combustion engines varying in size from aircraft and automobile engines to locomotive diesels, where constant viscosity and resistance to breakdown at high temperature and under high shear conditions is important. The polymers provided herein also have use in automotive air suspension systems where linear damping applications and dash pots are used. The cyclosiloxane-substituted polysiloxanes provided herein also can be used in rotary pumps, including as diffusion pump fluids. Silicone fluids are known in the art to be used as fluids for diffusion pumps, particularly in high-vacuum systems. The degree of substitution (i.e., the number of cyclosiloxane substituents) can be controlled to provide polysiloxanes having high boiling points with the desired viscosity. The resistance of the cyclosiloxane-substituted polysiloxane to chemical reactivity, particularly with oxygen, and the thermal stability of the polymers, makes the polymers provided herein more effective lubricants than hydrocarbon based lubricants. In some embodiments, it has been observed that the higher the number of cyclosiloxane substituents present, the greater the oxidative and thermal stability of the polymer. In some embodiments, aryl or haloalkyl substituents can be included on the polysiloxane, in addition to the cyclosiloxane substituents. The addition of aryl and/or haloalkyl substituents can yield polymers with enhanced thermal and/or oxidative stability.

The substituted polysiloxanes mixtures can be tested for their lubricity properties on a Shell four-ball tester, which comprises a device for holding three rigidly clamped one-half inch metal balls in a metal cup. A fourth rotating ball of the same diameter is then pressed into contact with the three stationary balls by an adjustable floating arm and allowed to run for 1 hour. The contact points on the three stationary balls shows a circular scar as wear progresses. The average diameter of these scars in millimeters after a 1 hour run at some particular speed and load is taken as the measurement of wear. The temperature at which the test is conducted may also be varied from room temperature to elevated temperatures of the order of about 150° C. All balls are immersed in the lubricant fluid during the test. The type of metal employed in the balls can be changed as, for example, lubricating surfaces can be steel-on-steel or steel-on-brass or brass-on-steel. In some tests, there was a 40 kilogram load on spinning ball which was made of bronze and in which the lubricant was maintained at a temperature of 170° F. The center ball on which the load was applied was rotated for 1 hour in the test in each case at a rotation of 1200 rotations per minute. The other balls were constructed of 52/100 tool steel. The sliding friction was also measured during each test. All percentage and parts are by weight.

Lubricant compositions containing the cyclosiloxane-substituted polysiloxanes provided herein also can contain co-lubricating systems. For example, the lubricant composition can include a cyclosiloxane-substituted polysiloxane provided herein in combination with a solid lubricant. Exemplary solid lubricants include a graphite, graphite fluoride, a buckyball, molybdenum disulfide, boron nitride, tungsten disulfide, hollow fullerene-like nanoparticles (such as described in U.S. Pat. No. 6,710,020), metal dichalcogenides and polytetrafluoroethylene (PTFE).

The lubricant compositions provided herein can further contain additives commonly employed in the art to modify lubricant fluids, such as dyes, thermal stabilizers, antioxidants, dispersants, anti-wear additives, metal passivators, anti-foaming agents, flammability resistance additives, fire retardants, rust inhibitors, friction modifiers and corrosion inhibitors.

2. Hydraulic Fluid Compositions

Silicone fluids are known in the art to be useful as hydraulic fluids (see U.S. Pat. Nos. 2,614,989, 2,990,373, 3,821,114 and 4,137,189). Hydraulic systems transmit power from one place to another place via a hydraulic fluid. While hydraulic systems vary from highly complex control systems to simple presses, they can be characterized as comprising six main elements in fluid communication: (1) a hydraulic fluid; (2) a reservoir in which to store the hydraulic fluid; (3) a means to generate pressure in the hydraulic fluid, such as a pump; (4) piping, to transmit the generated pressure through the hydraulic fluid; (5) a means to convert the pressure into power at a place removed from the place at which the pressure was generated, such as an hydraulic motor, actuator, cylinder, ram or jack; and (6) pressure control means, such as control valves and relief valves. In order to utilize the hydraulic principle, of course, it is necessary for the hydraulic fluid to be within an enclosed volume able to sustain elevated pressures.

The hydraulic fluid compositions including cyclosiloxane-substituted polysiloxanes provided herein can be used as the hydraulic fluid in a system for transmitting power from one place to another place as described above. Advantageously, the hydraulic fluid compositions provided herein can be used as the hydraulic fluid in hydraulic systems where the fluid is exposed to extremes of temperature and high pressure.

The cyclosiloxane-substituted polysiloxanes provided herein exhibit excellent thermal stability, lubricity, viscosity and oxidative stability for use as a hydraulic fluid. The cyclosiloxane-substituted polysiloxanes exhibit high compressibility, another attribute useful in a hydraulic fluid. The cyclosiloxane-substituted polysiloxanes provided herein exhibit good film forming properties on metal surfaces, and thus exhibit good lubricating properties. The cyclosiloxane-substituted polysiloxanes also exhibit compatibility with seal materials.

The hydraulic fluid composition can include any amount of the cyclosiloxane-substituted polysiloxanes provided herein, alone or in combination with other polysiloxanes or with other additives. In some embodiments, the cyclosiloxane-substituted polysiloxane is present at a concentration between about 50% to 100% by weight of the composition. In some embodiments, the cyclosiloxane-substituted polysiloxane is present at from about 60% to 99% by weight of the composition. In some embodiments, the cyclosiloxane-substituted polysiloxane is present at from about 0.1% to 50% by weight of the composition. In some embodiments, the cyclosiloxane-substituted polysiloxane is present at from about 0.5% to 45% by weight of the composition. In some embodiments, the cyclosiloxane-substituted polysiloxane is present at from about 1% to 40% by weight of the composition. In some embodiments, the cyclosiloxane-substituted polysiloxane is present at from about 2% to 35% by weight of the composition. In some embodiments, the cyclosiloxane-substituted polysiloxane is present at from about 3% to 30% by weight of the composition. In some embodiments, the cyclosiloxane-substituted polysiloxane is present in the hydraulic fluid composition at a concentration of 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5, 99.9 or 100 percent of the weight of the composition.

Many applications of hydraulic fluids require that the viscosity of the fluid change as little as possible over the intended operating temperature range. In some embodiments, the cyclosiloxane-substituted polysiloxanes provided herein exhibit a low viscosity variation as a function of temperature relative to organic oils. This property, along with its thermal and oxidative stability, makes the cyclosiloxane-substituted polysiloxanes provided herein an ideal hydraulic fluid for many high performance applications.

In some embodiments, the cyclosiloxane-substituted polysiloxanes provided herein have a viscosity of about 100 to about 100,000 cP when measured at 25° C. at a shear rate of 100 $\sec^{-1}$. The nature of the terminal groups of the cyclosiloxane-substituted polysiloxanes provided herein is not critical for the purposes of using the polysiloxane as a hydraulic fluid, and these may be selected from triorganosiloxy groups, hydroxy diorganosiloxy groups or halogen-containing organosiloxy groups. Specific examples of such terminal groups include trimethylsiloxy, triethylsiloxy, hydroxydimethylsiloxy, phenyldimethylsiloxy and chloropropyldimethylsiloxy. In some embodiments, the terminal groups are selected from trialkylsiloxy groups where the alkyl groups contain 1 to 3 carbon atoms. In some embodiments, the cyclosiloxane-substituted polysiloxanes provided herein are endcapped with trimethylsiloxy groups and have a viscosity of about 1,000 to about 100,000 cP when measured at 25° C. at a shear rate of 100 $\sec^{-1}$. In some embodiments, the viscosity is between 5,000 to 15,000 cP at 25° C. In some embodiments, the viscosity is between 10,000 to 25,000 cP when measured at 25° C. at a shear rate of 100 $\sec^{-1}$. In some embodiments, the viscosity is between 15,000 to 50,000 cP when measured at 25° C. at a shear rate of 100 $\sec^{-1}$. In some embodiments, the viscosity is between 20,000 to 40,000 cP when measured at 25° C. at a shear rate of 100 sec$^{-1}$. In some embodiments, the viscosity is between 30,000 to 60,000 cP when measured at 25° C. at a shear rate of 100 sec$^{-1}$.

The hydraulic fluid compositions can include other components. For example, in some embodiments, the hydraulic fluid compositions includes a phenylmethylsiloxane/dimethylsiloxane copolymer having a molar content of phenylmethylsiloxane units of about 4 to about 8 percent, or from 4 to 6 mole percent. When present, in some embodiments, the phenylmethylsiloxane/dimethylsiloxane copolymer can have a viscosity that is from 5 times to 10 times greater than the viscosity of the cyclosiloxane-substituted polysiloxanes provided herein. The phenylmethyl-siloxane/dimethylsiloxane copolymer also can contain trimethylsiloxy end groups.

The phenylmethylsiloxane/dimethylsiloxane copolymer can be prepared by methods well known in the art, such as by the co-hydrolysis and subsequent condensation of the respective chlorosilanes or by the base-catalyzed equilibration of the respective linear or cyclic siloxane species, along with the appropriate end-blocking siloxane. In some embodiments, the phenylmethylsiloxane/dimethylsiloxane copolymer is a random copolymer fluid having an average degree of polymerization of about 500 to about 10,000.

The hydraulic fluid compositions provided herein can further contain additives commonly employed in the art to modify hydraulic fluids, such as dyes, thermal stabilizers, antioxidants, dispersants, anti-wear additives, lubrication additives, metal passivators, anti-foaming agents, flammability resistance additives, such as highly brominated compounds to reduce flammability, fire retardants, rust inhibitors, friction modifiers and corrosion inhibitors.

When the hydraulic fluid includes phenylmethylsiloxane/dimethylsiloxane copolymer, the composition can be prepared by any method known in the art. An exemplary method includes thoroughly mixing from about 2 to about 20 parts by weight of the phenylmethylsiloxane/dimethylsiloxane copolymer with 100 parts by weight of cyclosiloxane-substituted polysiloxanes provided herein. A uniform dispersion can be attained by using a high shear mixer or by blending the two components together in a mutual solvent, followed by removal of the solvent, to provide the hydraulic fluid composition. The final viscosity of the hydraulic fluid can be adjusted by judicious selection of the cyclosiloxane-substituted polysiloxane with a desired viscosity and selection of a phenylmethylsiloxane/dimethylsiloxane copolymer with an appropriate viscosity. Such refinements are subject to routine experimentation by those skilled in the art and can be easily determined.

In some embodiments, provided is a hydraulic fluid composition that includes from about 91.9-99.8 wt % of a cyclosiloxane-substituted polysiloxane provided herein, an anti-oxidant in the range of 0.005-0.1% by weight, optionally an anti-foaming agent in the range of 0.01 to 1.0% by weight, a pour point dispersant in the range of 0.01 to 1.0% by weight, a corrosion inhibitor in the range of 0.10% by weight and a lubricity additive in the range of 0.005-5.0% by weight. Exemplary anti-oxidants include 2,4,6-tri-tert-butylphenol, 2,6-di-tert-butyl-4-n-butylphenol, 2,6-di-tert-butyl-4-methylphenol or n-octadecyl 3-(3,5-di-tert-butyl-4-hydroxy phenyl)propionate, penta erythrityl tetrakis[3-(3,5-di-tert-butyl-4-hydroxy-phenyl)propionate], di-n-octadecyl (3,5-di-tert-butyl-4-hydroxy-benzyl) phosphonate, 2,4,6-tris(3,5-di-tert-butyl-4-hydroxybenzyl)mesitylene, tris(3,5-di-tert-butyl-4-hydroxybenzyl)-isocyanurate or hindered piperidine carboxylic acids, acylated derivatives of 2,6-dihydroxy-9-azabicyclo[3.3.1]nonane or bicyclic hindered amines or diphenyl-amines or dinaphthylamines, phenylnaphthyl amines, N,N'-diphenylphenylene-diamine or p-octyl-diphenylamine, p,p-dioctyl diphenylamine, N-phenyl-1-naphthylamine, N-phenyl-2-naphthylamine, N-(p-dodecyl)phenyl-2-naphthylamine, di-1-naphthylamine, di-2-naphthylamine, N-alkyl phenothiazines, imino(bisbenzyl), 6-(tert-butyl)phenol, 2,6-di-(tert-butyl)phenol, 4-methyl-2,6-di-(tert-butyl) phenol, 4,4'-methylene-bis(-2,6-di-(tert-butyl)phenol), methyl hydroxy hydrocinnamide, phenothiazines derivatives, alkylated 5-amino tetrazole, di-tert-butyl-p-amino phenol and a mixture thereof.

Exemplary anti-foam agents include silicone oil, polyvinyl alcohol, octanol, polyethers and a mixture thereof. Exemplary pour point dispersants include diethylhexyl adipate, polymethacrylate, alkylated naphthalene derivatives, polyvinyl acrylate and mixtures thereof. Exemplary corrosion inhibitors include octyl-1H-benzotriazole, di-tertiary butylated 1H-benzotriazole, propyl gallate, polyoxyalkylene polyols, octadecyl amines, nonyl phenol ethoxylates, calcium phenolates of hydrogenated pentadecyl phenol, magnesium alkyl benzene sulfonates and mixtures thereof. Examples of rust inhibitors include (a) organic acids and their esters, metal salts and anhydrides, for example, N-oleoyl-sarcosine, sorbitan monooleate, lead naphthenate, alkenyl succinic acid anhydrides, for example dodecenyl succinic anhydride, alkenyl succinic acid part esters and part amides and 4-nonylphenoxyacetic acid; (b) nitrogen-containing compounds, for example, primary, secondary or tertiary aliphatic or cycloaliphatic amines and amine salts of organic and inorganic acids, for example oil-soluble alkylammonium carboxylates; and heterocyclic compounds, for example: substituted imidazolines and oxazolines; (c) phosphorus-containing compounds, for example, amine salts of phosphoric acid partial esters or phosphonic acid partial esters and zinc dialkyl-dithio-phosphates; (d) sulfur-containing compounds, for example, barium dinonyl-naphthalene-sulfonates and calcium petroleum-sulfonates.

Exemplary dispersants/surfactants include polybutenyl succinic acid amides or imides, polybutenyl phosphonic acid derivatives and basic magnesium, calcium and barium sulfonates and phenolates. Exemplary anti-wear additives include compounds containing sulfur and/or phosphorus and/or halogen, such as sulfurized vegetable oils, zinc dialkyl-dithio-phosphates, tritolyl-phosphate, chlorinated paraffins, alkyl and aryl di- and trisulfides, triphenyl-phosphoro-thionates, diethanolaminomethyltolyltriazole and di(2-ethylhexyl) aminomethyltolyltriazole.

In some embodiments, the hydraulic fluid composition is used as a break fluid. Brake fluid compositions containing a cyclosiloxane-substituted polysiloxane provided herein have lower viscosities at lower temperatures, have improved lubricating properties and exhibit better controlled swelling properties on rubber parts, such as neoprene, styrene-butadiene rubber or polymers made from ethylene-propylene-diene monomers, which are generally present in hydraulic systems. Also, the brake fluid compositions containing a cyclosiloxane-substituted polysiloxane provided herein are more heat-resistant and display better compatibility with the additives which are generally employed in brake fluids.

3. Anti-foam Compositions

Provided herein are silicone anti-foam compositions that include a cyclosiloxane-substituted polysiloxane, particularly a cyclosiloxane-substituted polysiloxane having a viscosity varying from 100 to 100,000 cP when measured at 25° C. at a shear rate of 100 sec$^{-1}$, particularly in the range of from 100 to 2,500 cP or 100 to 500 cP when measured at 25° C. at a shear rate of 100 sec$^{-1}$. The cyclosiloxane-substituted polysiloxane also can include aryl substitutes, such as phenyl groups, or haloalkyl substituents.

The anti-foam composition can include any amount of the cyclosiloxane-substituted polysiloxanes provided herein, alone or in combination with other cyclosiloxane-substituted polysiloxanes or with other silicones or additives. In some embodiments, the cyclosiloxane-substituted polysiloxane is present at a concentration between about 50% to 100% by weight of the composition. In some embodiments, the cyclosiloxane-substituted polysiloxane is present at from about 60% to 99% by weight of the composition. In some embodiments, the cyclosiloxane-substituted polysiloxane is present at a concentration between about 25% to 75% by weight of the composition. In some embodiments, the cyclosiloxane-substituted polysiloxane is present at from about 0.1% to 50% by weight of the composition. In some embodiments, the cyclosiloxane-substituted polysiloxane is present at from about 0.5% to 45% by weight of the composition. In some embodiments, the cyclosiloxane-substituted polysiloxane is present at from about 1% to 40% by weight of the composition. In some embodiments, the cyclosiloxane-substituted polysiloxane is present at from about 2% to 35% by weight of the composition. In some embodiments, the cyclosiloxane-substituted polysiloxane is present at from about 3% to 30% by weight of the composition. In some embodiments, the cyclosiloxane-substituted polysiloxane is present in the anti-foam composition at a concentration of 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, 25, 26, 27, 28, 29, 30, 31, 32, 33.34, 35, 36, 37, 38, 39, 40, 41, 42, 43, 44, 45, 46, 47, 48, 49.50, 51, 52.53, 54.55, 56, 57, 58, 59, 60, 61.62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5, 99.9 or 100 percent of the weight of the composition. The anti-foam composition also can include from 1 to 10% by weight of a diorganopolysiloxane of a silicone resin composed of $R^*_3SiO_{0.5}$ units and $SiO_2$ units, where the silicone resin can contain anywhere from 0.1 to 6% of hydroxyl groups.

The anti-foam composition also can include from 0.5 to 15% by weight of a filler. The filler can be selected from a treated or untreated fumed silica, a treated or untreated precipitated silica, which may be treated or untreated. The filler can be treated with low molecular weight linear polysiloxanes. In order to impart to such silicone anti-foam compositions an improved dispersability in aqueous systems, the anti-foam composition can be formed into an emulsion from the above ingredients in water utilizing as emulsifying agents such well known emulsifying agents as sorbitan monostearate, polyoxyethylene sorbitan monostearate and/or polyoxyethylene stearate. The use of the silicone anti-foam composition in the form of a water emulsion results in the maximum efficiency in dispersing the silicone composition in foamed aqueous systems. Accordingly, the silicone anti-foam composition that is to be used in aqueous systems can be provided in the form of an emulsion. The anti-foam compositions can be prepared by simply mixing the cyclosiloxane-substituted polysiloxane polymer and optionally the silicone resin and a treated or untreated filler, with high shear agitation.

When present, the silicone resin can be a condensed resin in which most of the silanol groups are condensed out or it can be an uncondensed silicone resin where most or all of the silanol groups in the silicone resin are uncondensed. Generally, the silicone resin in the anti-foam silicone compositions contains anywhere from 0.1 to 6% by weight of hydroxyl groups, particularly from 2 to 6% by weight of hydroxyl groups for maximum anti-foam properties. The procedure for making such a silicone resin is well known in the art (e.g. see U.S. Pat. No. 3,730,931). For example, such a silicone resin can be produced by hydrolyzing in water a diorganodichlorosilane and a tetrachlorosilane in the appropriate amounts to obtain the desired ratio of monofunctional units to tetrafunctional units in the silicone resin product. The silicone resin hydrolyzate that is formed is then separated from the excess water and acid and purified by well known techniques, e.g., by the addition of water and washing the silicone resin hydrolyzate to remove excess acid until the acid content is below 10 parts per million. In a similar procedure, such a resin can be formed by, e.g., hydrolyzing a triorganochlorosilane and ethylorthosilicate in ether. In addition, the hydrolysis can be carried out in hydrolysis medium composed of water and a water-immiscible organic solvent where the silicone resin hydrolyzate is soluble in the water-immiscible organic solvent and thus can be extracted from the water and thus purified by well known refluxing procedures. Such solvents include xylene, toluene and benzene. For maximum anti-foaming imparting properties, it is desired that the silicone resin have a silanol content of anywhere from 2 to 6% by weight.

In such anti-foam compositions, an additional ingredient is a filler. Filler particles that are useful in the antifoams provided herein are well known and have been described in many publications. They are finely divided particulate materials examples of which include silica, fumed silica, fumed $TiO_2$, $Al_2O_3$, zinc oxide, magnesium oxide, salts of aliphatic carboxylic acids, and reaction products of isocyanates with certain materials, i.e. cyclohexylamine, alkyl amides, for example ethylene or methylene bis stearamide. In some embodiments, the filler includes silica particles with a surface area of at least 50 $m^2/g$. Suitable silica particles can be made according to any of the standard manufacturing techniques for example thermal decomposition of a silicon halide, decomposition and precipitation of a metal salt of silicic acid, i.e. sodium silicate and a gel formation method. Exemplary silicas for use in the antifoams include therefore fumed silica, precipitated silica and gel formation silica. The average particle size of these fillers may range from 0.1 to 20 μm or form 0.5 to 2.5 μm.

Generally, there may be present anywhere from 0.5 to 15% by weight of a filler by weight of the cyclosiloxane-substituted polysiloxane polymer. The filler can be any precipitated or fumed silica filler and can have a hydroxyl content of anywhere from 1 to 15% by weight. Precipitated silica fillers that can be used are commercially available and are generally identified as hydrated silicon dioxide having a surface area from about 300 to 400 meters per gram. The filler can have a moisture content generally in the area of 1 to 15% by weight, particularly having a moisture content of about 5 to 15% by weight. The filler can function in the anti-foam silicone composition to impart some anti-foaming properties to the composition; and also to enhance the dispersability of the silicone anti-foam composition in the foamed system; and also to enhance the stability of any emulsion that might be formed from the silicone anti-foam composition. The filler can be treated with a wetting agent to assist in the incorporation of the filler into the composition.

The instant anti-foam compositions can specifically contain only the cyclosiloxane-substituted polysiloxane polymer. In some embodiments, the anti-foam composition includes a cyclosiloxane-substituted polysiloxane in combination with a filler and/or a silicone resin composed of monofunctional and tetrafunctional siloxy units. In a simple procedure such a mixture is prepared by simply dissolving the silicone resin in a solvent and adding the solution to the diorganopolysiloxane polymer and then with constant agitation, then the mixture is heated to remove all the solvent from the composition. As constituted, such a composition can be utilized as an antifoam silicone composition with improved results to defoam foamed systems.

In some embodiments, the anti-foam composition provided herein is in the form of an emulsion. In some embodiments, the anti-foam is in the form of an oil in water emulsion or a water-in-oil emulsion. In embodiments where the anti-foam is to be used in aqueous systems, the anti-foam formulation can be provided as an oil-in-water emulsion. The desirability of this is that with the use of such emulsions, and anti-foam silicone compositions provided herein is easily dispersed in aqueous foam systems and accordingly, is more efficient and more effective in smaller quantities in defoaming the aqueous foam system and at a faster rate than is the case when such emulsions are not utilized.

In formulations in the form of emulsions, an emulsifying agent can be included. Any emulsifying agents which are acceptable in the foamed system to which the anti-foam silicone composition is to be added can be used. Exemplary emulsifying agents are compounds selected from conventional emulsifiers, e.g., such as polyoxyethylene sorbitan monostearate (Tween 60) sorbitan monostearate (SPAN 60), polyoxyethylene stearate (Myrj 52S), and mixtures thereof. For most food contact applications, food approved emulsifying agents are used, such as a mixture of sorbitan monostearate (Span 60) and polyoxyethylene stearate (Myrj 52S). Other traditional or desired ingredients can be added to emulsify the anti-foam compositions provided herein. For instance, sorbic acid or polysorbates can be added at a concentration of anywhere from 0.01 to 0.1% by weight of the composition as a bactericide. Methods of formulating emulsions are well known (e.g., see U.S. Pat. No. 4,005,044). In an exemplary method, the emulsifying agent is dissolved in water, the cyclosiloxane-substituted polysiloxane and optionally the silicone resin is dispersed in the emulsifying agent water solution; then a treated or untreated filler, such as silica filler, is mixed into the dispersion and the resulting composition is milled. The method of making the anti-foams as provided herein are not limited solely to such a mixing procedure. Other procedures of forming an emulsion can be used to prepare the emulsion compound. Another general method for producing the emulsion composition includes adding emulsifying agents such as sorbitan monostearate and oxyethylene stearate to water and heating the resulting mixture to temperatures at 60°-100° C. under high shear agitation. To this mixture is added the desired amount of the cyclosiloxane-substituted polysiloxane polymer, and if desired, silicone resin and a filler is incorporated with high shear.

4. Water Repellent Agent Compositions

The cyclosiloxane-substituted polysiloxanes provided herein can be used as water repellents. The cyclosiloxane-substituted polysiloxanes can be used in any concentration to obtain a water repellant effect on a substrate. In some embodiments, the cyclosiloxane-substituted polysiloxane is used at a concentration between about 50% to 100% by weight of the composition. In some embodiments, the cyclosiloxane-substituted polysiloxane is used at a concentration between about 0.5 to 50% by weight of the composition. Although some water repellant effect can be obtained by using a solution containing less than 0.5% of the cyclosiloxane-substituted polysiloxanes, generally, for most practical purposes, a solution containing at least 0.5% of the cyclosiloxane-substituted polysiloxanes should be used. Compositions containing more than 50% by weight of the cyclosiloxane-substituted polysiloxanes give excellent results when applied to a substrate, but it may not be economical to use a highly concentrated solution of the polymer in some applications, such as for application to masonry. In some embodiments, the water repellent coating composition contains from about 1-25% of the cyclosiloxane-substituted polysiloxanes by weight, or from about 5-20% of the cyclosiloxane-substituted polysiloxanes by weight of the composition. In some embodiments, the water repellent coating composition contains 1-5% of the cyclosiloxane-substituted polysiloxanes by weight. In some embodiments, the cyclosiloxane-substituted polysiloxane is present in the water repellent coating composition at a concentration of 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97-497, 98, 99, 99.5, 99.9 or 100 percent of the weight of the composition.

The water repellent coating composition can include additives in addition to the cyclosiloxane-substituted polysiloxanes. These other additives include waxes, tertiary fatty amines, metallic soaps or a mixture of these additives. These additives can be added in a concentration from about 0.5 to 15%. The composition can be formulated as a solution or as an emulsion or a mixed emulsion.

The water repellant coating composition provided herein, containing the cyclosiloxane-substituted polysiloxane, is quick acting and becomes effective in a much shorter period of time when compared to the prior art water repellant compounds. For example, a coating of a 5-20% solution of the cyclosiloxane-substituted polysiloxane can be air cured or dried in less than one hour at ambient temperature. This is in contrast to the several days curing or drying time normally required of the silicone resins used for the same purposes. Moreover, the compositions, with or without the addition of other water repellant additives, can be applied onto a wet masonry surface and still impart water repellency to the coated surface. The water repellant coating compositions provided herein can be safely employed when the weather is uncertain or when precipitation is expected, and thus can be applied practically at any time.

The water repellant coating composition provided herein can be used to treat any substrate. It is adherent to and effective on such diverse types of surfaces as concrete, mortar, brick, stucco, tile, wood, ceramic, metal, plastic, glass, textiles, leather and paper. Moreover, the compositions are effective on painted as well as unpainted substrates. The water repellant coating composition provided herein can be applied by any application technique, such as dipping, spraying, or brushing the composition onto the substrate.

The water repellant coating composition containing a cyclosiloxane-substituted polysiloxane provided herein can include other materials to obtain a desired result. Thus, for example, dyes, pigments, stains or other materials including fillers can be incorporated in the water repellant coating composition to visually modify the treated substrate. Examples of other materials that can be advantageously included in the composition include fungicides, bactericides, and fire-retardant materials. The use of the water repellant coating composition and fungicides and/or bactericides, for example, will be beneficial since the water repellant coating composition will tend to keep the treated substrate dry thus depriving any fungus or bacteria that may be present of a favorable growth environment.

In some embodiments, the water repellant coating composition can be used to keep moisture within a substrate. For example, in the curing of concrete or mortar, it is important to keep moisture in the structure for the proper development of strength of the materials. The moisture can be retained in concrete or mortar by treating the surface of the structure with the water repellant coating composition provided herein.

The water repellant coating compositions provided herein form an adherent coating on surfaces such as glass and metal objects, which tend to be difficult to coat with coatings of the prior art. For this reason, the water repellant coating composition provided herein can be used to protect equipment or structures in the construction field. For example, in the construction of a large building, the lower portions of the building, and the equipment installed thereat such as pumps and plumbing equipment or parts of an elevator are frequently either immersed in water or exposed to very high humidity. Such exposure frequently causes the structure or equipment to rust and deteriorate. Moreover, in the case of electrical equipment, prolonged exposure to moisture can cause the equipment to be inoperative or be the source of electrical fire hazards. In such situations, a heavy grease is sometimes used to protect the equipment from the moisture, but this is not very satisfactory. The grease can be rubbed off or it can be washed off of equipment. As a result, when such equipment is being protected by a film of heavy grease, the protective film must be periodically inspected and renewed. The water repellant coating composition provided herein can provide protection of such equipment from exposure to high levels of moisture. Thus, a solution of cyclosiloxane-substituted polysiloxane, with or without other additives such as a silicone resin, can provide an adherent and water repellant coating on metallic or other surfaces of equipment or structures to protect such surfaces against exposure to moisture.

Another useful application of the water repellant coating compositions containing a cyclosiloxane-substituted polysiloxane provided herein is the protection of various products during storage and shipment against corrosion by moisture. Many metallic products are frequently corroded during this period between the manufacture and the delivery to a user. Such corrosion can be prevented by the use of the water repellant coating composition containing a cyclosiloxane-substituted polysiloxane provided herein.

The water repellant coating composition provided herein can be used to treat a variety of natural and synthetic textiles and leathers. In such applications, it is advantageous to provide the water repellant coating composition in the form of an emulsion. The composition can be applied to the textile or leather surface using any method known in the art. Such application methods include spraying, padding, in which the substrate is impregnated with a dilute emulsion of the water repellant coating composition provided herein and squeezed between rollers to remove excess liquid. In some embodiments, the textile or leather is dried at a temperature of between 200° F. and 250° F. A washing step following the drying step also can be included.

The water repellant coating compositions provided herein are easily applied, render the fabric resistant to stains, and give the textile or leather a smooth, silky handfeel and good drape. The textiles or leather to which the water repellant coating composition provided herein is applied exhibit wear resistance, tear resistance and wrinkle resistance. In some embodiments, textiles treated with the water repellant coating composition provided herein exhibit resistance to shrinking after repeated cleaning cycles compared to untreated textiles.

5. Release Agent Compositions

Release agents or release coatings are coatings that are applied to a first substrate to prevent or decrease the adhesion of a second substance to the first substrate. In some embodiments, release agents allow the controlled release of one substrate from another substrate. Applications in which release agents are used include mold release agents (to allow release of a molded object from the die or mold), die casting and in aluminum machining and extruding. Controlled release is the ability to control release between one substrate, such as a coating, and a substrate to which the first substrate is attached, such as an adhesive substrate. Release is a measure of the degree of adhesion which a sticky or tacky substance displays towards an adhesive coating. Release coatings are widely used as mold release agents, as pressure sensitive label backings and as coatings for containers to facilitate removal of the contents thereof.

The cyclosiloxane-substituted polysiloxanes provided herein demonstrate excellent release properties and can be used as release agents, particularly as mold release agents, adhesive applied release papers and as pressure sensitive label backings. Adhesive coated release paper is normally supplied in the form of large rolls. In order to have the adhesive coating uniformly adhere to the face of the release paper as the roll is unwound, the underside of the release paper is coated with a release coating that adheres more to the paper substrate than the adhesive, thereby obtaining the desired differential release force. Thus, the adhesive coating adheres to the face of the release paper with greater force than to the underside of the release paper, but with less force than to the substrate to which the adhesive is applied, such as a floor tile, wall covering or pressure sensitive label.

Differential release paper is prepared by coating one side of the paper with a silicone composition that adheres to the paper but is less adherent to an applied adhesive.

An effective release coating composition is provided by including a cyclosiloxane-substituted polysiloxane as described herein. The release coating composition can include any amount of the cyclosiloxane-substituted polysiloxanes provided herein, alone or in combination with other cyclosiloxane-substituted polysiloxanes or with other silicones or additives. In some embodiments, the cyclosiloxane-substituted polysiloxane is present at a concentration between about 50% to 100% by weight of the composition. In some embodiments, the cyclosiloxane-substituted polysiloxane is present at from about 60% to 99% by weight of the composition. In some embodiments, the cyclosiloxane-substituted polysiloxane is present at a concentration between about 25% to 75% by weight of the composition. In some embodiments, the cyclosiloxane-substituted polysiloxane is present at from about 0.1% to 50% by weight of the composition. In some embodiments, the cyclosiloxane-substituted polysiloxane is present at from about 0.5% to 45% by weight of the composition. In some embodiments, the cyclosiloxane-substituted polysiloxane is present at from about 1% to 40% by weight of the composition. In some embodiments, the cyclosiloxane-substituted polysiloxane is present at from about 2% to 35% by weight of the composition. In some embodiments, the cyclosiloxane-substituted polysiloxane is present at from about 3% to 30% by weight of the composition. In some embodiments, the cyclosiloxane-substituted polysiloxane is present in the release coating composition at a concentration of 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5, 99.9 or 100 percent of the weight of the composition.

In some embodiments, the composition is formulated as an aqueous emulsion. In some embodiments, the release coating includes conventional auxiliary agents such as thickening agents and additives. Thickening agents can be added to these compositions in order to adjust their viscosities to the requirements of the equipment used to apply the coating composition and to regulate coating pick-up and holdout. In some embodiments, the release coating includes plasticizers.

In the release agent formulations provided herein, any thickening agent can be used that does not negatively interact with the cyclosiloxane-substituted polysiloxane. Examples of suitable thickening agents include sulfonated polystyrene, water-dispersible, thickening grade, hydrophilic clays such as bentonite, digested starch, natural gums, including xanthan gum, gellan gum, welan gum, rhamsan gum, diutan, alginates, including sodium and potassium alginates, curdlan, chitosan, guar gum, locust bean gum, carboxy-substituted cellulose ethers, such as carboxymethyl cellulose, hydroxypropyl cellulose, methyl cellulose, and combinations thereof. The thickening agent may be selected and employed in such quantities as to foam a thixotropic gel in which the uniform-sized droplets of the oil can be suspended. In other words, the thickened liquid generally should be non-Newtonian in its fluid behavior, that is, of a nature to prevent rapid movement of the dispersed droplets within the aqueous liquid by the action of gravitational force due to the difference in density of the phases. The stress exerted on the surrounding medium by a suspended droplet may not be sufficient to cause rapid movement of the droplet within such non-Newtonian media. Usually, the thickener agents can be employed in such proportions relative to the aqueous liquid that the apparent viscosity of the thickened aqueous liquid is in the order of at least 500 centipoise as determined by means of a Brookfield viscometer using the No. 2 spindle at 30 rpm. The thickening agent can be prepared as a separate concentrated composition that is then carefully blended with the oil droplet dispersion. The resulting thickened dispersion is capable of being handled, for example, passed through pipes, and can be subjected to polymerization conditions substantially without mechanical change in the size or shape of the dispersed oil droplets.

The release agent composition containing the cyclosiloxane-substituted polysiloxanes can contain an organic solvent. As the organic solvent, a solvent which has excellent solubility for each component and is not reactive with any component of the release agent composition can be employed without any restriction. Examples of such solvents include toluene, xylene, methanol, ethanol, isobutanol, n-butanol, ethyl acetate, methyl ethyl ketone, acetone, tetrahydrofuran, isopropanol, dimethylformamide and N-methylpyrrolidine. These solvents can be used singly or in combination of two or more. The organic solvent can be used in such an amount that the content of the cyclosiloxane-substituted polysiloxanes in the release agent composition is in the range of 1 to 80% by weight, or in the range of 1 to 60% by weight, or in the range of 1 to 50% by weight, or in the range of 1 to 40% by weight, or in the range of 1 to 30% by weight, or in the range of 1 to 20% by weight, or in the range of 1 to 10% by weight.

The release agent composition can include other additives, such as an antistatic agent, surface active agent, antioxidant, lubricant, flame retardant, colorant, light stabilizer and heat stabilizer, and such additives can be added at levels within which their presence is not detrimental to release functionality of the composition.

The release coating compositions containing a cyclosiloxane-substituted polysiloxane can be applied to a surface by conventional air knife, trailing blade, roll, spraying, printing or casting methods. The coated substrate optionally is subjected to a curing treatment, which generally involves subjecting the surface to heat for a short period of time. Curing can be effected by heating the coated surface for about 0.1 to 3 minutes at about 200° to 400° F. In some embodiments, the release agent includes a catalyst. Curing can be accelerated or decelerated by increasing or decreasing catalyst concentration, respectively. Of course, as is well known, curing can also be effected at room temperature although this approach requires a relatively great amount of time.

The release coating compositions containing a cyclosiloxane-substituted polysiloxane can be applied to any suitable surface. Examples of such substrates include: films made of resins, such as polyethylene, polypropylene, polybutene, polybutadiene, vinyl chloride, polyethylene terephthalate, polyethylene naphthalate, polybutylene terephthalate, polyimide, polyether imide, polyether ketone, polyether ether ketone, an ethylene/vinyl acetate copolymer, an ethylene/(meth)acrylic acid copolymer, polycarbonate, polymethyl methacrylate, triacetyl cellulose and polynorbornene; papers, such as wood free paper, lint-free paper, glassine paper, clay coated paper, resin coated paper, laminated paper (polyethylene laminated paper, polypropylene laminated paper); nonwoven fabrics; metals and metal foils. The thickness of the substrate varies depending, e.g., upon the purpose and the type of the substrate. For example, when a resin film is used as the substrate, the thickness is in the range of usually about 5 to 300 μm, or can vary from about 20 to 200 μm, and when a paper substrate is used, the thickness can be in the range of usually about 20 to 450 g/m², such as from about 40 to 220 g/m². The release layer can be formed by applying the release agent composition on the substrate through a publicly known method such as gravure coating, roll coating, blade coating, knife coating, bar coating or spray coating, and then drying the composition. The thickness of the release layer is in the range of usually 0.01 to 15 μm or 0.05 to 10 μm.

The release coating compositions containing a cyclosiloxane-substituted polysiloxane can be applied to a wide variety of surfaces to take advantage of their release properties, such as for use as a mold release agent. For example, they can be used as mold release agents on bakery pans and candy trays. Similarly, they can be used on paper, plastics and metal foils to provide release coatings. They can also be used to coat multiwall bags and cartons that will contain rubber and to coat cartons that will contain candy, baked goods and other sticky products. They are also useful to coat backing sheets for pressure sensitive tapes, labels, tags, decals, self-bonding wallpaper, decorative plastics and asphalt impregnated pipe wrapping. Thus, in general, they can be used to coat any type of material such as cellulosic non-woven materials, such as papers (e.g., bleach sulfate, clay coated kraft, glassine, parchment and tissue paper) and plastics such as nylon, polyacrylonitrile, polyesters, styrene, vinyl plastics, polyurethanes and other organic resin materials. Moreover, they are also applicable for use as release agents for inorganic materials such as ceramics or metals such as aluminum, magnesium, copper, steel or zinc.

In some embodiments, the release coating composition is used as a mold release agent. The release agent functions by reducing the adherence of the molded product from the mold or form. The release coating compositions provided herein can include cyclosiloxane-substituted polysiloxanes that exhibit low surface tensions, which promotes the easy distribution of a thin film over all parts of the mold or form. The polysiloxane is heat resistant, has a long life and has a low adherence to organic materials generally used as molds or forms, facilitating the easy release of the molded article from the mold or form. The release coating compositions provided herein also are useful in shell mold release and die-casting applications.

6. Personal Care and Cosmetic Compositions

There are a large number of personal care products available, most of which are in the form of solutions, creams, ointments, lotions, gels or emulsions. There are a variety of uses for these personal care products including, e.g., skin care, bath and body care, deodorants, hand and foot care, facial care, hair care, shaving products, dental care, toiletry and personal lubrication. The ingredients in the formulated products in general serve as emollients, humectants, moisturizers, emulsifiers, lubricants, antimicrobials, cosmetics, fragrances and rheology modifiers. Some of the products are solvent-based and others are water-based. Some compositions are solutions, while some are emulsions, both oil-in-water and water-in-oil, including (for example) lotions and creams. An extensive discussion of personal care and cosmetic vehicles is found in *Handbook of Cosmetic Science and Technology* ($2^{nd}$ edition, edited by M Paye, A. O. Barel and H. I. Maibach (2005), pages 99-123).

Personal care compositions or products are generally in the form of creams, solutions, emulsions, foams, gels, lotions, ointments, solids, powders, semi-solids or combinations thereof. The compositions, thus, can be made into a wide variety of product types. These include, but are not limited to, solutions, lotions, emulsions, creams, gels, sticks, sprays, ointments, pastes, foams, mousses, shampoos, conditioners and cosmetics. Products employing these compositions include, but are not limited to, skin care products, cosmetics, deodorants, antiperspirants, insect repellants, anesthetics, shampoos, hair conditioners, skin conditioners, sun care products, shower gels, soaps, hair styling gels, hair anti-dandruff compositions, hair growth promoter compositions, hair colorant compositions, hair bleaching agent compositions, hair anti-frizzing agent compositions, hair shining compositions, hair relaxer compositions, skin sanitizers, shaving product compositions, lubricating gel compositions, personal lubricant compositions, spermicidal gel compositions, and skin cleansing compositions.

The personal care industry thrives on being able to deliver multiple performance products based on mixtures of several components, with each having performance characteristics important to or desirable in the final formulation. One desirable characteristic is the ability to provide a silky initial feel (e.g., see U.S. Pat. Nos. 5,760,116, 5,493,041 and 4,987,169). The cyclosiloxane-substituted polysiloxanes provided herein provide smooth silky feel on dry-down in personal care and cosmetic formulations. In personal care applications, such as in hair care and skin care, there is a desire to deposit a coating onto the substrate, such as the hair or the skin, that reduces the energy needed to move an object through or across the substrate. For example, compositions that include the cyclosiloxane-substituted polysiloxane can be formulated that reduce the energy to move a comb through hair in the wet or dry state or that deliver a silky, soft feel to skin. The compositions containing the cyclosiloxane-substituted polysiloxane can also act to improve the luster and moisture retention of hair and skin, as well as their manageability and feel. The discovery of the improved deposition of silicone resins from cleansing formulations such as shampoos, using cationic polymer-anionic surfactant complexes, has lead to the development of this approach to deliver hair conditioning, skin, and fabric conditioning. However, the tendency for cationic polymer buildup on the hair after repeated washing with silicone shampoos, and the desire for clear conditioning formulations has left a strong market need for alternative approaches to achieve silicone conditioning on hair, skin, and fabric substrates without cationic polymers. The compositions containing the cyclosiloxane-substituted polysiloxane do not require a cationic polymer for deposition of the cyclosiloxane-substituted polysiloxane to the substrate. Personal care compositions that include one or more of the cyclosiloxane-substituted polysiloxanes provided herein provide for improved overall performance, such as improved hair volume, manageability, hair repair, or color retention, skin moisturizing and moisture retention, fragrance retention, sunscreen longevity on hair, skin, and fabrics, and antimicrobial performance.

The cyclosiloxane-substituted polysiloxanes can be used in any concentration to obtain the desired handful or desired effect. In some embodiments, the cyclosiloxane-substituted polysiloxane is used at a concentration between about 50% to 100% by weight of the composition. In some embodiments, the cyclosiloxane-substituted polysiloxane is present at from about 60% to 99% by weight of the composition. In some embodiments, the cyclosiloxane-substituted polysiloxane is present at from about 25% to 75% by weight of the composition. In some embodiments, the cyclosiloxane-substituted polysiloxane is present at from about 0.1% to 50% by weight of the composition. In some embodiments, the cyclosiloxane-substituted polysiloxane is present at from about 0.5% to 45% by weight of the composition. In some embodiments, the cyclosiloxane-substituted polysiloxane is present at from about 1% to 40% by weight of the composition. In some embodiments, the cyclosiloxane-substituted polysiloxane is present at from about 2% to 35% by weight of the composition. In some embodiments, the cyclosiloxane-substituted polysiloxane is present at from about 3% to 30% by weight of the composition. In some embodiments, the cyclosiloxane-substituted polysiloxane is present at a concentration of 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5, 99.9 or 100 percent of the weight of the composition.

In some embodiments, the personal care compositions include an emollient compound. Exemplary emollient compounds include any fluid that provides emollient properties, that is, that when applied to skin, tend to remain on the surface of the skin or in the stratum corneum layer of the skin to act as lubricants, reduce flaking and to improve the appearance of the skin. Emollient compounds are generically known and include, for example, hydrocarbons, e.g., isododecane, isohexadecane and hydrogenated polyisobutene, organic waxes, such as for example, jojoba, silicone fluids, such as, for example, cyclopentasiloxane, dimethicone and bis-phenylpropyl dimethicone, esters, such as, for example, octyldodecyl neopentanoate and oleyl oleate, as well as fatty acids and alcohols, such as for example, oleyl alcohol and isomyristyl alcohol.

In some embodiments, the personal care compositions are provided as an emulsion, including aqueous and non-aqueous emulsions. Emulsion formulations comprising a silicone phase are described in U.S. Pat. No. 6,060,546. Once the desired form of the composition is attained, whether as a cyclosiloxane-substituted polysiloxane only phase, an anhydrous mixture including the cyclosiloxane-substituted polysiloxane phase, a hydrous mixture including the cyclosiloxane-substituted polysiloxane phase, a water-in-oil emulsion, an oil-in-water emulsion, or either of the two non-aqueous emulsions or variations thereon, the resulting material is usually a medium to high viscosity cream with good feel characteristics. The formulation can be blended into formulations for hair care, skin care, antiperspirants, sunscreens, cosmetics, color cosmetics, insect repellents, vitamin and hormone carriers and fragrance carriers.

Exemplary personal care applications where the cyclosiloxane-substituted polysiloxanes provided herein and the compositions containing the cyclosiloxane-substituted polysiloxane include, but are not limited to, deodorants, antiperspirants, antiperspirant/deodorants, shaving products, skin lotions, moisturizers, toners, bath products, cleansing products, hair care products such as shampoos, conditioners, mousses, styling gels, hair sprays, hair dyes, hair color products, hair bleaches, waving products, hair straighteners, manicure products such as nail polish, nail polish remover, nails creams and lotions, cuticle softeners, protective creams such as sunscreen, insect repellent and anti-aging products, color cosmetics such as lipsticks, foundations, face powders, eye liners, eye shadows, blushes, makeup, mascaras and other personal care formulations where silicone components have been conventionally added, as well as drug delivery systems for topical application of medicinal compositions that are to be applied to the skin.

In some embodiments, the personal care compositions that include the cyclosiloxane-substituted polysiloxanes provided herein further include one or more personal care ingredients commonly used in personal care formulation. Exemplary personal care ingredients include, for example, emollients, moisturizers, humectants, pigments, including pearlescent pigments such as, for example, bismuth oxychloride and titanium dioxide coated mica, colorants, fragrances, biocides, preservatives, antioxidants, anti-microbial agents, anti-fungal agents, antiperspirant agents, exfoliants, hormones, enzymes, medicinal compounds, vitamins, salts, electrolytes, alcohols, polyols, absorbing agents for ultraviolet radiation, botanical extracts, surfactants, silicone oils, organic oils, waxes, film formers, thickening agents such as, for example, xanthan gum, carboxymethyl cellulose, polyacrylamide, hyaluronic acid, fumed silica or hydrated silica, particulate fillers, such as for example, talc, kaolin, starch, modified starch, mica, nylon, clays, such as, for example, bentonite and organo-modified clays.

The cyclosiloxane-substituted polysiloxanes provided herein apply easily and leave a dry feel on the skin. The cyclosiloxane-substituted polysiloxanes provided herein also are lubricious and can be used to improve the properties of skin creams, skin care lotions, moisturizers, facial treatments such as acne or wrinkle removers, personal and facial cleansers, bath oils, perfumes, colognes, sachets, sunscreens, preshave and after-shave lotions, liquid soaps, shaving soaps, and shaving lathers. The cyclosiloxane-substituted polysiloxanes provided herein can also be used in hair shampoos, hair conditioners, hair sprays, mousses, permanents, depilatories, and cuticle coats, to enhance gloss and drying time, and provide conditioning benefits.

In cosmetic applications, the cyclosiloxane-substituted polysiloxanes provided herein function as dispersing, leveling and spreading agents for pigments in make-ups, color cosmetics, foundations, blushes, lipsticks, lip balms, eyeliners, mascaras, oil removers, color cosmetic removers, and powders. The cyclosiloxane-substituted polysiloxanes provided herein are useful as controlled delivery systems for oil and water soluble substances such as vitamins. When incorporated into sticks, gels, lotions, aerosols, and roll-ons, the compositions including the cyclosiloxane-substituted polysiloxanes provided herein impart a silky-smooth handfeel.

The personal care compositions are made by combining, in a manner known in the art, such as, for example, by mixing, one or more of the above components with the cyclosiloxane-substituted polysiloxanes provided herein. The personal care compositions can be in the form of a single phase or in the form of an emulsion, including oil-in-water, water-in-oil and anhydrous emulsions where the silicone phase may be either the discontinuous phase or the continuous phase, as well as multiple emulsions, such as, for example, oil-in water-in-oil emulsions and water-in-oil-in water-emulsions.

When formulated as an emulsion, the compositions including one or more of the cyclosiloxane-substituted polysiloxanes provided herein can further include one or more emulsifying agents. Exemplary emulsifying agents useful in preparing such emulsions include, for example, silicone-containing emulsifying agents, emulsifying agents derived from sorbitan compounds and emulsifying agents derived from fatty alcohols, including fatty acid esters, sorbitan sesquioleate, sorbitan oleate, sorbitan isostearate, polyglyceryl-3 oleate, alkoxylated alcohols such as laureth-4, laureth-7, deceth-12, steareth-10, hydroxylated or alkoxylated derivatives of silicone compounds such as dimethicone copolyol, cetyl dimethicone copolyol, and lauryl methicone copolyol, glyceryl esters such as polyglyceryl-4-isostearyl and mixtures thereof.

The emulsions can be prepared using any method known in the art. For example, the cyclosiloxane-substituted polysiloxanes provided herein can be in the disperse phase or the continuous phase. In one embodiment, the emulsion is prepared by adding the components of the disperse phase to the components of the continuous phase while subjecting the mixture of components to low shear mixing and the mixture so formed is then subjected to high shear mixing. In one embodiment, a dispersion of cyclosiloxane-substituted polysiloxanes in a first liquid is slowly added to a second liquid while subjecting the combined phases to low shear mixing, such as, for example, in a mixing tank equipped with a propeller-type stirrer, and then the mixture so formed is subjected to high shear mixing, for example, in a Sonolator® apparatus, a Gaulin® homogenizer or other high shear mixer, such as an Eppenbach Mixer, to form the silicone emulsion. In one embodiment, an emulsifying agent is combined with the first liquid prior to adding the components of the first phase to the components of the second phase.

The emulsions containing one or more of the cyclosiloxane-substituted polysiloxanes provided herein can be used in any personal care application. In one embodiment, an antiperspirant composition including the cyclosiloxane-substituted polysiloxanes provided herein and one or more active antiperspirant agents is provided. Exemplary antiperspirant agents include, for example, the Category I active antiperspirant ingredients listed in the U.S. Food and Drug Administration's Oct. 10, 1993 Monograph on antiperspirant drug products for over-the-counter human use, such as, for example, aluminum halides, aluminum hydroxyhalides, including, aluminum chlorohydrate, and complexes or mixtures thereof with zirconyl oxyhalides and zirconyl hydroxyhalides, such as, e.g., aluminum-zirconium chlorohydrate and aluminum zirconium glycine complexes.

In another embodiment, a skin care composition including a cyclosiloxane-substituted polysiloxanes provided herein, and a vehicle, such as, for example, a silicone fluid or an organic oil, is provided. The skin care composition can, optionally, further include emollients, such as, for example, triglyceride esters, wax esters, alkyl or alkenyl esters of fatty acids or polyhydric alcohol esters and one or more the known components conventionally used in skin care compositions, such as, for example, pigments, vitamins, such as Vitamin A, Vitamin C and Vitamin E, sunscreen or sunblock compounds, such as, for example, titanium dioxide, zinc oxide, oxybenzone, octylmethoxy cinnamate, butylmethoxy dibenzoylm ethane, p-amino-benzoic acid and octyl dimethyl-p-aminobenzoic acid.

In another embodiment, a color cosmetic composition, such as, for example, a lipstick, a makeup or a mascara composition including the cyclosiloxane-substituted polysiloxanes provided herein, and a coloring agent, such as a pigment, a water soluble dye or a liposoluble dye is provided.

Personal care compositions including the cyclosiloxane-substituted polysiloxanes provided herein can also include any additive or ingredient used in personal care compositions, chosen, for example, from among dispersants such as poly(2-hydroxy-stearic acid), antioxidants, essential oils, preserving agents, fragrances, waxes, liposoluble polymers, fillers, neutralizing agents, cosmetic and dermatological active agents such as, for example, emollients, moisturizers, vitamins, essential fatty acids, sunscreens, colorants and mixtures thereof. These additives can be present in the composition in a proportion of from 0% to 20% (such as from 0.01% to 20%) relative to the total weight of the composition and further such as from 0.01% to 10% (if present).

The personal care compositions including the cyclosiloxane-substituted polysiloxanes provided herein also can contain, as an additive, an aqueous phase containing water that is optionally thickened or gelled with an aqueous-phase thickener or gelling agent and/or containing ingredients soluble in water. The water can represent from 0.01 to 50%, for example from 0.5 to 30% relative to the total weight of the composition. However, anhydrous compositions also are contemplated. Examples of such anhydrous compositions include creams and pastes.

In some embodiments, the personal care compositions can include a wax. Exemplary waxes include, for example, waxes of natural origin, for instance beeswax, carnauba wax, candelilla wax, sugar cane wax, paraffin wax, lignite wax, microcrystalline waxes, and lanolin wax, and hydrogenated oils such as hydrogenated jojoba oil macadamia nut oil as well as waxes of synthetic origin, for instance, polyethylene waxes derived from the polymerization of ethylene, waxes obtained by Fischer-Tropsch synthesis, fatty acid esters and glycerides that are solid at 40° C., or that are solid at above 55° C., silicone waxes such as alkyl- and alkoxy-poly(di)methyl-siloxanes and/or poly(di)methyl-siloxane esters that are solid at 40° C., or that are solid at above 55° C. Polyethylene and silicone waxes having a number average molecular weight of approximately 400-1500 can be selected, but higher and lower molecular weights can be used.

The personal care compositions including the cyclosiloxane-substituted polysiloxanes provided herein can be in any form including the form of a tinted or non-tinted dermatological composition or a care composition for keratin materials, such as the skin and/or the lips, in the form of an anti-sun composition or in the form of a body hygiene composition, such as in the form of a deodorant product or make-up-removing product, which includes compositions in stick form. It can be used as a care base for the skin or the lips (lip balms, for protecting the lips against cold and/or sunlight and/or the wind), or care cream for the skin, the nails or the hair.

In some embodiments, the personal care composition can be in the form of a colored make-up product for the skin, such as a foundation, a blusher, a face powder, an eye shadow, a concealer product, an eyeliner, a make-up product for the body; a make-up product for the lips such as a lipstick, a make-up product for the nails, or a make-up product for the eyelashes, the eyebrows or the hair.

The personal care compositions including the cyclosiloxane-substituted polysiloxanes provided herein can include at least one coloring agent or colorant. The coloring agent can include lipophilic dyes, hydrophilic dyes, pigments and nacreous pigments (i.e., nacres) usually used in cosmetic or dermatological compositions, and mixtures thereof. When present, a coloring agent can be present in an amount of from 0.01% to 50% of the total weight of the composition, such as from 0.5% to 40% or from 5% to 30%, if it is present. In compositions in the form of a free or compacted powder, the amount of coloring agent in the form of solid particles that are insoluble in the medium (nacres and/or pigments) can be up to 90% of the total weight of the composition.

Exemplary liposoluble dyes include, for example, Sudan Red, D&C Red 17, D&C Green 6, β-carotene, Sudan Brown, D&C Yellow 11, D&C Violet 2, D&C Orange 5, quinoline yellow and annatto. Liposoluble dyes can represent from 0.1% to 20% of the weight of the composition, for example, from 0.1% to 10% (if present). Exemplary water-soluble dyes include, for example, red beet extract, Rhodamine B, tartrazine, azure blue and methylene blue, and can be present in an amount of up to 10% of the total weight of the composition.

The pigments, if present in the composition, can be white and/or colored, goniochromatic or not, mineral and/or organic, and coated or uncoated. Among the mineral pigments that can be included in the formulation are titanium dioxide, which optionally can be surface-treated, zirconium oxide, zinc oxide or cerium oxide, as well as iron oxide, chromium oxide, manganese violet, ultramarine blue, chromium hydrate and ferric blue. Among the organic pigments that can be included in the composition are carbon black, pigments of D & C type, and lakes based on cochineal carmine or on barium, strontium, calcium or aluminum. The pigments can represent from 0.1% to 50%, such as from 0.5% to 40% and further such as from 2% to 30% relative to the total weight of the composition, if they are present.

The personal care compositions also can include one or more nacreous pigments.

Exemplary nacreous pigments include white nacreous pigments, such as mica coated with titanium or with bismuth oxychloride, colored nacreous pigments, such as titanium mica with iron oxides, titanium mica with, in particular, ferric blue or chromium oxide, titanium mica with an organic pigment of the type mentioned above, as well as nacreous pigments based on bismuth oxychloride. The nacreous pigments can be present, for example, from 0.1% to 20% relative to the total weight of the composition, and further such as from 0.1% to 15%, if they are present.

The personal care compositions can be manufactured by adapting any of the known processes that are generally used in the cosmetics and/or dermatology industries. The personal care composition can be manufactured by a process that includes mixing the necessary ingredients, which optionally can be divided into phases. The mixture obtained can then be cast in a suitable mould such as a lipstick mould or directly into the packaging articles (such as a case or dish). Such processes are well known and are within the ordinary skill of the artisan of personal care compositions.

Personal Lubricants

Personal lubricants are another application of the cyclosiloxane-substituted polysiloxanes provided herein. Personal lubricants can be applied to the penis, vagina or other mucosal tissues manually or via a swab or applicator or in any other common way. Silicone-based lubricants exhibit several useful qualities that make them different from other personal lubricants, e.g., water-based lubricants. For example, silicone-based lubricants generally are not readily absorbed by the skin or mucous membranes so silicone-based lubricants can remain on the surface reducing friction and thus are perceived to have longer usefulness. The personal lubricant compositions comprising a cyclosiloxane-substituted polysiloxane provided herein are either oil-based or water-based and can be in the form of a liquid, a lotion, a cream, an emulsion or a gel. An example of an oil-based composition includes a cyclosiloxane-substituted polysiloxane provided herein and no added aqueous-based ingredients. The oil-based composition can include other non-aqueous ingredients, such as linear and cyclic silicone fluids, including cyclomethicone, trisiloxane, volatile dimethicones, polyalkylsiloxanes, polydialkylsiloxanes, methyl trimethicone, cyclopolysiloxanes, and mixtures thereof. Exemplary cyclopolysiloxanes include cycloalkylsiloxanes and cycloalkyalkoxysiloxanes, where the alkyl and alkoxy groups contain $C_1$-$C_{10}$ alkyl groups. Specific examples include octamethyl cyclotetrasiloxane (cyclomethicone tetramer), decamethyl cyclopentasiloxane (cyclomethicone pentamer), cyclomethicone hexamer, cyclopentasiloxane and methoxypropyl heptamethyl cyclotetrasiloxane.

In some embodiments, the oil-based personal lubricant composition containing one or more cyclosiloxane-substituted polysiloxanes provided herein also can include a linear or cyclic volatile silicone fluid and/or linear polydialkylsiloxanes having from about 3 to 9 silicone atoms with $C_1$-$C_8$ alkyl, particularly those with $C_1$-$C_3$ alkyl. Exemplary linear polydialkylsiloxanes include polydimethylsiloxane, trisiloxane and volatile dimethicone. The linear volatile silicone fluids generally have viscosities of 5 cS (centistokes) or less at 25° C., while the volatile cyclic materials generally have viscosities of 10 cS or less at 25° C. Volatile silicone fluids are described in Todd and Byers, "*Volatile Silicone Fluids for Cosmetics*," Cosmetics and Toiletries, Vol. 91, January, pages 27-32 (1976), the contents of which are incorporated herein by reference.

In some embodiments, the oil-based personal lubricant composition containing one or more cyclosiloxane-substituted polysiloxanes provided herein also can include a plant-derived oil. The plant-derived oil can include oil from soybeans, safflowers, grape seeds, olives, coconuts, macadamia nuts, jojoba, sesame seeds, pomegranate seeds, avocado, wheat germ, almonds and mixtures thereof. A particular combination of oils includes oil from soybeans, safflowers and grape seeds. When the oil-based personal lubricant composition contains a plant-derived oil, a tocopherol can be included in the composition. In some embodiments, the tocopherol can be Vitamin E, and can include an α-tocopherol, β-tocopherol, γ-tocopherol, δ-tocopherol, tocotrienol and esters and/or combinations thereof.

In some embodiments, the personal lubricant composition containing one or more cyclosiloxane-substituted polysiloxanes provided herein also include a thickening agent, a glycol, and optionally an alpha hydroxy acid (AHA) to adjust the pH of the composition. In some embodiments, the personal lubricant can include a homopolymer of 1,3-propane-diol, or a copolymer of 1,3-propane diol and ethylene glycol; hydroxypropylcellulose as a thickening agent; 1,3-propanediol and lactic acid.

For use as a genital lubricant, a small quantity (such as a teaspoon or several milliliters) of the composition is spread across one or more genital surfaces, such as surfaces inside the vagina or the surface of the penis in a manner that causes the personal lubricant composition to coat and remain in contact with the genital surfaces. It is also possible to make lubricated condoms coated with the personal lubricant composition that includes a cyclosiloxane-substitute polysiloxane provided herein. The personal lubricant compositions can be provided in the form of a liquid, a semi-solid or a solid. For example, the composition can be provided in the form of a lotion, a cream or a gel. The compositions can be formulated as viscous liquid-gels, pourable viscous gels or thick jellies.

Other additives commonly used in personal lubricants can be used. Examples of other lubricating agents that can be used include glycerol, 1,2,3-propanetriol, certain polyethylene glycols (PEG) such as PEG 200 or PEG 400 (the numbers indicate different molecular weight averages), polypropylene glycol, polyisobutene, polyoxyethylene, behenic acid, behenyl, sugar-alcohols such as sorbitol or xylitol, and polydimethylsiloxane.

Suitable thickening agents for use in genital lubricants include derivatives of cellulose, such as methyl cellulose, hydroxyethyl- or hydroxymethyl-cellulose). Other thickening agents that have been used in skin-contacting compounds, and that can be used in personal lubricant and genital lubricant compositions, include gum arabic, agar, alginate, carrageenan, gum tragacanth, xanthan gum, collagen, carboxypolymethylene, glyceryl monostearate, polyvinylpyrrolidone and polyacrylamide.

Other components, including preservatives (such as DMDM hydantoin, chlorhexidine gluconate and sorbates), anti-crystallization agents (such as glucono-delta-lactate), fragrances, sweeteners, odorants, coloring agents, alkaline or acidic or buffering agents to maintain the proper pH (such as EDTA), soothing and anti-swelling agents (such as lanolin, aloe vera extract or hydrocortisone), anti-viral agents (such as zinc salts), hormones (such as estrogen) or spermicide (such as nonoxynol-9) can be included in the lubricant compositions.

Transdermal Delivery Compositions/Devices

Also provided are transdermal delivery compositions and/or devices that include a cyclosiloxane-substituted polysiloxane provided herein. Patch-type devices are well known for the transdermal administration of pharmaceutical agents as well as cosmetics, emollients and other skin treating agents. These patch-type devices are used for the administration of numerous classes of drugs or skin treating products. Other flexible, finite systems known in the art include films, plasters, dressings, and bandages, as well as multilayer delivery systems in which the drug/prodrug, active agent or pharmaceutical is solubilized or contained in one or more separate layers and reservoir-type delivery systems in which the parent drug/prodrug or active pharmaceutical is solubilized or contained in a reservoir or depot separate from the adhesive which attaches directly to the skin or mucosa.

The cyclosiloxane-substituted polysiloxane provided herein can be included in the transdermal delivery compositions to modulate the solubility of the drug or pharmaceutical or to modify the adhesiveness of the device to the skin. For example, in some embodiments, the cyclosiloxane-substituted polysiloxane provided herein are included to modify the adhesiveness of the device by interacting with the adhesive and the skin. Any suitable pressure sensitive adhesive can be included in the device. These include acrylic-based pressure-sensitive adhesives and silicone-based pressure-sensitive adhesives, such as described in U.S. Pat. Nos. 4,591,622, 4,584,355, 4,585,836, 4,655,767, 5,474,783 and 5,656,386. The amount of the cyclosiloxane-substituted polysiloxane present in the composition or device can range from 2 to 99 wt %. In some embodiments, the cyclosiloxane-substituted polysiloxane is present in an amount of from about 30% to 90% by weight of the composition. In some embodiments, the cyclosiloxane-substituted polysiloxane is present in an amount of from about 40% to 70% by weight of the composition. In some embodiments, the cyclosiloxane-substituted polysiloxane is present in an amount of from about 5% to 30% by weight of the composition.

The pressure-sensitive adhesives can be blended with the cyclosiloxane-substituted polysiloxane to modulate the solubility of the drug. For example, the composition can include a multiple polymer adhesive system that includes a blend of an acrylic-based polymer, a silicone-based polymer and a cyclosiloxane-substituted polysiloxane. The ratio of the acrylic-based polymer to the silicone-based polymer can be varied from about 4:96 to about 96:4.

The transdermal drug delivery system can also contain agents known to accelerate the delivery of the pharmaceutical agent through the skin. These agents have been referred to as skin-penetration enhancers, accelerants, adjuvants, and sorption promoters, and are collectively referred to herein as "enhancers" and are described in U.S. Pat. No. 6,221,383. They can include polyhydric alcohols such as dipropylene glycol, propylene glycol, and polyethylene glycol, which enhance drug solubility; oils, such as olive oil, sunflower oil, squalene, and lanolin; fatty ethers such as cetyl ether and oleyl ether; fatty acid esters such as isopropyl myristate, which enhance drug diffusibility; urea and urea derivatives such as allantoin, which affect the ability of keratin to retain moisture; polar solvents such as dimethylsulfoxide, dimethyldecylphosphoxide, methyloctylsulfoxide, dimethyllaurylamide, dimethylacetonide, dodecylpyrrolidone, isosorbitol, decylmethylsulfoxide and dimethyl-formamide, which affect keratin permeability; salicylic acid, which softens the keratin; amino acids, which are penetration assistants; benzyl nicotinate, which is a hair follicle opener; and higher molecular weight aliphatic surfactants, such as lauryl sulfate salts, which change the surface state of the skin and drugs administered. Other agents include oleic and linoleic acids, ascorbic acid, panthenol, butylated hydroxytoluene, tocopherol, tocopheryl acetate, tocopheryl linoleate, propyl oleate, and isopropyl palmitate and combinations thereof. In some embodiments, combinations of polyhydric alcohols such as glycerine, dipropylene glycol, butylene glycol, propylene glycol and one or more of oleyl alcohol and oleic acid and included in the transdermal delivery device or formulation.

In some embodiments, the transdermal delivery device or formulation can include a plasticizer or tackifying agent. Exemplary plasticizers or tackifying agents include aliphatic hydrocarbons; mixed aliphatic and aromatic hydrocarbons; aromatic hydrocarbons; silicone fluids; substituted aromatic hydrocarbons; hydrogenated esters; polyterpenes and hydrogenated wood rosins.

In some embodiments, the transdermal delivery device or formulation can include a solvent. The solvent can help to solvate the pharmaceutical, particularly if its solubility is low in the polymer system of the transdermal delivery device or composition. Exemplary solvents include alcohols, butyl benzyl phthalate, propylene glycol, dipropylene glycol, triacetin, saturated and unsaturated fatty acids, mineral oil, silicone fluid, tocopherol and lecithin and combinations thereof.

The transdermal delivery device or composition also can include as additives polyvinylpyrrolidone (PVP), including soluble PVP, vinyl acetate vinylpyrrolidone and thickeners, including clays such as aluminum silicate clay, kaolinite, montmorillonite, attapulgite, illite, bentonite and halloysite.

A transdermal delivery device, or individual dosage unit of the transdermal delivery composition, can be produced in any manner known to those of skill in the art. After the dermal composition is formed, it can be brought into contact with a backing layer in any manner known to those of skill in the art. Such techniques include calender coating, hot melt coating and solution coating. Backing materials are well known in the art and can comprise plastic films of polyethylene, vinyl acetate resins, ethylene/vinyl acetate copolymers, polyvinyl chloride, polyurethane, and the like, metal foils, non-woven fabric, cloth and commercially available laminates. The backing material generally has a thickness in the range of 2 to 1000 micrometers and the dermal composition is generally disposed on backing material in a thickness ranging from about 12 to 250 mm thick.

Suitable release liners are also well known in the art and include the commercially available products of 3M, such as 1022 Scotch Pak®. The configuration of the transdermal delivery system can be in any shape or size as is necessary or desirable. For example, a single dosage unit can have a surface area in the range of 1 to 200 $cm^2$.

7. Household Care Compositions

Compositions including the cyclosiloxane-substituted polysiloxanes provided herein for household care also are contemplated. Household care products include items or compositions used by an individual to clean and/or deodorize a house or items within or around a house. Some exemplary household care products and applications include fabric care applications, such as laundry detergents and softeners, fabric sizing agents, dish and hard surface detergents, hard surface sanitizing agents, such as all purpose kitchen cleaner and disinfectants, toilet, tub and tile cleaning and disinfectant preparations, polishing compositions, waxes and polishing compositions for treating wood, furniture or automobiles or boats, pesticide preparations, static control, air deodorants/fresheners, and rug and upholstery shampoos, cleaners and deodorizers. In household care applications, there is a desire to deposit a coating onto the substrate that reduces the energy needed to move an object across the surface of the substrate, or to deliver a silky, soft feel to fabric, or to reduce static, or to increase fabric abrasion resistance and colorfastness, and/or to impart a luster or shine to the surface of the treated substrate.

The cyclosiloxane-substituted polysiloxanes provided herein can be used, e.g., as a nonaqueous cleaning fluid because they are capable of at least partially dissolving sebum and demonstrate suitable sebum-dissolving properties. The cyclosiloxane-substituted polysiloxanes provided herein also provide superior fabric care or garment care such as by improving garment appearance or tactile characteristics, including fabric feel and/or fabric softness; reduction, removal and/or prevention of creases or wrinkles in garments; improved ease of ironing; garment shape retention and/or shape recovery; and fabric elasticity. The superior fabric care or garment benefits can be achieved when the cyclosiloxane-substituted polysiloxanes provided herein are used in steps of the fabric laundering process, such as pre-treatment before washing in an automatic washing machine, through-the-wash benefits, through the rinse benefits and post-treatment benefits. The cyclosiloxane-substituted polysiloxanes provided herein can be incorporated in fabric care compositions, which are typically in a liquid form and may include a carrier, such as water. The fabric care compositions can be encapsulated and/or provided as unitized dose compositions, including compositions which form two or more separate, but combinably dispensable, portions. In some embodiments, fabric care compositions include the cyclosiloxane-substituted polysiloxanes provided herein in the form of emulsions or microemulsions and include other laundry adjuncts in a suitable carrier. These fabric care compositions can have a viscosity from about 1 to about 2000 mPa·s at 25° C. and a shear rate of 20 sec$^{-1}$, or from about 200 to about 800 mPa·s at 25° C. and a shear rate of 20 sec$^{-1}$. The viscosity can be measured using conventional methods. For example, viscosity can be measured using a TA Instruments AR1000 cone and plate viscometer, manufactured by TA Instruments (New Castle, Del.), using manufacturer-suggested operating conditions at about 25° C. The fabric care compositions also can include emulsifiers to assist and/or stabilize the microemulsification in the selected carrier. Non-limiting examples of suitable carriers include those comprising water and optionally organic solvents. Non-limiting examples of suitable organic solvents include alcohols. In some embodiments, useful alcohols include propane diol, diethyleneglycol, hexyleneglycol, ethanol and combinations thereof.

In some embodiments, the fabric care compositions are liquid detergent compositions that include one or more laundry adjuncts. Non-limiting examples of laundry adjunct materials include perfume, fabric softener, enzymes, bleach, bleach activator, coupling agents, and combinations thereof. The laundry adjuncts can be present in the liquid detergent composition in an amount of from about 0.01%, from about 0.1%, or from about 1%, to about 20%, to about 15%, to about 10%, to about 7%, or to about 5% by weight of the fabric care compositions. The cyclosiloxane-substituted polysiloxanes provided herein can impart lubricity and smoothness to the fibers of a fabric, thereby allowing them to slip or glide easily past one another. The fiber slippage or gliding can enhance the process of wrinkle release and/or wrinkle control in the fabric. The substituted polysiloxanes provided herein can provide fabric wear reduction; fabric pill prevention and/or reduction; fabric color maintenance and/or fading reduction. The cyclosiloxane-substituted polysiloxanes provided herein also can provide a variety of liquid detergent formulation benefits including, but not limited to, surface tension control, sudsing control and combinations thereof.

The cyclosiloxane-substituted polysiloxanes can be used in any concentration to obtain the desired handfeel, luster, shine or desired effect. In some embodiments, the cyclosiloxane-substituted polysiloxane is used at a concentration between about 50% to 100% by weight of the composition. In some embodiments, the cyclosiloxane-substituted polysiloxane is present at from about 60% to 99% by weight of the composition. In some embodiments, the cyclosiloxane-substituted polysiloxane is present at from about 25% to 75% by weight of the composition. In some embodiments, the cyclosiloxane-substituted polysiloxane is present at from about 0.1% to 50% by weight of the composition. In some embodiments, the cyclosiloxane-substituted polysiloxane is present at from about 0.5% to 45% by weight of the composition. In some embodiments, the cyclosiloxane-substituted polysiloxane is present at from about 1% to 40% by weight of the composition. In some embodiments, the cyclosiloxane-substituted polysiloxane is present at from about 2% to 35% by weight of the composition. In some embodiments, the cyclosiloxane-substituted polysiloxane is present at from about 3% to 30% by weight of the composition. In some embodiments, the cyclosiloxane-substituted polysiloxane is present at a concentration of 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5, 99.9 or 100 percent of the weight of the composition.

In another embodiment, the cyclosiloxane-substituted polysiloxane can be used in conjunction with fragrances and/or fragrant materials. These fragrant materials may be fragrant compounds, encapsulated fragrant compounds, fragrance chemicals or fragrance releasing compounds, such as those described in U.S. Pat. Nos. 6,046,156; 6,054,547; 6,075,111; 6,077,923; 6,083,901; and 6,153,578. The cyclosiloxane-substituted polysiloxanes provided herein are useful as a carrier for a fragrance component in a wide variety of different types of compositions including, e.g., cosmetic compositions, fragrance compositions for human or animal use, air freshener compositions, aromatherapy compositions, and laundry and cleaning compositions. Such fragrance compositions can include a variety of other optional ingredients in addition to fragrance and carrier that can render the fragrance compositions more acceptable or provide them with additional benefits. Such conventional optional ingredients are well-known to those skilled in the art and will vary greatly depending upon the field in which the compositions are to be used.

Any fragrance compound or fragrance chemical can be used and the selection of the fragrance compound or fragrance chemical is not critical although the aesthetic consideration of any fragrance composition is critical to commercial success of the fragrance composition. Fragrance chemicals are well known in the art. A list of suitable fragrances is provided in U.S. Pat. No. 4,534,891, the contents of which are incorporated by reference as if set forth in their entirety. Another source of suitable fragrances is found in *Poucher's Perfumes, Cosmetics and Soaps: Volume 2 The Production, Manufacture and Application of Perfumes* (Poucher's Perfumes, Cosmetics, and Soaps, W. A. Poucher (1992). Exemplary fragrances include, e.g., acacia, bergamot, cassis, cedarwood, cinnamon, clove, freshly-cut hay, gardenia, geranium, ginger, grapefruit, hawthorn, heliotrope, honeysuckle, hyacinth, jasmine, lavender, lemon, lilac, lily, lime, magnolia, melon, mimosa, musk, narcissus, orange, orange blossom, orchids, plumeria, rose, sandalwood, sweet pea, tuberose, vanilla, verbena and violet.

F. Articles Of Manufacture

The cyclosiloxane-substituted polysiloxanes and compositions provided herein can be packaged as articles of manufacture including packaging material, within the packaging material a composition provided herein, and a label. The articles of manufacture provided herein include packaging materials. Packaging materials for use in packaging pharmaceutical products are well known to those of skill in the art. See, e.g., U.S. Pat. Nos. 5,323,907 and 5,052,558. Examples of packaging materials include, e.g., bottles, tubes, pumps, bags, vials, containers, and any packaging material suitable for a selected formulation and intended mode of application. A wide array of formulations of the cyclosiloxane-substituted polysiloxanes and compositions that include the cyclosiloxane-substituted polysiloxanes provided herein are contemplated as are a variety of applications for which the cyclosiloxane-substituted polysiloxanes provided herein can be used.

G. EXAMPLES

The following examples, including experiments and results achieved, are provided for illustrative purposes only and are not to be construed as limiting the claimed subject matter.

Example 1

7-8% [2-(heptamethylcyclotetrasiloxanyl)ethyl]-methylsiloxane dimethylsiloxane copolymer

The copolymer [2-(heptamethylcyclotetrasiloxanyl) ethyl]-methylsiloxane dimethyl-siloxane (7-8%) was prepared using standard substitution/condensation reactions and commercially available starting materials as shown in Schemes V through VII.

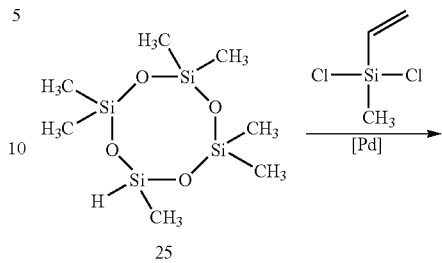

Scheme VI

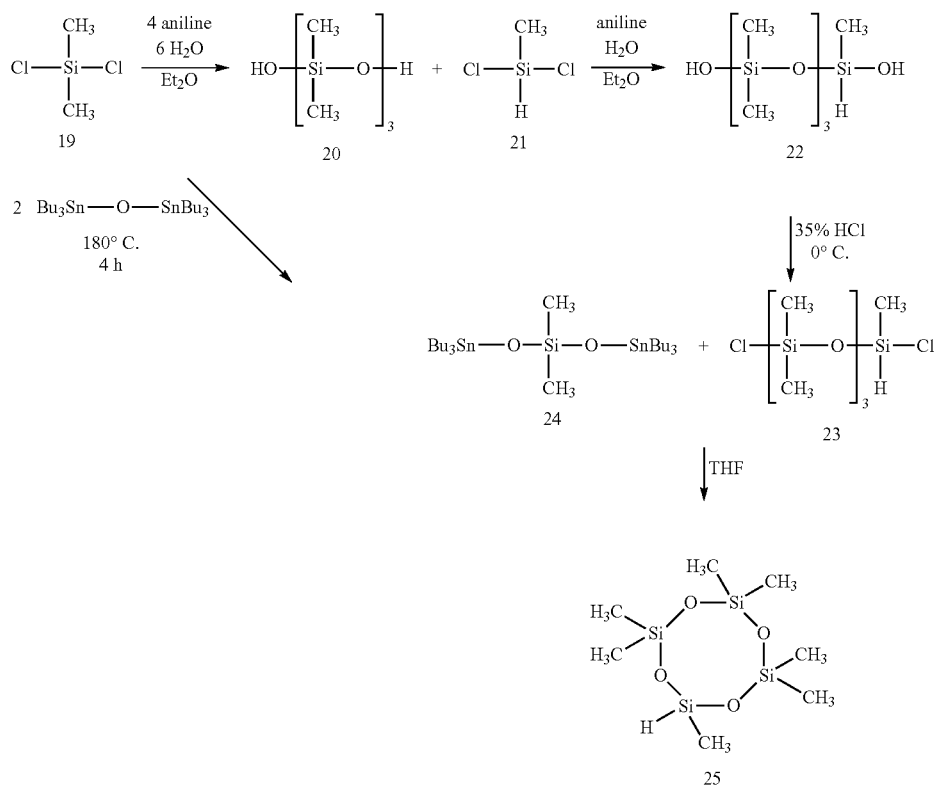

Scheme V

To a solution of dichlorodimethylsilane (19) in ether was added 6 equivalents of water and 4 equivalents of aniline to yield trisiloxane 20. Dichlorodimethylsilane (21), in the presence of aniline and water (20:21:aniline:H$_2$O=1:0.5:1:1), was then added, resulting in the formation of tetrasiloxane 22. 35% aqueous HCl was added to a solution of 22 in hexanes over a period of 1 hour at 0° C. to yield dichlorotetrasiloxane 23.

Hexabutyldistannoxane (2 equiv.) was slowly added dropwise with stirring to dimethyldichlorosilane (19), followed by heating to 180° C. for 4 hours and vacuum distillation to give bis(tri-n-butylstannyloxy)dimethylsilane 24. Equimolar amounts of 23 and 24 in THF were stirred at room temperature for 4 hours before cyclosiloxane 25 was isolated by distillation.

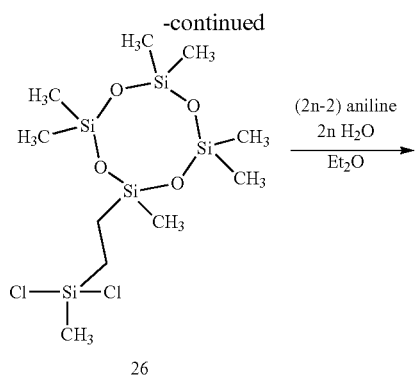

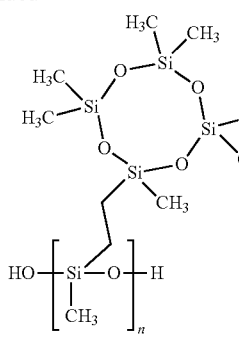

27

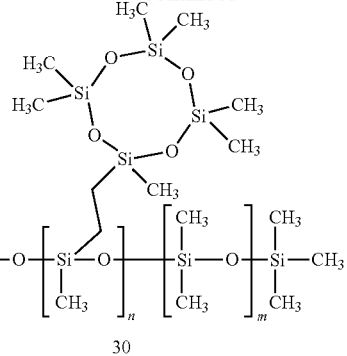

30

Cyclosiloxane 25 was reacted with methylvinyldichlorosilane in the presence of 0.1 mol % of palladium catalyst [PdCl($\eta^3$-C$_3$H$_5$)]$_2$ to yield 26, which was further reacted with aniline and water in ether to form condensation product 27.

Scheme VII

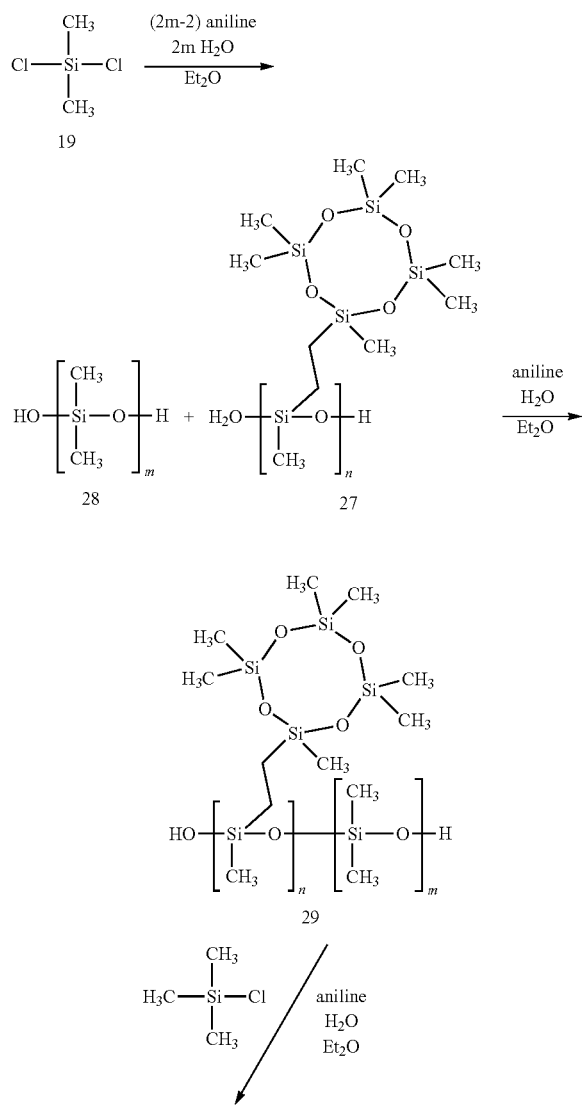

To a solution of dichlorodimethylsilane (19) in ether was added water and aniline to yield polysiloxane 28, followed by the addition of 27, which resulted in the formation of polycyclosiloxane 29. Polycyclosiloxane 29 was then end-capped by the addition of trimethylchlorosilane, in the presence of aniline and water in ether to yield copolymer 30, 2-(heptamethylcyclotetrasiloxanyl)ethyl)-methylsiloxane dimethylsiloxane (7-8%).

7-8% [2-(heptamethylcyclotetrasiloxanyl)ethyl]-methylsiloxane dimethylsiloxane copolymer was recovered as a colorless oily fluid with a molecular weight of ~36,000 Da.

Example 2

Hydraulic Fluid

The cyclosiloxane-substituted polysiloxanes described herein have utility as general purpose hydraulic fluids. An exemplary hydraulic fluid was prepared using [2-(hepta-methylcyclotetrasiloxanyl)ethyl]-methylsiloxane dimethylsiloxane copolymer of Example 1, in the following composition:

| Component | weight % |
| --- | --- |
| [2-(heptamethylcyclotetrasiloxanyl)ethyl]-methylsiloxane dimethylsiloxane copolymer of Example 1 | 99.64 |
| 2,4,6-tri-tert-butylphenol | 0.01 |
| propyl gallate | 0.20 |
| silicone fluid (DC200) | 0.1 |
| polymethacrylate | 0.05 |

The composition can be prepared by mixing the components using low shear to provide a transparent to translucent fluid.

Example 3

Lubricant Fluid Composition

A 500 mL glass reactor equipped with a thermometer, stirrer, and condenser can be charged with 249.5 g of the [2-(heptamethylcyclotetrasiloxanyl)ethyl]-methylsiloxane dimethylsiloxane copolymer described in Example 1 and 0.5 g of propyl gallate as an oxygen scavenger. The composition then can be mixed to obtain a lubricant fluid composition that includes the cyclosiloxane-substituted polysiloxane of Example 1.

Example 4

Release Agent Composition

A 500 mL glass reactor equipped with a thermometer, stirrer, and condenser can be charged with 20 g of the [2-(heptamethylcyclotetrasiloxanyl)ethyl]-methylsiloxane dimethylsiloxane copolymer described in Example 1 and 180 g of ethanol and mixed thoroughly. The resulting mixture contains 10% by weight of the [2-(heptamethyl-cyclotetrasiloxanyl)ethyl]-methylsiloxane dimethylsiloxane copolymer. Thus, a release agent composition can be obtained. The resulting release agent composition can be applied onto a polyethylene terephthalate (PET) film having a thickness of about 40 μm by means of a Meyer bar so that the dry film thickness is about 1 μm. Then, the composition can be dried to obtain a release film (release liner).

Example 5

Water Repellant Agent

A 1-liter glass reactor equipped with a thermometer, stirrer, and condenser can be charged with 50.0 g of the [2-(heptamethylcyclotetrasiloxanyl)ethyl]-methylsiloxane dimethylsiloxane copolymer described in Example 1 and 450.0 g of isopropanol as a solvent. The composition then can be mixed to obtain an isopropanol solution of the cyclosiloxane-substituted polysiloxane of Example 1.

To test water repellency, glass plates of 70 mm×150 mm can be degreased and cleaned with acetone and dried. A 0.1 ml aliquot of the water repellent agent solution can be coated on to the glass plates by spreading onto the plates using a cotton applicator, and any excess fluid can be removed using a clean cotton fabric. Before and after the application of the water repellant agent, the coated surface of the glass plates can be evaluated for contact angle with water and water droplet drop angle using any of the known tests for measuring contact angle with water and water droplet drop angle to examine initial water repellency and water repellency after application of the water repellant agent. For example, 5 μl of water can be placed on a glass plate held horizontally. A contact angle with water can be measured by means of a DropMaster® contact angle meter model DM-701 (manufactured by Kyowa Interface Science Co., Ltd., Saitama, Japan). Water droplet drop angle can be measured using any method, including measurement of static frictional coefficient. In these tests, a glass plate that has been treated with a water repellent agent can be placed horizontally in a tribometer device that measures the coefficient of static friction, such as a portable Tribogear™ 3D Muse™ (Shinto Scientific Co., Ltd., Tokyo, Japan). For such tests, pre-cleaned glass plates can be treated with the water repellant agent and then placed in the tribometer. A drop of water, such as about 100 μl of water, is placed on the glass plate, the plate gradually is inclined. The angle at which the water starts flowing under gravity is measured.

Example 6

Hair Conditioner

A hair conditioning composition can be prepared from the following ingredients.

| Component | wt % |
| --- | --- |
| Deionized Water | Q.S. 100 |
| Cetyl Trimethyl Ammonium Chloride | 0.500 |
| Citric Acid (use as required to adjust pH 3.7 to 4.3) | 0.010 |
| Hydroxyethylcellulose (Natrosol ® 250 HR) | 1.000 |
| Cetyl Alcohol | 3.000 |
| [2-(heptamethylcyclotetrasiloxanyl)ethyl]-methylsiloxane dimethylsiloxane copolymer of Example 1 | 0.500 |
| PVP/VA E 735 | 0.350 |
| Solulan ® 98 (Lanolin Acetate) | 0.200 |
| Formalin | 0.200 |
| Fragrance | 0.300 |

In preparing the hair shine conditioner of Example 6, the hydroxyethylcellulose is dispersed in one half of the formula amount of deionized water and mixed until a uniform clear solution is obtained and heated to 80-85° C. with mixing. The cetyl trimethyl ammonium chloride and citric acid are added to, and mixed with the aqueous hydroxyethyl cellulose solution at 80-85° C. until a uniform aqueous solution is obtained. The cetyl alcohol and [2-(heptamethylcyclotetrasiloxanyl)ethyl]-methylsiloxane dimethylsiloxane copolymer are slowly mixed and heated to 80-85° C. in a small mixer until a uniform clear mixture is obtained, which is slowly added to, and mixed with the aqueous solution at 80-85° C. After addition is completed, the rest of the water is added to the emulsion mixture with mixing which cools the mixture to about 50° C. Polyvinylpyrrolidone/vinyl acetate and lanolin acetate are added to the emulsion at about 50° C. with mixing and cooling the mixture to 35° C. The perfume and formalin are added to the emulsion at 35° C. with mixing and the composition is allowed to cool to room temperature. The final product is a smooth pourable lotion which is stable under all conditions of aging.

The composition of Example 6 is readily spreadable and distributes well throughout the hair when applied directly to the hair using the fingers. Also, wet and dry combing are very good and the treated hair has softness and body. Further, the hair is easily styled, and has a high shine.

Example 7

Personal Lubricant Composition

An oil-based personal lubricant can be prepared from the following ingredients.

| Component | wt % |
| --- | --- |
| [2-(heptamethylcyclotetrasiloxanyl)ethyl]-methylsiloxane dimethylsiloxane copolymer of Example 1 | 90.0 |
| Cyclomethicone | 5.0 |
| Cyclopentasiloxane | 5.0 |

This composition can be prepared by mixing the [2-(heptamethylcyclo-tetrasiloxanyl)ethyl]-methylsiloxane dimethylsiloxane copolymer in a vessel fitted with a paddle mixer and adding the cyclomethicone and cyclopentasiloxane with constant mixing. The resulting composition is an oily liquid and the composition is clear. The composition is non-irritating, latex safe and provides a silky smooth handfeel.

Example 8

Hair Shining Composition

A composition for application to the hair to impart long-lasting shine can be prepared from the following ingredients.

| Component | wt % |
| --- | --- |
| [2-(heptamethylcyclotetrasiloxanyl)ethyl]-methylsiloxane dimethylsiloxane copolymer of Example 1 | 10 |
| Ethylhexyl methoxycinnamate marketed by ROCHE VITAMINS under the trade name PARSOL ® MCX (UVB filter) | 0.05 |
| Fragrance | 0.10 |
| Ethyl alcohol, absolute | QS 100 |

The composition can be prepared by mixing the [2-(heptamethylcyclo-tetrasiloxanyl)ethyl]-methylsiloxane dimethylsiloxane copolymer of Example 1 and the ethylhexyl methoxycinnamate into the ethyl alcohol with constant mixing, followed by addition of the fragrance. The solution is colorless and transparent. Application to the hair imparts an intensive and/or long-lasting shine.

Since modifications will be apparent to those of skill in this art, it is intended that this invention be limited only by the scope of the appended claims.

What is claimed:

1. A polysiloxane of Formula I:

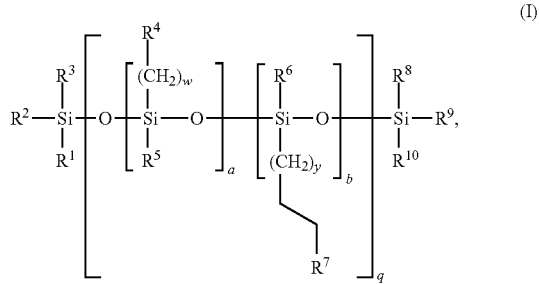

(I)

wherein:
$R^1$ and $R^2$ each independently is selected from among $C_1$-$C_{20}$ alkyl and substituted $C_1$-$C_{20}$ alkyl;
$R^3$ is selected from among $C_1$-$C_{20}$ alkyl, substituted $C_1$-$C_{20}$ alkyl, $C_3$-$C_{20}$ cycloalkyl, substituted $C_3$-$C_{20}$ cycloalkyl, a cyclosiloxane having three or more Si atoms and a substituted cyclosiloxane having three or more Si atoms;
each occurrence of $R^4$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl, and a substituted or unsubstituted cyclosiloxane selected from among a cycloheptasiloxane, a cyclohexasiloxane, a cyclopentasiloxane, and a cyclotetrasiloxane;
each occurrence of $R^5$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl and butylated aryloxypropyl;
each occurrence of $R^6$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl and butylated aryloxypropyl;
each occurrence of $R^7$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl, and a substituted or unsubstituted cyclosiloxane selected from among a cycloheptasiloxane, a cyclohexasiloxane, a cyclopentasiloxane, and a cyclotetrasiloxane;
$R^8$ and $R^9$ each independently is selected from among alkyl and substituted alkyl;
$R^{10}$ is selected from among alkyl, substituted alkyl, cycloalkyl, substituted cycloalkyl, a cyclosiloxane having three or more Si atoms and a substituted cyclosiloxane having three or more Si atoms;
a is selected from among 1 to 10;
b is selected from among 1 to 10;
q is selected from among 2 to 20;
w is selected from among 0 to 10;
y is selected from among 0 to 10;
wherein:
the $R^4$ in at least two subunits a is an optionally substituted cycloheptasiloxane, cyclohexasiloxane, cyclopentasiloxane, or cyclotetrasiloxane, wherein when the cyclosiloxane is substituted,
the cyclosiloxane is substituted with one or more than one substituent selected from among alkyl, haloalkyl, heteroalkyl, cycloalkyl, optionally substituted aryl, heteroaryl, non-aromatic heterocycle, hydroxy, alkoxy, aryloxy, mercapto, alkylthio, arylthio, cyano, halo, carbonyl, thiocarbonyl, O-carbamyl, N carbamyl, O thiocarbamyl, N thiocarbamyl, C amido, N amido, S-sulfonamido, N sulfonamide, azido, diazo, imino, formylamino, halo, fluoro, iodo, oxo, cyano, cyanato, carboxy, C trihalomethanesulfonyl, O carboxy, isocyanato, thiocyanato, isothiocyanato, nitro, silyl, and amino, including mono- and di-substituted amino groups, and the protected derivatives of amino groups, and no Si atom of the cyclosiloxane includes hydrogen as a substituent;
at least one $R^7$ in each subunit q is an optionally substituted cycloheptasiloxane, cyclohexasiloxane, cyclopentasiloxane, or cyclotetrasiloxane; and
at least one subunit q includes a Si atom that is not substituted with a cyclosiloxane.

2. The polysiloxane of claim 1, wherein one or more $R^7$ is a cyclosiloxane selected from among cycloheptasiloxane, cyclohexasiloxane, cyclopentasiloxane, or cyclotetrasiloxane that is substituted with one or more moieties selected from among halogen, hydroxyl, $C_1$-$C_6$ alkyl, $C_1$-$C_6$ alkoxy, $C_1$-$C_6$ haloalkyl, $C_1$-$C_6$ heteroalkyl, $C_3$-$C_{10}$ aryl, $C_3$-$C_{10}$ heteroaryl and $C_3$-$C_{10}$ aryl substituted with halogen or $C_1$-$C_6$ haloalkyl.

3. The polysiloxane of claim 1, wherein:
$R^1$ is an optionally substituted $C_1$-$C_{10}$ alkyl; and
$R^2$ is an optionally substituted $C_1$-$C_{10}$ alkyl.

4. The polysiloxane of claim 1, wherein $R^3$ is selected from among optionally substituted $C_1$-$C_{10}$ alkyl, optionally substituted $C_3$-$C_{20}$ cycloalkyl, an optionally substituted $C_3$-$C_6$ cycloalkyl, and an optionally substituted cyclosiloxane having three or more Si atoms.

5. The polysiloxane of claim 1, wherein the $R^4$ in each subunit a independently is selected from among optionally substituted $C_1$-$C_{10}$ alkyl, optionally substituted $C_1$-$C_{20}$ haloalkyl, optionally substituted $C_6$-$C_{20}$ aryl, optionally substituted $C_6$-$C_{20}$ heteroaryl, and an optionally substituted cyclosiloxane selected from among cycloheptasiloxane, cyclohexasiloxane, cyclopentasiloxane, or cyclotetrasiloxane.

6. The polysiloxane of claim 1, wherein one or more $R^4$ is trifluoropropyl or an optionally substituted phenyl.

7. The polysiloxane of claim 1, wherein $R^4$ in each subunit a is an optionally substituted cycloheptasiloxane, cyclohexasiloxane, cyclopentasiloxane, or cyclotetrasiloxane.

8. The polysiloxane of claim 1, wherein the $R^4$ in at least two subunits a is a cycloheptasiloxane, cyclohexasiloxane, cyclopentasiloxane, or cyclotetrasiloxane, in which at least one Si atom is substituted with a moiety selected from among alkyl, haloalkyl, heteroalkyl, cycloalkyl, optionally substituted aryl, heteroaryl, non-aromatic heterocycle, hydroxy, alkoxy, aryloxy, mercapto, alkylthio, arylthio, cyano, halo, carbonyl, thiocarbonyl, O-carbamyl, N carbamyl, O thiocarbamyl, N thiocarbamyl, C amido, N amido, S-sulfonamido, N sulfonamido, azido, diazo, imino, formylamino, fluoro, iodo, oxo, cyano, cyanato, carboxy, C trihalomethanesulfonyl, O carboxy, isocyanato, thiocyanato, isothiocyanato, nitro, silyl, and amino, and mono- and di-substituted amino groups.

9. The polysiloxane of claim 1, wherein the $R^4$ in at least two subunits a is a cycloheptasiloxane, cyclohexasiloxane, cyclopentasiloxane, or cyclotetrasiloxane, in which at least one Si atom is substituted with a moiety selected from among halogen, hydroxyl, $C_1$-$C_6$ alkyl, $C_1$-$C_6$ alkoxy, $C_1$-$C_6$ haloalkyl, $C_1$-$C_6$ heteroalkyl, $C_3$-$C_{10}$ aryl, $C_3$-$C_{10}$ heteroaryl and $C_3$-$C_{10}$ aryl substituted with halogen or $C_1$-$C_6$ haloalkyl.

10. The polysiloxane of claim 1, wherein the $R^5$ in each subunit a independently is selected from among optionally substituted $C_1$-$C_{10}$ alkyl, optionally substituted $C_1$-$C_{20}$ haloalkyl, optionally substituted $C_6$-$C_{20}$ aryl, optionally substituted $C_6$-$C_{20}$ heteroaryl, and butylated aryloxypropyl.

11. The polysiloxane of claim 1, wherein at least one $R^5$ is butylated aryloxypropyl or trifluoropropyl or phenyl.

12. The polysiloxane of claim 1, wherein the $R^6$ in each subunit b independently is selected from among optionally substituted $C_1$-$C_{10}$ alkyl, optionally substituted $C_1$-$C_{20}$ haloalkyl, optionally substituted $C_6$-$C_{20}$ aryl, optionally substituted $C_6$-$C_{20}$ heteroaryl, and butylated aryloxypropyl.

13. The polysiloxane of claim 1, wherein at least one $R^6$ is trifluoropropyl or an optionally substituted phenyl or butylated aryloxypropyl.

14. The polysiloxane of claim 1, wherein:
$R^8$ is an optionally substituted $C_1$-$C_{10}$ alkyl; and
$R^9$ is an optionally substituted $C_1$-$C_{10}$ alkyl.

15. The polysiloxane of claim 1, wherein $R^{10}$ is selected from among optionally substituted $C_1$-$C_{10}$ alkyl, optionally substituted $C_3$-$C_{20}$ cycloalkyl, and an optionally substituted cyclosiloxane having three or more Si atoms.

16. The polysiloxane of claim 1, wherein a is 1-5.
17. The polysiloxane of claim 1, wherein b is 1-5.
18. The polysiloxane of claim 1, wherein q is 2-15.
19. The polysiloxane of claim 1, wherein w 0-5.
20. The polysiloxane of claim 1, wherein y is 0-5.
21. The polysiloxane of claim 1, wherein:
at least one of $R^3$ or $R^{10}$ is a cyclosiloxane; or
$R^3$ and $R^{10}$ each independently is a cyclosiloxane.

22. The polysiloxane of claim 1, wherein at least one of $R^5$ and $R^6$ is an aryl substituted with an alkyl or halogen.

23. The polysiloxane of claim 1, wherein:
$R^5$ and $R^6$ are $C_1$-$C^6$ alkyl;
$R^4$ is an optionally substituted aryl; and
$R^7$ is an optionally substituted cycloheptasiloxane, cyclohexasiloxane, cyclopentasiloxane, or cyclotetrasiloxane.

24. The polysiloxane of claim 1, wherein the polysiloxane has a molecular weight in the range from about 200 to over 500,000.

25. The polysiloxane of claim 1, wherein the polysiloxane is thermally stable at temperatures above 150° C.

26. The polysiloxane of claim 1, wherein the polysiloxane has a viscosity of up to about 150,000 centipoise when measured at 25° C. at a shear rate of 100 sec$^{-1}$.

27. A composition, comprising:
a polysiloxane of claim 1; and
a carrier.

28. The composition of claim 27, wherein the viscosity of the polysiloxane is from 100 to 100,000 centipoise when measured at 25° C. at a shear rate of 100 sec$^{-1}$.

29. The composition of claim 27 that is a lubricant composition, further comprising a solid lubricant selected from among a graphite, graphite fluoride, a buckyball, molybdenum disulfide, boron nitride, tungsten disulfide, hollow fullerene-like nanoparticles, metal dichalcogenides and polytetrafluoroethylene (PTFE) or a combination thereof, wherein:
the viscosity of the polysiloxane is from 10 cP to 150,000 cP when measured at 25° C. at a shear rate of 100 sec$^{-1}$; and
the polysiloxane is present at from about 0.1% to 50% by weight of the composition; or
the polysiloxane is present at from about 50% to 99% by weight of the composition.

30. The composition of claim 27 that is a hydraulic fluid, comprising:
from about 91.9 to 99.8% by weight polysiloxane;
from about 0.005 to 0.1% by weight anti-oxidant; and
from about 0.01 to 1.0% by weight anti-foaming agent.

31. The composition of claim 27 that is a water repellent composition, wherein:
the polysiloxane is present at a concentration between about 50% to 100% by weight of the composition; or
the polysiloxane is present at a concentration between about 0.5 to 50% by weight of the composition; and
the composition further comprises an additive selected from among waxes, tertiary fatty amines, metallic soaps, fungicides, bactericides, and fire-retardant materials and mixtures thereof.

32. The composition of claim 27 that is a release agent composition, wherein:
the polysiloxane is present at a concentration between about 50% to 100% by weight of the composition; or
the polysiloxane is present at a concentration between about 0.5 to 50% by weight of the composition; and
the composition further comprises a thickening agent.

33. The composition of claim 27 that is a personal care or cosmetic composition, wherein:
the polysiloxane is present at a concentration between about 50% to 100% by weight of the composition; or
the polysiloxane is present at a concentration between about 0.5 to 50% by weight of the composition; and
the composition further comprises an additive selected from among emollients, moisturizers, humectants, pigments, dyes, pearlescent compounds, nacreous pigments, bismuth oxychloride coated mica, titanium dioxide coated mica, colorants, fragrances, biocides, preservatives, alpha hydroxy acids, antioxidants, antimicrobial agents, anti-fungal agents, antiperspirant agents, exfoliants, hormones, enzymes, medicinal compounds, vitamins, salts, electrolytes, alcohols, polyols, polypropylene glycol, polyisobutene, polyoxyethylene, behenic acid, behenyl, sugar-alcohols, absorbing agents for ultraviolet radiation, botanical extracts, surfactants, silicone oils, organic oils, waxes, alkaline or acidic or buffering agents, film formers, thickening agents, hyaluronic acid, fumed silica, hydrated silica, talc, kaolin, starch, modified starch, mica, nylon, clay, bentonite, organo-modified clays and combinations thereof.

34. The composition of claim 33, wherein the personal care or cosmetic composition is formulated as a product selected from among deodorants, antiperspirants, insect repellants, anesthetics, skin conditioners, skin lotions, skin moisturizers, skin toners, skin sanitizers, skin cleansing compositions, skin soothing and lubricating compositions, sunscreen, anti-aging products, concealer products, soaps, foaming bath products, shower gels, cleansing products, shampoos, hair conditioners, hair styling gels, hair anti-dandruff compositions, hair growth promoter compositions, hair colorant compositions, hair bleaching agent compositions, hair anti-frizzing agent compositions, hair shining compositions, hair relaxer compositions, mousses, styling gels, hair sprays, hair dyes, hair waving products, hair straightening products, shaving product compositions, personal lubricant compositions, spermicidal gel compositions, manicure products, nail polish, nail polish remover, nail creams and lotions, cuticle softeners, color cosmetics, lipsticks, lip balms, foundations, face powders, eye liners, eye shadows, blushes, makeup, mascaras and color cosmetic removers.

35. The composition of claim 27, further comprising a fragrance or fragrance releasing compound or fragrant material or a combination thereof.

36. The household care composition of claim 35 that is formulated as a product selected from among laundry detergents and softeners, fabric sizing agents, dish and hard surface detergents, hard surface sanitizing agents, all purpose kitchen cleaner and disinfectants, toilet, tub and tile cleaning and disinfectant preparations, polishing compositions, waxes and polishing compositions for treating wood, furniture, automobiles or boats, pesticide preparations, static control preparations, air deodorants/fresheners, and rug and upholstery shampoos, cleaners and deodorizers.

37. The composition of claim 27 that is a drug delivery system for topical application of an active agent to the skin, further comprising one or more of a skin-penetration enhancer, accelerant, adjuvant and sorption promoter and combinations thereof.

38. The composition of claim 27 that is a personal lubricant composition, the composition further comprising a linear or cyclic silicone fluid or mixtures thereof.

39. A polysiloxane of Formula I:

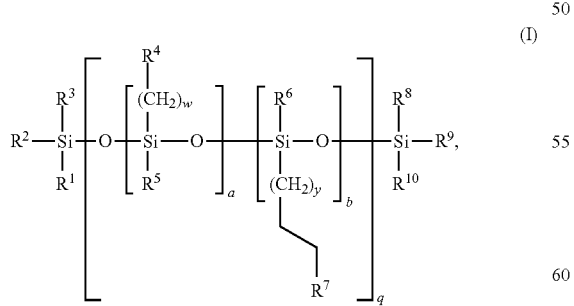

(I)

wherein:
$R^1$ and $R^2$ each independently is selected from among $C_1$-$C_{20}$ alkyl and substituted $C_1$-$C_{20}$ alkyl;
$R^3$ is selected from among $C_1$-$C_{20}$ alkyl, substituted $C_1$-$C_{20}$ alkyl, $C_3$-$C_{20}$ cycloalkyl, substituted $C_3$-$C_{20}$ cycloalkyl, a cyclosiloxane having three or more Si atoms and a substituted cyclosiloxane having three or more Si atoms;
each occurrence of $R^4$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl, a cyclosiloxane having at least four Si atoms and a substituted cyclosiloxane having at least four Si atoms;
each occurrence of $R^5$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl and butylated aryloxypropyl;
each occurrence of $R^6$ independently is selected from among $C_1$-$C_{20}$ alkyl, substituted $C_1$-$C_{20}$ alkyl, $C_1$-$C_{20}$ haloalkyl, substituted $C_1$-$C_{20}$ haloalkyl, $C_6$-$C_{20}$ aryl, substituted $C_6$-$C_{20}$ aryl, $C_6$-$C_{20}$ heteroaryl, substituted $C_6$-$C_{20}$ heteroaryl and butylated aryloxypropyl;
$R^7$ is an optionally substituted cyclosiloxane having three or more Si atoms;
$R^8$ and $R^9$ each independently is selected from among alkyl and substituted alkyl;
$R^{10}$ is selected from among alkyl, substituted alkyl, cycloalkyl, substituted cycloalkyl, a cyclosiloxane having three or more Si atoms and a substituted cyclosiloxane having three or more Si atoms;
a is selected from among 1 to 50;
b is selected from among 1 to 50;
q is selected from among 2 to 20;
w is selected from among 0 to 10;
y is selected from among 0 to 10;
wherein:
the $R^4$ in at least two subunits a is an optionally substituted-cyclosiloxane having at least four Si atoms;
the cyclosiloxane is unsubstituted; or
the cyclosiloxane is substituted with one or more than one substituent selected from among alkyl, haloalkyl, heteroalkyl, cycloalkyl, optionally substituted aryl, heteroaryl, non-aromatic heterocycle, hydroxy, alkoxy, aryloxy, mercapto, alkylthio, arylthio, cyano, halo, carbonyl, thiocarbonyl, O-carbamyl, N carbamyl, O thiocarbamyl, N thiocarbamyl, C amido, N amido, S-sulfonamido, N sulfonamide, azido, diazo, imino, formylamino, halo, fluoro, iodo, oxo, cyano, cyanato, carboxy, C trihalomethanesulfonyl, O carboxy, isocyanato, thiocyanato, isothiocyanato, nitro, silyl, and amino, including mono- and di-substituted amino groups, and the protected derivatives of amino groups, and no Si atom of the cyclosiloxane includes hydrogen as a substituent; and
the polysiloxane has a cyclosiloxane on every other non-terminal Si atom.

* * * * *

UNITED STATES PATENT AND TRADEMARK OFFICE
CERTIFICATE OF CORRECTION

| | | |
|---|---|---|
| PATENT NO. | : 9,175,141 B2 | Page 1 of 1 |
| APPLICATION NO. | : 13/198658 | |
| DATED | : November 3, 2015 | |
| INVENTOR(S) | : Wray et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 640 days.

Signed and Sealed this
Ninth Day of August, 2016

Michelle K. Lee
*Director of the United States Patent and Trademark Office*